(12) United States Patent
Thelen et al.

(10) Patent No.: US 6,447,583 B1
(45) Date of Patent: Sep. 10, 2002

(54) ROTATING DRUM ADSORBER PROCESS AND SYSTEM

(75) Inventors: John E. Thelen; Brian Peterson; Robert G. Thomson, all of Ocala, FL (US)

(73) Assignee: Flair Corporation, Ocala, FL (US)

( * ) Notice: Subject to any disclaimer, the term of this patent is extended or adjusted under 35 U.S.C. 154(b) by 19 days.

(21) Appl. No.: 09/699,875

(22) Filed: Oct. 30, 2000

Related U.S. Application Data

(63) Continuation of application No. 09/587,568, filed on Jun. 5, 2000.
(60) Provisional application No. 60/137,628, filed on Jun. 4, 1999.

(51) Int. Cl.[7] .............................................. B01D 53/06
(52) U.S. Cl. ........................... 96/125; 95/113; 96/109; 96/130
(58) Field of Search ........................... 95/14, 15, 19, 95/22, 23, 96, 113; 96/109–117, 124, 125, 130

(56) References Cited

U.S. PATENT DOCUMENTS

| | | | | |
|---|---|---|---|---|
| 2,237,684 A | * | 4/1941 | Moore | 96/115 X |
| 2,993,563 A | | 7/1961 | Munters et al. | |
| 3,258,899 A | | 7/1966 | Coffin | 55/162 |
| 3,398,510 A | | 8/1968 | Pennington | 55/163 |
| 3,619,987 A | | 11/1971 | Colvin et al. | 55/196 |
| 3,708,956 A | | 1/1973 | Norbäck | 55/20 |
| 3,800,859 A | | 4/1974 | Norbäck | 165/9 |
| 4,062,129 A | * | 12/1977 | Yoshida et al. | 96/125 X |
| 4,197,095 A | * | 4/1980 | White, Jr. et al. | 95/15 |
| 4,247,311 A | | 1/1981 | Seibert et al. | 55/162 |
| 4,452,612 A | | 6/1984 | Mattia | 55/25 |
| 4,468,239 A | | 8/1984 | Frantz | 55/162 |
| 4,552,570 A | | 11/1985 | Gravatt | 55/20 |
| 4,584,001 A | * | 4/1986 | Dechene | 96/114 |
| 4,775,484 A | | 10/1988 | Schmidt et al. | 210/673 |
| 4,778,492 A | | 10/1988 | Dawson | 55/78 |
| 4,816,043 A | | 3/1989 | Harrison | 55/162 |
| 4,832,711 A | | 5/1989 | Christel, Jr. et al. | 55/20 |
| 4,846,855 A | | 7/1989 | Tsujimoto | 55/60 |
| 4,863,497 A | * | 9/1989 | Grenier et al. | 96/125 X |
| 4,926,617 A | | 5/1990 | Ratliff | 55/20 |
| 4,927,434 A | | 5/1990 | Cordes et al. | 55/20 |
| 4,941,894 A | | 7/1990 | Black | 55/20 |

(List continued on next page.)

FOREIGN PATENT DOCUMENTS

| | | | | |
|---|---|---|---|---|
| DE | 40 21 072 A | 1/1992 | | 96/150 |
| GB | 2 165 465 A | 4/1986 | | 96/150 |

*Primary Examiner*—Robert H. Spitzer
(74) *Attorney, Agent, or Firm*—Baker & Hostetler, LLP

(57) ABSTRACT

A rotating drum adsorber process and system includes a rotating drum of adsorbent medium in a shell including partitions which define an adsorption sector, a regeneration sector and a cooling sector, and which continuously rotates through the sectors. The process and system includes an arrangement for sensing the temperature difference between the temperature of the discharge exiting the leading edge of the regeneration sector and the regeneration sector average discharge temperature for automatically controlling various operating conditions of the rotating drum adsorber system. A computerized method for accurately predicting the contamination level of the gas stream exiting the adsorption sector and optimizing the performance and fractionation efficiency of the rotating drum adsorber system is also included. In addition, the invention includes a sealing process and system for sealing between the various process sectors of the partitioned shell and a process and system for supporting and rotating the adsorbent drum within the containment shell. Features of the present invention include a uniquely designed high speed blower for boosting the pressure of the regeneration exhaust stream, an electrical system and method for monitoring and controlling the rotating drum adsorber process and system.

25 Claims, 46 Drawing Sheets

U.S. PATENT DOCUMENTS

| | | | |
|---|---|---|---|
| 4,948,392 A | 8/1990 | Rush | 55/34 |
| 5,017,202 A | 5/1991 | Ogata et al. | 55/390 |
| 5,037,458 A | 8/1991 | Trepaud | 55/162 |
| 5,057,128 A | 10/1991 | Panzica et al. | 55/181 |
| 5,133,784 A | 7/1992 | Boudet et al. | 55/25 |
| 5,147,420 A | 9/1992 | Claesson | 55/34 |
| 5,148,374 A | 9/1992 | Coellner | 364/505 |
| 5,167,679 A | 12/1992 | Maekawa et al. | 55/208 |
| 5,169,414 A | 12/1992 | Panzica et al. | 55/60 |
| 5,183,484 A | 2/1993 | Yamaguchi et al. | 55/34 |
| 5,199,964 A | 4/1993 | Gräff | 55/20 |
| 5,238,052 A | 8/1993 | Chagnot | 165/8 |
| 5,242,473 A | 9/1993 | Ogasahara | 96/125 |
| 5,256,174 A | 10/1993 | Kai et al. | 96/116 |
| 5,301,439 A | 4/1994 | Wang | 96/125 |
| 5,385,603 A | 1/1995 | Sienack | 96/125 |
| 5,389,125 A | 2/1995 | Thayer et al. | 95/11 |
| 5,431,716 A | 7/1995 | Ebbeson | 96/125 |
| 5,464,468 A | 11/1995 | Tanaka et al. | 96/125 |
| 5,474,594 A | 12/1995 | Khelifa et al. | 95/14 |
| 5,487,775 A | 1/1996 | LaCava et al. | 95/98 |
| 5,512,083 A | 4/1996 | Dunne | 95/113 |
| 5,534,186 A | 7/1996 | Walker et al. | 252/194 |
| 5,542,968 A | 8/1996 | Belding et al. | 96/125 |
| 5,547,640 A | 8/1996 | Kim | 422/177 |
| 5,565,139 A | 10/1996 | Walker et al. | 252/194 |
| 5,567,229 A | 10/1996 | Klobucar et al. | 95/113 |
| 5,572,799 A | 11/1996 | Masuyuki et al. | 34/80 |
| 5,578,111 A | 11/1996 | Reuter | 95/86 |
| 5,580,369 A | 12/1996 | Belding et al. | 96/125 |
| 5,584,916 A | 12/1996 | Yamashita et al. | 96/123 |
| 5,628,819 A | 5/1997 | Mestemaker et al. | 96/122 |
| 5,632,802 A | 5/1997 | Grgich et al. | 95/10 |
| 5,647,891 A | 7/1997 | Blizzard et al. | 95/99 |
| 5,659,974 A | 8/1997 | Graeff | 34/378 |
| 5,688,305 A | 11/1997 | Graeff | 95/14 |
| 5,695,546 A | 12/1997 | Izumi et al. | 95/115 |
| 5,701,762 A | 12/1997 | Akamatsu et al. | 62/636 |
| 5,702,505 A | 12/1997 | Izumi et al. | 95/115 |
| 5,702,508 A | 12/1997 | Moratalla | 96/118 |
| 5,727,394 A | 3/1998 | Belding et al. | 62/94 |
| 5,758,508 A | 6/1998 | Belding et al. | 95/113 |
| 5,788,744 A | 8/1998 | Klobucar et al. | 95/113 |
| 5,807,422 A | 9/1998 | Grgich et al. | 95/10 |
| 5,817,167 A | 10/1998 | DesChamps | 95/113 |
| 5,912,425 A * | 6/1999 | Peyron et al. | 96/109 |
| 6,083,300 A * | 7/2000 | McFadden | 95/113 |

* cited by examiner

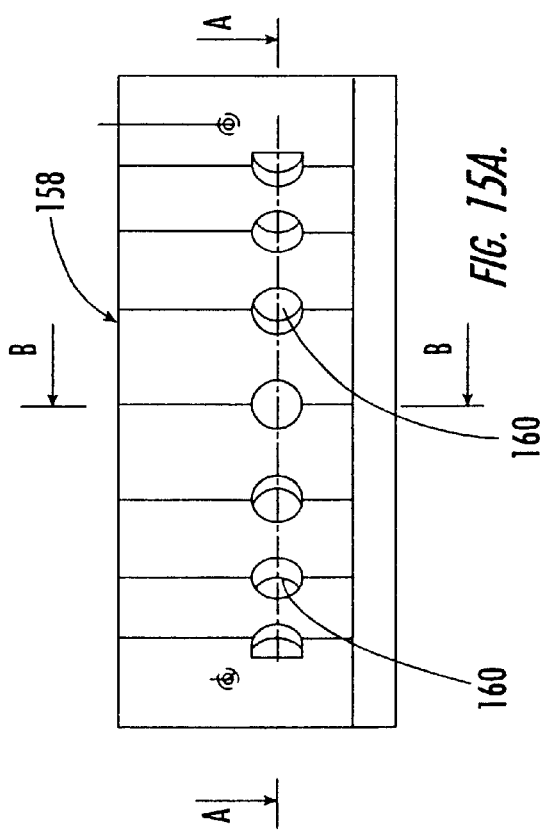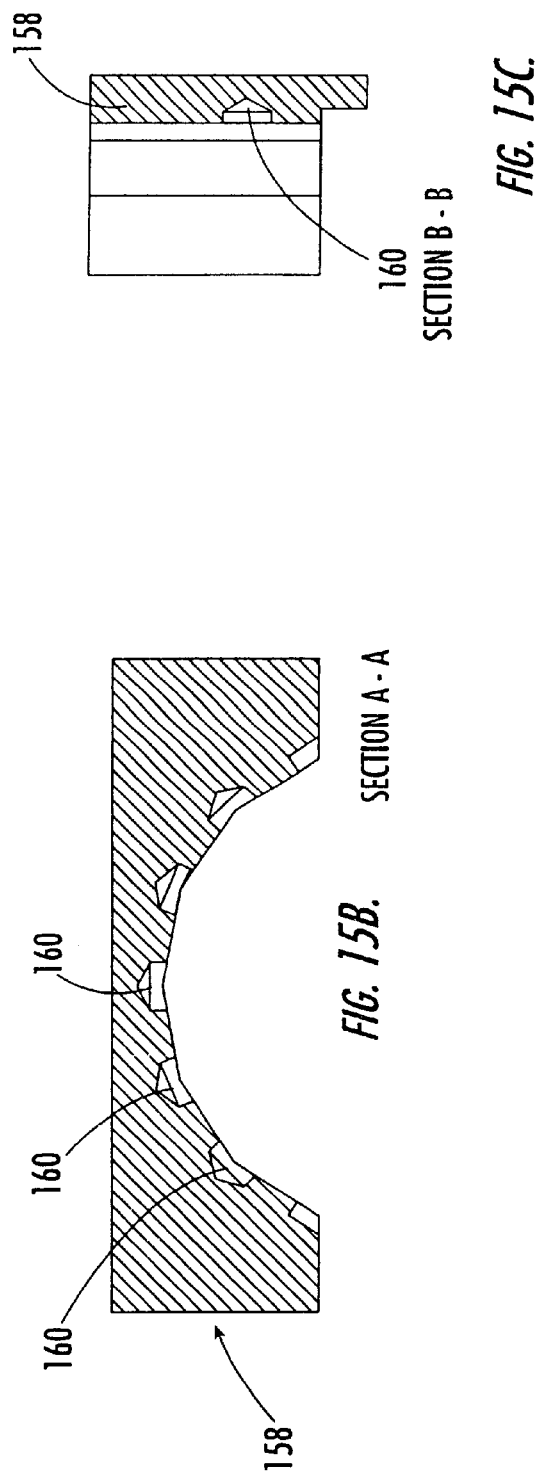
FIG. 15A.
FIG. 15B. SECTION A-A
FIG. 15C. SECTION B-B

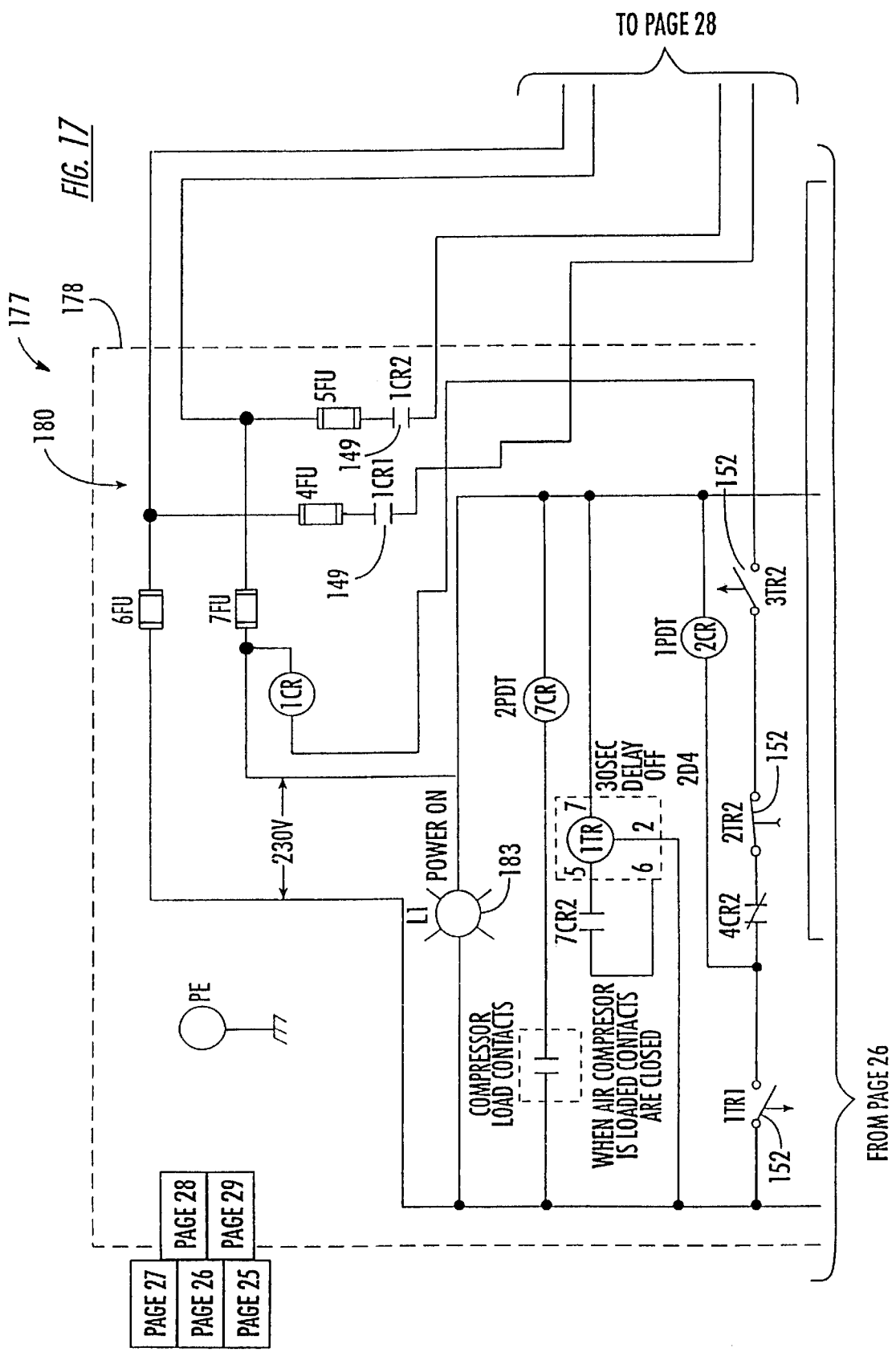

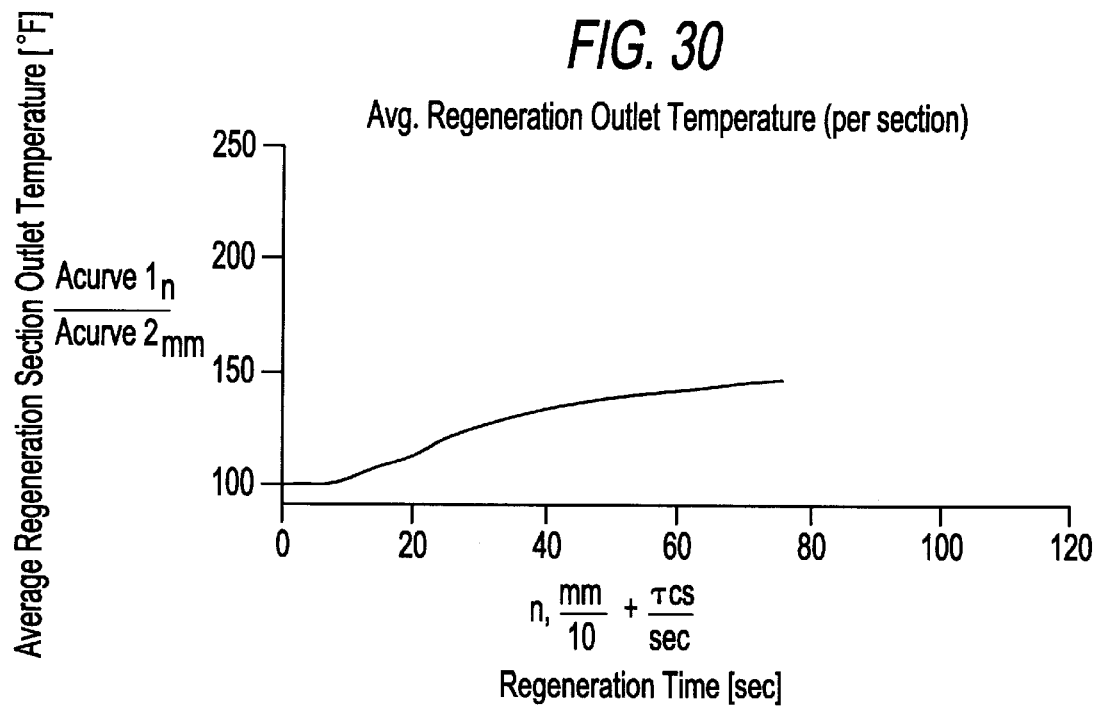
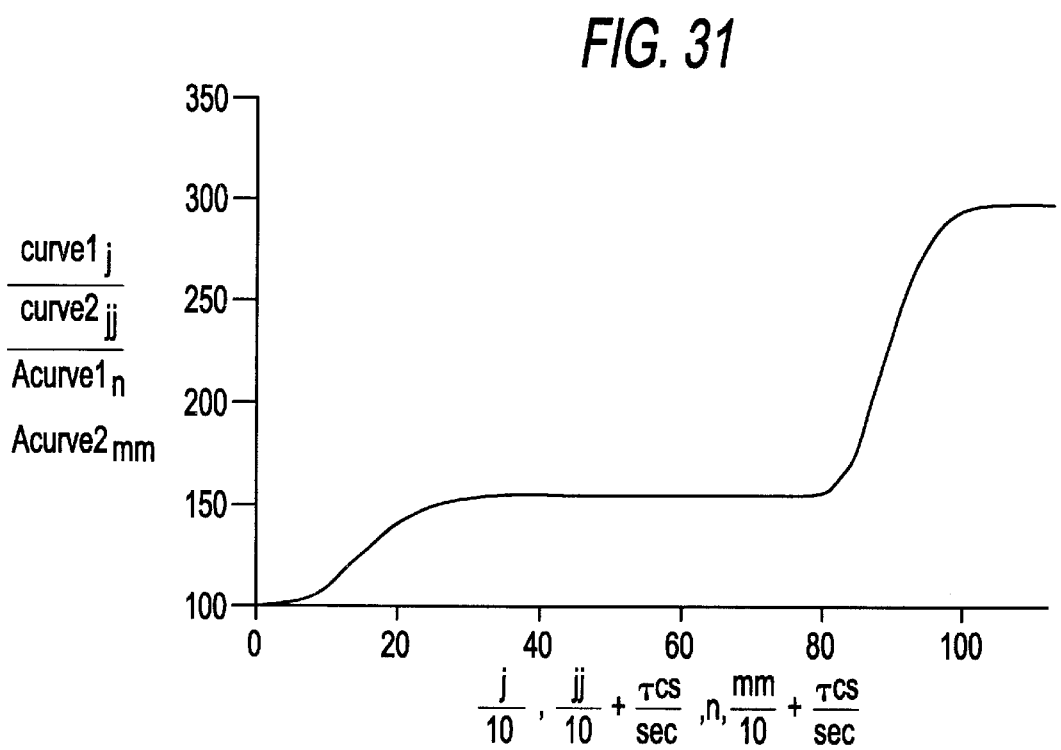

Cooling Flute Temperature

ROTATING DRUM ADSORBER PROCESS AND SYSTEM

CROSS-REFERENCE TO RELATED APPLICATION

This application is a continuation of U.S. application Ser. No. 09/587,568, filed Jun. 5, 2000, which claims the benefit of the U.S. Provisional Application Serial No. 60/137,628 filed Jun. 4, 1999.

BACKGROUND OF THE INVENTION

The present invention relates generally to adsorbent type fractionators and separator systems and the like, and specifically relates to an improved rotating drum adsorber process and system for fractionating fluids including a novel control method for attaining maximum performance and optimum product quality, and more particularly, when applied to the removal of water vapor from a gas or air, in which the lowest product dew point is achieved.

Multi-chamber adsorbent fractionators are commonly used for air drying. Some examples of this type of adsorbent fractionators are disclosed in U.S. Pat. Nos. 5,256,174, 4,468,239, 4,552,570, 4,247,311 and 3,258,899. Multi-chamber adsorbent fractionators generally include two or more chambers, each filled with an adsorbent medium, such as silica gel, activated alumina, molecular sieve, activated titanium dioxide or activated carbon. One or more chambers are placed on-stream to process the feed gas while the others are isolated off-stream to affect adsorbent regeneration. In one type of adsorbent fractionator, regeneration is accomplished by passing a heated purge gas through the adsorbent containing chamber until the contaminant, previously adsorbed, is desorbed and driven out of the chamber. Such devices entail significant size and weight to accommodate large quantities of adsorbent and complex valving systems to control the operation of the variant adsorbent chambers. Furthermore, extensive logic control systems are required to automatically operate the flow directing valves with system intelligence. An important application of adsorbent fractionators is to provide safe moisture levels in compressed air systems. Moisture in a compressed air system can cause erosion, corrosion and biological effects which can result in product spoilage, equipment malfunction and system failure. For example, in a compressed air line, water is fluidized to an aerosol mist by the turbulent air flow and the droplets are then propelled downstream at high velocities until they impact on the first obstruction in their path, such as a piping elbow, a valve disc, an orifice plate, or an air motor blade. The resulting repeated impulses produce honeycomb-like pits which provide havens for salt ions and acids and which further corrode the surface by chemical action. The weakened surface is then prone to stress corrosion by mechanical vibration and flexing. Erosion can be controlled by eliminating liquid aerosols and particles in air and removing water vapor, which can condense and form liquid droplets, from compressed air systems. Thus, in installations where compressed air lines are exposed to low temperatures and are prone to condensation, it is important that the air be dried to a dew point below the lowest possible temperature.

In addition to erosion, moisture in compressed air systems can cause corrosion and destructive biological effects. Oxygen corrosion in compressed air systems can be prevented by the removal of moisture and oil. The water vapor content must be reduced to very low levels to protect uncoated surfaces such as piping, valves, nozzles, and air motors. Acidic oil vapors should also be removed if significant quantities are present. Water and oil vapors can be removed by adsorption processes. Liquid aerosols may be removed from the air stream by such means as coalescing filters. Wet corrosion in compressed air systems is particularly aggressive because of the absorption of corrosive agents from the air. It occurs primarily in low velocity stagnant regions of the system, such as in valve body cavities and low undrained horizontal piping runs where water droplets are allowed to collect. Pits and crevices also provide ideal locations for corrosion to occur. While pure liquid water is not itself corrosive, very corrosive solutions are formed when water is combined with salt particles or acidic gases. In addition, water molecules adhering to metal surfaces attract oxygen molecules, thereby continuing the corrosion process. Although oxidation is extremely slow on clean metal surfaces at below 50% relative humidity, the presence of an oxide film greatly increases the concentration of water and oxygen and therefore, the corrosion rate until the relative humidity is brought below 2%. This is equivalent to a dew point of $-30°$ F. at $50°$ F. temperature. Thus, corrosion can be controlled by drying the air to its the lowest possible dew point.

Further, moisture in compressed air systems is harmful because moist air permits the growth of bacteria, fungus and mold and these organisms produce acidic waste, fostering corrosion of compressed air systems. For example, moisture in compressed air can cause product contamination by both direct and indirect means. Often the effects are not immediately noticeable, but they can be detrimental to product quality. Both water droplets and water vapor can be absorbed by the product in direct contact processes, such as, by way of example, in chemical mixing, and paint spraying applications. The absorption of water can adversely affect the chemical and physical properties of the product. Moreover, moisture may indirectly contribute to the generation of particles through erosion and corrosion and to the growth of microorganisms which also contaminate products. Microorganisms may also accumulate in instrumentation tubing and air motor bearings, resulting in malfunction, excessive wear rates, and seizure. Studies show that reducing the relative humidity to below 10% will halt growth of microorganisms, thereby eliminating their harmful effects. Thus, it is advantageous for controlling harmful biological effects, to dry the air to a dew point which reduces the relative humidity to below 10%.

Dry compressed air is used in a wide range of applications including food processing, chemical and pharmaceutical operations and the manufacture of electronic componentry. In the food industry, dry air is used to dehydrate grains, dairy products, vegetables and cereals. In the electronics industry, dry compressed air is used to remove demineralized water and cleaning solvents from silicon devices and circuit boards. In such applications, $-40°$ F. to $-100°$ F. dew point air is used and therefore, it is advantageous to utilize a drying process in which the air is dried to its lowest possible dew point. For example, compressed air used in analytical instrumentation also must be extremely pure and contain minimal levels of water vapor. Infrared analyzers and gas chromatographs used to analyze air for environmental chamber and physiological respiration testing typically require stable quality air and dew point levels below $-60°$ F. Such high purity air, called "zero air," is also beneficial in prolonging the life of instrument solenoid valves and other sensitive components, in preventing contamination of the test samples and in preventing undesirable side reactions during analyses.

The degree of dryness required must be determined by an analysis of each individual compressed air system and the air drying system should be designed to reduce the water vapor content to the lowest dew point level.

Removal of moisture from an air feed stream depends upon several factors including the rate of flow of the stream, the rate of moisture adsorption and moisture content of the adsorbent, as well as the temperature and pressure of the air within the bed.

Therefore, there is a need for an efficient, reliable adsorption process and system for increasing the purity of an air feed stream and achieving the lowest effluent dew point, and a method for designing and controlling such an adsorption process and system.

SUMMARY OF THE INVENTION

In accordance with the present invention, an improved rotating drum adsorber process and system for fractionating fluids is provided for increasing the efficiency, reliability and longevity of a fractionation system, improving the regeneration of an adsorbent medium, achieving a higher degree of fractionation, increasing the purity of the outlet fluid and, when removing moisture, achieving the lowest effluent dew point. The present invention utilizes a revolving drum of adsorbent medium to control the rotating drum adsorber system to achieve complete regeneration of the adsorbent medium, maximum drum dryer performance and system energy efficiency, and optimum product purity. Further control of the rotating drum adsorber system may also be achieved by utilizing a comparison of temperatures in the regeneration exhaust stream. While the rotating drum adsorber process and system of the present invention is described herein with reference to the removal of water vapor from a moist gas stream, it will be understood that the present invention is not limited to the drying of moist gas and may be readily applied to many situations, such as, by way of example, to fluid separation, to fluid at atmospheric pressure or fluid under elevated pressure, such as compressed air, to the removal of other contaminants, such as, carbon dioxide in a cryogenic air fractionator pretreatment system, and to the removal of toxic gases in a chemical warfare collective protection system. It will also be understood that while the drum described herein is an axial flow adsorbent wheel, such as, by way of example, a honeycomb device with axial flutes, the drum may also be a radial flow cylindrical bed with immobilized adsorbent particles.

The present invention is directed to an efficient and reliable process and system for removing water vapor from a moist gas feed stream to achieve the lowest product dew point. The rotating drum adsorber system of the present invention includes a rotating drum of adsorbent medium having various process sectors, including an adsorption sector and a regeneration sector, and which continuously rotates through the sectors. The preferred drum also includes a cooling sector, which precedes the adsorption sector, for improved separation efficiency, improved adsorbent regeneration and lower product discharge temperature. The process and system of the present invention may include an arrangement for sensing the temperature difference between the temperature of the discharge exiting the leading edge of the regeneration sector and the regeneration sector average discharge temperature for automatically controlling various operating conditions of the rotating drum adsorber system to effectively operate the system to achieve complete regeneration of the absorbent medium and the lowest outlet product dew point.

In a first preferred embodiment, the process includes directing a cooled moist gas feed stream into the adsorption sector of the rotating drum and diverting a portion of the uncooled moist feed inlet stream through the regeneration sector. Upon exiting the regeneration sector, the regeneration exhaust stream is cooled and water is separated and drained. The regeneration exhaust stream is then combined with the moist gas feed inlet stream and directed to the adsorption sector. However, in order to maintain the higher pressure of the dry outlet stream, the process and system include an arrangement for boosting or increasing the pressure of the lower pressure regeneration exhaust stream before combining the cooled regeneration exhaust stream with the moist gas feed inlet stream. While an air ejector may be utilized, the process for boosting or increasing the pressure of the exhaust regeneration stream preferably includes utilizing a high speed yet small size centrifugal type blower adapted to move large quantities of gas flow at high differential pressure for providing the pressure boost required to combine the regeneration exhaust stream with the moist gas feed inlet stream. The process and system may also include an arrangement for diverting a portion of the purified stream exiting the adsorption sector through the cooling sector to improve the absorption quality of the adsorbent medium leaving the regeneration sector and rotating into the adsorption sector. The exhaust cooling stream exiting the cooling sector is then combined with the regeneration exhaust stream prior to the step of increasing the pressure of the regeneration exhaust stream. The combined streams are directed through the adsorption sector resulting in a purified stream having a lowest effluent dew point exiting at the outlet of the adsorption sector.

In a second preferred embodiment, the process and system includes directing the entire moist gas feed stream into the adsorption sector of the rotating drum and utilizing a portion of the purified gas stream exiting the outlet of the adsorption sector for regeneration instead of the hot moist feed gas stream. The process may also include an arrangement for controlling the temperature of the purified gas being directed into the regeneration sector for improving the effluent gas quality. As in the first preferred embodiment, the regeneration exhaust stream is cooled and water is separated and drained. The regeneration exhaust stream is then drawn into a high speed blower system for increasing the pressure of the regeneration exhaust stream prior to combining it with the moist gas feed inlet stream. The combined streams are directed through the adsorption sector and a portion of the purified stream exiting the outlet of the adsorption sector is diverted through the cooling sector while another portion is directed to the regeneration sector and the process is repeated. In the second preferred embodiment, the portion of the purified gas being directed to the regeneration sector may be heated via a heater or heat exchanger prior to entering the regeneration sector for improving the effluent gas quality.

In a variation of the second preferred embodiment, the process and system of the present includes an arrangement for cooling the combined streams of the pressure-boosting regeneration exhaust stream and the moist gas feed stream to provide a cooler inlet stream into the adsorption sector for lowering the outlet dew point. In this variation, the pressure of the regeneration exhaust stream is boosted and the stream is combined with the moist feed inlet stream and then, the combined streams are both cooled by a cooler positioned at the inlet of the adsorption sector of the drum before entering the adsorption sector. The process of adsorption is improved by cooler operating temperatures because the cooler feed gas results in a proportionally lower outlet dew point. Thus, by providing a cooler at the inlet of the adsorption sector, rather than at an upstream location, both the regeneration exhaust stream and the moist gas inlet stream are cooled concurrently, after they are combined, to provide a cooler feed stream into the adsorption sector. In this variation of the second preferred embodiment, the cooler for cooling the hot moist feed stream, which is typically located upstream, is repositioned at the inlet of the adsorption sector of the drum. Thus, a cooler inlet stream is provided for entry into the adsorption sector without requiring a second cooler for cooling the regeneration exhaust stream in addition to the cooler needed for cooling the moist feed stream.

In another variation of the second preferred embodiment, the process and system of the present invention include combining the devices for boosting the pressure of the regeneration exhaust stream and cooling the combined regeneration and inlet streams into a single apparatus. By combining the pressure-boosting device and the cooling device, the overall size of the invention is significantly reduced. If both the cooling device, such as, by way of example, a heat exchanger, and the pressure-boosting device, such as, by way of example, an air ejector or high speed blower, are arranged in a series flow, then both must be designed to withstand the maximum pressure of the system and process. However, if one is combined inside of the other, then the internal component can be designed without concern over retaining pressure and can be housed in a thin enclosure to reduce the size and weight. The density of the air within the pressure-boosting device is increased by locating this device inside of the cooling device, thus improving the performance of the pressure-boosting device of the present invention. In this variation of the second preferred embodiment, the pressure differential across the pressure-boosting device is very low allowing thin wall construction and lower weight of the pressure-boosting device housing. In addition, the two heat exchangers can be combined into a single duplex housing with appropriate internal partitions to reduce the size and weight of the apparatus.

In each of the preferred embodiments, the temperature difference between the temperature of the exhaust regeneration stream at the edge of the drum leaving the regeneration sector, entering the cooling sector, and the average temperature of the exhaust regeneration stream exiting the regeneration sector may be detected and utilized for controlling various operating conditions, including the rotational speed of the drum, the regeneration gas flow rate and/or the speed of the regeneration stream blower, to improve the performance of the rotating drum adsorber system. While it is possible to operate the rotating drum adsorber system by sensing a single temperature in the regeneration exhaust stream, there are many reasons for this temperature to vary under normal operating conditions and therefore, sensing a single temperature may fail to serve as a reliable and accurate basis for controlling the rotating drum adsorber system in an optimum manner to achieve the lowest outlet dew point. For example, the regeneration exhaust gas stream temperature may be affected by moisture loading, the inlet stream temperature, the inlet flow rate, the regeneration gas flow rate, the system pressure, heat losses and other system parameters.

A feature of the present invention is the use of a temperature differential, instead of a single temperature, based upon Applicant's discovery that the performance of the rotating drum adsorber system is optimized by sensing the temperature difference between the average temperature exiting the regeneration sector and the temperature exiting the leading edge of the drum in the regeneration sector and utilizing this temperature difference to control the various operating conditions of the system, including the adsorbent drum rotational speed, the regeneration gas flow rate and/or the speed of the blower system. Because the temperature differential is not affected by varied operating conditions, the process and system of the present invention provides optimum system performance and lowest outlet dew point regardless of changing, or a wide range of, operating conditions.

The rotating drum adsorber process and system of the present invention includes a computerized method for accurately predicting the contamination level of the gas stream exiting the adsorption sector and optimizing the performance and fractionation efficiency of the rotating drum adsorber system. The computerized method includes providing a proposed set of drum dryer design parameters and initial operating conditions, calculating predicted dew points at such conditions, determining temperature information from the regeneration and cooling sectors, and displaying the sector temperature profiles and discharge temperatures at predicted dew points for evaluation by an engineer for providing optimum performance of the system and achieving lowest effluent dew point. In the preferred embodiment, the method includes determining the average or mixed concentration discharging over the entire surface in the adsorption sector and the mixed stream discharge temperature exiting the cooling sector. The average or mixed discharge concentration in the adsorption sector may be determined utilizing classical adsorption equations:

$$J_o = 0.5\left[1 - \mathrm{erf}\left\{(N)^{\frac{1}{2}} - (NT)^{\frac{1}{2}}\right\}\right] \quad \text{(Nearly linear isotherm)} \quad (1)$$

$$J_o = 0.5\left[1 - \mathrm{erf}\left\{(N - NT)^{\frac{1}{2}}\right\}\right] \quad \text{(Nearly constant isotherm)} \quad (2)$$

where $$J_o = c_1/c_o \quad (3)$$

$$N = L/H_d \quad (4)$$

$$T = (c_o - c_1)(u_o\tau - V\epsilon)/[(n - n_i)\rho_a L A_x] \quad (5)$$

$c_1$: effluent contaminant concentration
$c_o$: influent contaminant concentration
N: Number of mass transfer units, dimensionless
T: Material balance ratio, solute adsorbed per adsorbent capacity
L: Adsorbent bed length
$H_d$: Mass Transfer Unit Height
$U_o$: Mass flow rate in adsorption sector
$\tau$: time in adsorption sector
V: Adsorbent bed volume in adsorption sector
$\epsilon$: Adsorbent bed void fraction
n: Adsorbent bed equilibrium capacity per unit weight
$n_i$: Initial concentration in adsorbent bed
$\rho_a$: Adsorbent bed density
$A_x$: Adsorption section cross sectional surface area Equation (1) is used with adsorbents characterized by nearly linear isotherms, such as, by way of example, silica gel and activated alumina. Equation (2) is used with adsorbents characterized by nearly constant isotherms, such as, by way of example, molecular sieves, or zeolites and activated titanium dioxide. In the cooling sector, Equation (1) is used to determine the temperature profile and the integration of this equation provides the mixed stream discharge temperature and the terms in Equation (1) are defined in terms of heat transfer:

$$J_o = (t - t_o)/(t_1 - t_o) \quad (6)$$

$$N = L/H \quad (7)$$

$$T = c_p(\tau_c u_c - V\epsilon)/(c_{pa}\epsilon_a L A_x) \quad (8)$$

t: discharge temperature
$t_o$: initial bed temperature
$t_1$: air inlet temperature
H: Heat Transfer Unit Height
$c_p$: heat capacity of gas
$\tau_c$: time in cooling sector
$u_c$: mass flow rate through cooling sector
V: Adsorbent bed volume in cooling sector
$c_{pa}$: heat capacity of adsorbent The time in the cooling sector, $\tau_c$, is equal to $((\phi_c/2\pi)/\text{rpm}$ where $\phi_c$ is the cooling sector angle in radians.

In the regeneration sector, prior to entering the cooling sector, two thermal fronts are established. The first thermal front approaches the equilibrium temperature where desorption occurs, and the second, lagging front approaches the elevated inlet temperature. The computerized method of the present invention illustrates the two thermal fronts and the time period for which the regeneration sector is at the equilibrium temperature in a graphical display of the regeneration temperature versus the time. This graph shows a double humped temperature curve which may be used to analyze the performance of the rotating drum adsorber system. After the first hump, there is a period when the temperature in the regeneration sector remains constant showing the equilibrium temperature. As long as some moisture remains in the regeneration sector, this temperature is constant. When the second hump begins, a given flute of the adsorbent drum is considered regenerated. The computerized method of the present invention allows a user to adjust various inlet conditions, such as inlet temperature, system pressure, flow rate, regeneration inlet temperature, regeneration flow rate and/or rotational speed of the drum, and easily generate regeneration temperature versus time graphs, at various conditions, to show rotating drum adsorbent system performance changes in response to such adjustments.

In addition, utilizing the computerized method of the present invention, a user may generate various graphical displays of data such as, by way of example, Cooling Temperature vs. Time, Cooling Temperature vs. Flute Length, Dew Point vs. Inlet Temperature, Dew Point vs. Regeneration Temperature, Dew Point vs. Regeneration Flow Rate, Dew Point vs. Motor Rotational Speed and Dew Point vs. Flow Rate, for controlling the operational conditions of the rotating drum adsorber system to improve its performance and achieve lowest effluent dew point.

In the preferred embodiment, the rotating drum adsorber process and system of the present invention includes a rotating desiccant impregnated wheel or drum contained within a shell including partitions which define the adsorption sector, the regeneration sector and the cooling sector to properly channel the various flow streams including the contaminated inlet stream, hot regeneration gas stream and coolant stream through the various process sectors. The drum continuously rotates through the various process sectors to process a contaminated feed stream therethrough for removing contaminants from the feed stream. Based on a relatively slow rotating speed, one to fifteen minutes per rotational cycle, the drum can advantageously be made quite small and of low weight and yet process a large contaminated feed flow rate in comparison to a long cycle fixed bed adsorbent system.

In order to prevent excessive flow leakage between the various sectors, rotating drum adsorber process and system includes a sealing process and system for sealing between the various process sectors of the partitioned shell. In the preferred embodiment, the pressure of the regeneration sector inlet is kept lower than the pressure of the adsorption sector outlet for preventing flow from the regeneration sector to the adsorption sector in the event of a leak for avoiding contamination of the adsorption sector. The greatest pressure difference exists between the regeneration gas outlet and the moist gas feed stream inlet. The sealing process and system includes sealing partitions which are formed to provide for and maintain an equal pressure loss across the regeneration sector and the adsorption sector. The sealing process and system includes providing a unique sealing material and positioning the material on the edges of the partitions to form seals between the sectors with minimal wear of the absorbent drum and providing excellent sealing quality, very low frictional resistance to the rotating drum face, chemical resistance, and thermal stability. In the preferred embodiment, the sealing material is a fluoropolymeric sheet and is preferably fastened to the sealing partition by a silicone gasket material which retains its flexibility under high temperature and in high pressure installations.

In addition, the sealing process and system of the present invention includes an arrangement for cooling the rotating drum all the way to the center of the drum to ensure that the entire portion of the drum entering the adsorption sector is cooled in the cooling sector prior to that portion of the drum entering the adsorption sector. The arrangement includes a unique alignment of the seals in which the partitions are formed to position one partition on the center line and the other partition inside the center line. Each partition seal has a predetermined width and includes an outer edge and an inner edge. In the preferred embodiment, the top partition is positioned such that the outer edge of the seal lines up with the center line of the drum and the bottom partition plate is positioned such that the inner edge of the seal lines up with the center line. If the top and bottom partitions are aligned on the same center line or above the center line, a portion of the absorbent drum near the center is blocked by the width of the partition seal and consequently this portion of the drum passes into the adsorption sector without cooling. Because the separation efficiency of the uncooled portion of the drum is reduced, this uncooled portion allows some contaminated gas to flow through the bed without adsorption taking place thereby contaminating the effluent stream. By utilizing a unique placement of the partitions, the present invention eliminates this problem and ensures that all of the effective adsorbent bed is cooled prior to entering the adsorption sector.

The rotating drum adsorber process and system of the present invention also includes a process and system for supporting and rotating the adsorbent drum within the containment shell. The process includes fixing and attaching a bottom seal plate to the walls of the containment shell and providing an adjustable top seal plate, the top seal plate having part of its circumference area cut away such that there is less area which must be flat to form a seal thereby providing a better seal. In the preferred embodiment, the bottom seal plate includes two round rods attached thereto and extending upward above the upper surface of the drum and the rods support the drum positioning rollers which may be located along any portion of the rods and are preferably located at the middle of the rotating drum. The top seal plate is preferably spring-loaded onto the rods and the spring loaded top seal plate bears down on the drum and is adjustable to slightly variant drum lengths by sliding upward or downward on the two retaining rods. While the top seal plate is preferably spring loaded, it may be positioned on the drum in any suitable manner.

In the preferred embodiment, the process and system for supporting and rotating the adsorbent drum within the containment shell includes a belt drive system designed for operation at elevated pressure and eliminates the alignment problem and tendency of the drum to jam and motor shaft to break which may be found in prior art shaft driver systems. In the preferred embodiment, the belt drive system includes an external motor drive, an adjustable inner belt, a locking lever, an access port, a driver piping tee or housing mounted on the drum shell, and an eccentric adjuster installed at the bottom of the piping tee or housing. The external motor drive is coupled with the inner belt inside the reducing tee for rotating the adsorbent drum. The eccentric adjuster is fixed in place but may be alternatively secured by springs connecting the adjuster to the bottom of the piping tee or housing.

In the preferred embodiment, the belt drive system includes means for adjusting the inner belt from outside the pressure boundary without depressurizing the system. In addition, the adjustable inner belt maintains a constant contact area with the adsorbent drum to provide consistent belt tension and drum roller loading. The belt drive system also includes means for limiting the maximum belt tension by varying the locking lever length. Another advantage of the belt drive system is that the access port on the top of the drive tee provides easy access for installing the drive belt without disturbing other parts of the drive system. In addition, the access port closure includes means for preventing the removal of the closure while the system is under pressure for safer operation while allowing ready removal of the closure when the system is depressurized.

A feature of the present invention is the process and system utilizing a uniquely designed high speed blower to increase the pressure of the regeneration exhaust stream for combining it with the higher pressure moist gas inlet stream. The high speed blower includes a blower fan, electrical controls and a motor. The motor is preferably enclosed with the blower fan in the high pressure housing to avoid having to install a high speed seal or gland to maintain the pressure boundary as would be required with an external motor. In the preferred embodiment, the blower is a high speed blower (5,000 to 30,000 rpm) which has a fan with a much smaller diameter impeller and preferably includes backward curved centrifugal impeller vanes for yielding high flow rates at high differential pressure. The motor is preferably a brushless direct current (DC) motor which provides long life and the high speed required to operate blower successfully and can be operated by various speed control sensors. Alternatively, a synchronous speed AC motor and gear drive or Variable Frequency AC motor drive with a controller for increasing the frequency of the AC power may be used.

In order to protect the blower's electrical controls from the heat and high pressure conditions, the present invention includes separately housing and mounting the electrical controls external from the blower/motor casing in a blower motor controller assembly enclosure. However, position-sensing or speed-sensing devices, such as Hall Effect switches, and any ceramic filter capacitors which are used, are located on the motor, not with the electrical controls. The electrical controls are preferably controlled by a relay which is energized through a fuse and a series of relay contact switches. The speed of the blower motor is preferably controlled by a speed adjustment device, such as, by way of example, a 0–10 VDC signal which comes from a +10 VDC power supply or a potentiometer. In the preferred embodiment, the electrical connections to the blower motor controller utilize a small PC board with electrical wires attached and epoxied into a pipe fitting for electrical feed throughs for preventing a flow passage through the wiring insulation and preventing an electrical short. In addition, the electrical connections are positioned utilizing a piping elbow and placing it in a rocker position to retain the liquid epoxy during the pouring operation in production. In the preferred embodiment, the speed adjustment device of the blower motor controller is easily accessible and is preferably top mounted, to provide better access for adjusting speed of the blower. In the preferred embodiment, the feedback connections from the Hall Effects to the blower motor controller are made by fiber optic signal cables in order to avoid the effects of electromagnetic interference on the connections. However, the present invention also optionally includes a voltage regulator which operates at a lower voltage thereby creating less noise and providing a more stable operation.

A feature of the blower motor controller of the present invention is a means for adjusting the speed of the blower motor to adjust the amount of pressure boost provided by the blower. There is a direct relationship as to the required speed of the blower motor and a certain pressure in the housing or chamber where the blower is located. Thus, the speed may be adjusted to meet the pressure conditions at a particular location to optimize the performance of the rotating drum adsorber system and process. The means for adjusting the speed of the blower motor to a particular pressure may also include means for automatically controlling the speed of the blower, such as, by way of example, a pressure transducer connected to a microprocessor. In addition, the invention may include means for monitoring the temperature of the air in the chamber, such as, by way of example, a temperature sensor, for automatically fine tuning the required blower speed. In the preferred embodiment, the means for adjusting the speed of the blower motor is a device which counts each pulse of one of the Hall Effect sensors and utilizes a frequency meter or monitor to count the number of pulses per second. By multiplying the number of pulses per second by 30, the speed of the blower motor is determined. When a microprocessor is included, the speed of the blower motor is displayed in RPM on an alphanumeric display. Because the pressure boost is a mathematical function of the speed, once the speed of the blower motor is determined, the pressure boost provided by the blower motor at that speed can be calculated. Thus, the speed of the blower motor can be readily readjusted to provide the pressure boost needed under any operating conditions for optimum performance of the rotating drum adsorber system and process.

The blower motor controller assembly enclosure of the preferred embodiment further includes a heat conducting device for conveying the heat generated on the electrical board through the wall of the enclosure to externally mounted heat radiating fins. The blower motor controller of the present invention may also include a fan located on the inside of the enclosure to cool down the heat sink. In addition, the blower motor controller assembly includes a means for determining whether the Hall Effect switches are operational. If fiber optic signal cables are utilized, the light signals generated may be viewed directly. If conventional electrical wires are instead utilized, the preferred means is a Hall Effect tester which tests the Hall Effect switches and provides a good quality control device to check whether the motor is alert, without power to the motor.

In addition to its application in the rotating drum adsorber process and system, the uniquely designed high speed blower of the present invention may also be used on multi-chamber dryers, such as, by way of example, captive loop regeneration systems or externally heated thermal swing dryers, in which regeneration is accomplished at elevated pressure, and the small size of the high speed blower is advantageous. The increased blower speed reduces the size of the fan required to achieve the necessary flow rate. The smaller size fan results in a lower containment vessel cost, and because the fan wheel is smaller and lighter, it has less bearing load and longer life. Typically, the high speed blower bearing life is 20,000 to 80,000 hours compared to 10,000 to 20,000 hour life typical in larger blower size applications. The smaller size is also advantageous in dryers regenerated at atmospheric pressure, such as, by way of example, the internally heated thermal swing dryer.

The rotating drum adsorber system of the present invention includes means for controlling the operating conditions of the system to attain maximum performance and, where moisture is being removed, to achieve the lowest product dew point. In a preferred embodiment, the means for controlling is a temperature sensing and control system which includes a temperature sensor designed to detect the temperature difference between the temperature of the regeneration stream exiting the leading edge of the drum leaving the regeneration sector, and the equilibrium or average temperature of the regeneration stream exiting the bulk of the regeneration sector. The temperature difference may be used to control either the rotational speed of the drum, the flow rate of the regeneration stream via control of the gas control valve position, the blower speed or any combination of these conditions. The temperature sensing and control system also includes an electronic controller for automatically controlling the drum rotational speed, the flow rate of the regeneration stream and/or the blower speed.

The temperature sensor is preferably a pair of temperature detectors, such as, by way of example, two thermisters, two RTD's (resistance temperature detectors) or a pair of any other type of temperature sensors. To sense the temperature at the outlet of the leading edge of the regeneration sector, a short flow conduit is installed in the dryer head or closure. The short flow conduit may be a tube or a pipe mounted on the head or preferably on the partition wall. One end of the conduit is located close to, but not necessarily touching the drum, and the other end of the conduit is open to allow a small portion of the outlet regeneration stream to pass through the conduit and subsequently enter the head where it is blended in with the outlet moisture ladened air. The temperature sensor is inserted through a pressure tight glad or a thermowell into the flow conduit to sense the temperature at the leading edge. Another temperature sensor is added to the head or shell at the outlet of the regeneration sector and its value is compared to the temperature of the leading edge. The temperature difference established by the two sensors is used to control the operating conditions of the system. The temperature sensors may be connected to an electronic board containing a microprocessor and the output from the electronic board is used to control the drum rotational speed, the regeneration gas control valve position, the blower speed or a combination of these operations.

In addition, the present invention includes an electrical system and method for monitoring and controlling the rotating drum adsorber process and system. The electrical system and method includes electrical controls housed in two separate enclosures including a system controller enclosure and a blower motor controller assembly enclosure. While the electrical controls of the invention are preferably housed in two separate enclosures, the system controller and blower motor controller assembly may, alternatively, be housed in one enclosure. In the preferred embodiment, the electrical system is constructed either from electrical components or from solid state devices installed on a PC board. The main components of the system are the electrical controls; a cooler fan controlled by a 120 VAC contactor which has adjustable thermal trip points and wiring that comes from the high tension enclosure; the drum motor for rotating the adsorbent drum, which may be a belt-drive DC motor controlled by an AC-to-DC controller which is fed 120 VAC through a series of relay contact switches from the blower motor controller assembly; a high speed blower motor controlled by a blower motor controller which is energized through a fuse and a series of relay contact switches; a plurality of sensors, indicators, automated valves, and the like; and power distribution facilities.

Because operation of the blower is required for regeneration of the rotating drum, the electrical system and method of the present invention includes means for indicating a blower motor fault. In addition, the electrical system and method of the present invention includes means for indicating a high cooler discharge temperature to protect the motor against excess heat and means for indicating a high separator level to prevent flooding the motor in water. Since the blower is located within a sealed housing or chamber and therefore is not visible, the present invention includes a current sensor for determining whether the blower is turning. In the preferred embodiment, the operation of the current sensor indicates that the power is on and activates an alert signal which monitors the blower motor for detecting a blower motor fault. If no power signals are received from the blower motor within a predetermined period of time, a blower motor fault is indicated. In operation, a blower motor fault light comes on, an alarm is sounded and the blower motor will stop turning. The means for indicating a high cooler discharge temperature include a temperature sensing device which monitors the temperature and activates a temperature signal when a predetermined temperature is reached. When the temperature signal is activated, the high cooler discharge temperature light turns on, an alarm is sounded, the blower motor is turned off and the blower-on light is turned off.

A feature of the electrical system and method of the present invention is the means for monitoring the fill level of the separator drain and indicating a high separator level. In the preferred embodiment, the invention includes a drain valve back-up system having a primary drain valve, a secondary drain valve and a liquid level signal in communication with a liquid level device in the primary drain. In operation, the liquid level signal is activated in response to a high level of liquid in the primary drain valve and a high separator level light is turned on. Following the activation of the liquid level signal, there is a timed delay while the liquid is directed to the secondary drain valve. If the high liquid level in the drain is sufficiently reduced during the timed delay, no further responses are activated and the electrical system continues normal operations. However, if after the timed delay expires, the high separator level signal continues to indicate a high level of water, the rotary drum motor is turned off and the on light is turned off. Before operations will continue, the liquid level device must be returned to its original position and the drum motor must be restarted. This back-up system advantageously monitors the level of water to prevent water damage to the rotating drum. These monitoring and alarm indicators of the electrical system of the present invention are unique because such an alarm system has not heretofore been used in connection with a rotating drum adsorber system or process.

The present invention includes a process for removing water vapor from a moist gas feed stream utilizing a cooling and pressurization combination apparatus and a rotating drum of adsorbent medium, the combination apparatus having a cooling device and a pressure-boosting device and the drum having an adsorption sector and a regeneration sector, the process comprising the steps of directing the moist gas feed stream through the adsorption sector; diverting a first portion of the adsorption sector exhaust stream through the regeneration sector; directing the regeneration sector exhaust stream through the combination apparatus; cooling the regeneration sector exhaust stream in the combination apparatus; increasing the pressure of the regeneration sector exhaust stream in the combination apparatus; combining the regeneration sector exhaust stream with the moist gas feed stream; and passing the combined stream through the adsorption sector.

In a feature of this process, the process further includes the step of locating the pressure-boosting device inside of the cooling device for increasing the density of the air within the pressure-boosting device and improving the performance of the pressure-boosting device. In another feature of this process, the process further includes the steps of cooling the regeneration sector exhaust stream prior to directing it to the single combination apparatus; providing a cooling sector in the rotating drum; and removing water from the regeneration sector exhaust stream in the separator. In another feature of this process, the process further includes the steps of providing a cooling sector in the rotating drum; diverting a second portion of the adsorption sector exhaust stream through the cooling sector; and combining the cooling sector exhaust stream with the regeneration sector exhaust stream. In another feature of this process, the process further includes the step of cooling the combined stream prior to passing it through the adsorption sector. In another feature of this process, the process further includes the step of determining temperature information representative of the regeneration sector exhaust stream. In another feature of this process, the process further includes the step of utilizing the temperature information to control the operation of the rotating drum adsorber system. In another feature of this process, the process further includes the step of utilizing the temperature information to control the operation of the rotating drum system includes controlling at least one of the following: the rotational speed of the drum, the flow rate of the second portion of the moist gas feed stream to the regeneration sector or the magnitude of the increase in pressure of the regeneration sector exhaust stream.

The present invention further includes a rotating drum adsorber system for fractionating fluids comprising a rotating drum adsorber including a shell having partitions which define an adsorption sector and a regeneration sector and a drum of adsorbent medium which continuously rotates through the sectors, the drum being located within the shell; a belt driven drum rotational system for imparting a rotational force to the drum; a drum support system for maintaining the position of the drum as it rotates; a sealing system to prevent excessive flow leakage between the sectors; means for increasing the pressure of the regeneration sector exhaust stream; and an electrical system for monitoring predetermined parameters of the adsorber system and controlling the operation of at least one of the rotating drum adsorber, the belt driven drum rotational system, the drum support system or the pressure-increasing means as a function of the monitored parameters.

In a feature of this system, the means for automatically controlling the system is a temperature sensing and control system including a temperature sensor for determining the temperature difference between the temperature of the regeneration sector exhaust stream at the edge of the drum leaving the regeneration sector and the average temperature of the regeneration sector exhaust stream.

The present invention further includes a method for predicting and optimizing performance of a rotating drum adsorber system of the type including a rotating drum of adsorbent medium having a plurality of sectors, the method comprising the steps of providing a proposed set of rotating drum adsorber design parameters and initial operating conditions; calculating predicted dew points at said parameters and initial operating conditions; determining temperature information representative of conditions in at least one of the plurality of sectors; and displaying graphical data corresponding to the calculated dew points for evaluation for controlling operational conditions of the rotating drum adsorber system.

In a feature of this method, the step of displaying graphical data includes graphically displaying a temperature profile for at least one sector at the predicted dew point. In another feature of this method, the plurality of sectors includes at least an adsorption sector through which a first gas stream flows and a cooling sector through which a second gas stream flows, and the step of determining the temperature information includes determining the average concentration of contaminants in first stream in the adsorption sector and determining the average temperature of the second gas stream exiting the cooling sector. In another feature of this method, the plurality of sectors further includes a regeneration sector, the step of displaying a temperature profile for at least one sector includes graphically displaying two thermal fronts in the regeneration sector, prior to entering the cooling sector, and the time period for which the temperature in the regeneration sector remains generally constant. In another feature of this method, the method further includes the steps of adjusting the initial operating conditions and design parameters on the basis of the graphical data; and repeating the calculating, determining and displaying steps. In another feature of this method, the step of displaying graphical data includes displaying graphical data of the temperature in the regeneration sector over time, the temperature in the regeneration sector corresponding to the adjusted initial operating conditions and design parameters.

The present invention further includes a rotating drum adsorber for removing contaminants from a contaminated feed stream, the rotating drum adsorber comprising a shell including a plurality of partitions defining an adsorption sector and a regeneration sector for channeling the feed stream therethrough; a desiccant-impregnated drum contained within the shell and adapted to rotate substantially continuously through the sectors; and means for controlling at least one operating conditions of the rotating drum adsorber, the operating conditions including at least the following: the rotational speed of the drum, the flow rate of the second portion of the moist gas feed stream to the regeneration sector or the magnitude of the increase in pressure of the regeneration sector exhaust stream.

In a feature of this adsorber, the regeneration sector has a leading edge, and the means for controlling includes a temperature sensing and control system having a temperature differential sensor adapted to detect the temperature difference between the temperature of the regeneration sector exhaust stream at the leading edge of the regeneration sector and the equilibrium temperature of the regeneration sector exhaust stream, the leading edge being defined at any given time as the portion of the drum having the longest residency in the regeneration sector. In another feature of this adsorber, the regeneration sector has an outlet, and the temperature differential sensor includes a plurality of temperature detectors, a first detector being positioned to detect the regeneration sector exhaust stream temperature at the leading edge of the regeneration sector and a second detector being positioned at the outlet of the regeneration sector for detecting the equilibrium regeneration sector exhaust stream temperature whereby the temperature differential established by the two detectors is utilized to control at least one of the operating conditions of the rotating drum adsorber. In another feature of this adsorber, the temperature differential sensor is operatively connected to an electronic controller for controlling at least one of the operating conditions of the rotating drum adsorber. In another feature of this adsorber, the electronic controller includes an electronic board having a microprocessor, and the output from the electronic board is used to control at least one of the operating conditions of the rotating drum adsorber. In another feature of this adsorber, the plurality of partitions further define a cooling sector between the regeneration sector and the adsorption sector.

The present invention further includes a sealing system for a rotating drum adsorber having a shell, a rotating adsorbent drum mounted within the shell, and a partition defining at least two sectors, the partition having an edge substantially adjacent the drum, wherein the sealing system comprises a sealing material positioned on at least one partition edge to form a partition seal between the drum and the partition; and means for fastening the sealing material to the partition edges.

In a feature of this sealing system, the sealing material is a fluoropolymeric sheet. In another feature of this sealing system, the sealing material is a material selected from the group consisting of Teflon®, PFA (fluorinated ethylene perfluoroalkyl vinyl ether copolymer), PTFE (a polymer of tetrafluoroethylene monomer), and FEP. In another feature of this sealing system, the means for fastening the sealing material to the partition edges is a silicone gasket material. In another feature of this sealing system, the partitions include a top partition and a bottom partition and the sealing material is positioned thereon to form a top partition seal and a bottom partition seal. In another feature of this sealing system, at least two partition seals are formed, a first partition seal being aligned with a first line extending radially from the axis of rotation of the drum and a second partition seal being aligned with a second line, the first and second lines being co-planar and the second line being offset from the first line. In another feature of this sealing system, the first partition seal is a top partition seal and the second partition seal is a bottom partition seal, and each partition seal has a predetermined width and includes an outer edge and an inner edge, and wherein the outer edge of the top partition seal is generally aligned with the first line and the inner edge of the bottom partition seal is generally aligned with the second line, the alignments defining a third sector of the drum. In another feature of this sealing system, the at least two sectors include a regeneration sector and an adsorption sector, and the third sector is a cooling sector.

The present invention further includes a sealed multi-sector rotational drum adsorber system, the system comprising a rotating adsorbent drum, the drum defining at least one face having a plurality of drum surfaces; a partition plate for defining a plurality of drum sectors, the partition plate being positioned adjacent one of the drum faces, and the partition plate including a sealing member for sealing the interface between the partition plate and the drum; and a filler material added to at least some of the drum surfaces for enhancing the sealing of the interface between the sealing member and the drum.

In a feature of this system, the drum further includes a plurality of flutes, wherein an end of each flute is substantially co-planar with a drum face, wherein the filler material is coated on the ends of the flutes to form a sealing rim, and wherein the sealing member seals the interface between the partition plate and the sealing rim. In another feature of this system, the filler material is a polymeric material.

The present invention further includes a multi-sector rotational drum adsorber system, the system comprising a drum having first and second generally circular faces, the first face defining a first area; a partition plate for defining a plurality of drum sectors, the partition plate being positioned substantially adjacent the first drum face, and the partition plate including a sealing member for sealing the interface between the partition plate and the drum, the sealing member defining the perimeter of a second area, the second area being substantially smaller than the first area and lying within the first area.

In a feature of this system, the sealing member includes at least two generally radial portions extending from an intersection substantially near the center of the first drum face to the perimeter of the first drum face, and a perimeter portion extending substantially along the perimeter of the first drum face between the open ends of the generally radial portions. In another feature of this system, the drum and the partition plate are arranged to be moved rotationally with respect to each other. In another feature of this system, the system further includes a containment shell, wherein the drum and partition plate are positioned within the containment shell. In another feature of this system, the drum further includes a plurality of flutes extending generally between the first and second drum faces, wherein an end of each flute is substantially co-planar with the first drum face, and wherein the sealing member seals the interface between the partition plate and the first drum face flute ends. In another feature of this system, the sealing member is at least as wide as the widest end of a flute in the first drum face so that the widest end may be completely covered by the sealing member. In another feature of this invention, the sealing member is formed integrally with the partition plate. In another feature of this invention, the sealing member is formed from a sealing material, the sealing material being a fluoropolymeric sheet fastened to the partition plate with a silicone gasket material.

The present invention further includes a multi-sector rotational drum adsorber system, the system comprising a drum having first and second generally circular faces, the first face defining a first area, and the second face defining a second area; a first partition plate positioned substantially adjacent to the first drum face, the first partition plate defining the perimeter of a third area, the third area lying within the first area; and a second partition plate positioned substantially adjacent to the second drum face, the second partition plate defining the perimeter of a fourth area, the fourth area lying within the second area, and the fourth area being completely overlapped by the third area.

In a feature of this drum adsorber system, the drum further comprises a plurality of flutes extending generally between the first and second drum faces, wherein a first end of each flute is substantially co-planar with the first drum face and a second end of each flute is substantially co-planar with the second drum face, and wherein the first and second partition plates partition the flutes into at least three sectors. In another feature of this drum adsorber system, the system further includes a containment shell, wherein the drum and first and second partition plates are installed within the containment shell. In another feature of this drum adsorber system, the fourth area defines a first sector of flutes, wherein the portion of the third area which does not overlap the fourth area defines a second sector of flutes, wherein the portion of the first area which does not overlap the third area defines a third sector of flutes, and wherein an air path exists from the first sector through the second sector to the third sector. In another feature of this drum adsorber system, the drum is arranged to be rotated relative to the first and second partition plates.

The present invention further includes a system for supporting a rotating adsorbent drum within a containment shell comprising a bottom plate attached to the containment shell, the bottom plate being sealed to the bottom of the drum; an adjustable top plate sealed to the top of the drum; at least one retaining rod attached to the bottom plate and extending upward above the rotating drum; and at least one drum positioning roller located on the retaining rod adjacent to the drum and arranged to maintain the lateral position of the drum while the drum rotates.

In a feature of this system, the top plate is downwardly-biased onto the drum and wherein said top plate is vertically adjustable to accommodate slightly variable drum heights. In another feature of this system, the top plate may be adjusted by sliding upward or downward on the rod. In another feature of this system, the top plate is downwardly biased by a spring mounted on the end of the rod.

The present invention further includes a belt drive system for rotating a drum in a rotating drum adsorber system, the rotating drum adsorber system including a pressurized container apparatus, the interior of the pressurized container apparatus defining a pressurized region, the belt drive system comprising an inner belt interoperatively connected to the drum for imparting motive force to the drum, the inner belt being located entirely within the pressurized region; a drive shaft interoperatively connected to the inner belt for imparting motive force to the inner belt; and an external motor drive interoperatively connected to the drive shaft for imparting motive force to the drive shaft, the external motor drive being located outside the pressurized region.

In a feature of this belt drive system, the external motor drive includes a motor and an external belt for transferring motive force from the motor to the drive shaft. In another feature of this belt drive system, the system further includes an adjustment apparatus disposed to engage the inner belt for varying the amount of tension in the inner belt. In another feature of this belt drive system, the adjustment apparatus includes a control member located at least partly outside the pressurized region to permit the tension in the inner belt to be controlled from outside the pressurized region. In another feature of this belt drive system, the adjustment apparatus includes a locking lever extending from within the pressurized region to the exterior of the pressurized region. In another feature of this belt drive system, the adjustment apparatus includes an eccentric adjuster operatively connected to the drive shaft for controlling the location of the drive shaft. In another feature of this belt drive system, the drive shaft is arranged to rotate within the eccentric adjuster about a first axis of rotation, wherein the location of the drive shaft may be controlled by rotating the eccentric adjuster about a second axis of rotation. In another feature of this belt drive system, the adjustment apparatus further includes a locking lever, wherein the angular position of the eccentric adjuster about the second axis of rotation may be varied by manipulating the locking lever. In another feature of this belt drive system, the system further includes a means for adjusting the inner belt from outside the pressurized region without depressurizing the rotating drum adsorber system. In another feature of this belt drive system, the system further includes a tensioning device interposed along the belt between the adjustment apparatus and the drum and arranged to maintain a constant contact area between the belt and the drum as the adjustment apparatus is adjusted.

The present invention also includes a method of rotating a drum in a rotating drum adsorber system, the drum being mounted within a pressurized container, wherein the method comprises the steps of providing a drive shaft; installing an inner belt within the pressurized container to interoperatively connect the drive shaft to the drum; and imparting motive force to the drive shaft.

In a feature of this method, the method further includes the step of providing an external motor drive outside the pressurized container, and wherein the step of imparting motive force includes imparting motive force from the external motor drive to the drive shaft. In another feature of this method, the method further includes the step of pressurizing the pressurized container after the step of installing the inner belt. In another feature of this method, the method further includes the step of depressurizing the pressurized container before installing the inner belt. In another feature of this method, the method further includes the step of providing an access port on the pressurized container, and wherein the step of installing the inner belt includes the step of opening the access port for providing access to the inner belt. In another feature of this method, the method further includes the step of depressurizing the pressurized container before opening the access port. In another feature of this method, the method further includes the step of pressurizing the pressurized contained for preventing the access port from being opened. In another feature of this method, the pressurized container includes a shell for containing the drum and a belt drive housing mounted on the side of the shell, and the step of providing a drive shaft includes providing a drive shaft within the belt drive housing. In another feature of this method, the method further includes the step of adjusting the tension of the inner belt from outside the pressurized container without depressurizing the pressurized container. In another feature of this method, the step of adjusting the tension includes changing the position of the drive shaft. In another feature of this method, the step of changing the position of the drive shaft includes the steps of providing a locking lever operatively connected to the drive shaft; and adjusting the position of the locking lever.

The present invention further includes a pressure-boosting apparatus for use with an adsorber system, the apparatus comprising a pressurized housing into which a gas stream flows under pressure; and a blower for increasing the pressure of the gas stream within the adsorber system, the blower having a motor, and the blower motor being enclosed within the pressurized housing.

In a feature of this pressure-boosting apparatus, the blower motor is a brushless motor. In another feature of this pressure-boosting apparatus, the blower is adjustable to operate at speeds ranging from about 5000 revolutions per minute to about 30,000 revolutions per minute. In another feature of this pressure-boosting apparatus, the gas stream carries a quantity of condensed liquid, and the pressurized housing further includes a separator for removing at least a portion of the condensed liquid from the gas stream.

The present invention also includes an apparatus for blowing gas within a pressurized housing in an adsorber system, the apparatus comprising a blower motor mounted within the pressurized housing; a blower motor controller for controlling the operating speed of the blower motor, the blower motor controller being positioned outside the pressurized housing.

In a feature of this apparatus, the pressurized housing includes a pressurization region in which the relative pressure may be substantially greater than atmospheric pressure, and wherein the blower motor is located within the pressurization region. In another feature of this apparatus, the apparatus further includes a fan operatively connected to the blower motor for increasing the relative pressure within the pressurization housing. In another feature of this apparatus, the blower motor controller includes a heat conducting device for directing heat away from the blower motor controller. In another feature of this apparatus, the blower motor is a brushless motor.

The present invention also includes a seal-off apparatus for completing an electrical connection through a vessel wall, the apparatus comprising a conduit communicatively connecting one side of the vessel wall with the opposite side of the vessel wall; a board inserted within the interior of the conduit, the board including first and second connection points, the connection points being electrically connected to each other; a first wire extending outwardly from a first end of the conduit, the first wire being electrically connected to the first connection point on the board; a second wire extending outwardly from a second end of the conduit, the second wire being electrically connected to the second connection point on the board; and a sealant surrounding the connections between the first and second wires and the board, the sealant preventing substantially all fluid communication through the conduit.

In a feature of this apparatus, the conduit is a pipe fitting. In another feature of this apparatus, the pipe fitting is an elbow fitting. In another feature of this apparatus, the first end of the conduit has a first axis and the second end of the conduit has a second axis, and the first axis and the second axis are generally perpendicular to each other. In another feature of this apparatus, the board is a printed circuit board. In another feature of this apparatus, the sealant is a liquid epoxy.

The present invention also includes a seal-off apparatus for connecting a cable device through a vessel wall, the apparatus comprising a conduit extending through the vessel wall, wherein the conduit has a first end and a second end, wherein the first end of the conduit defines a first axis and the second end of the conduit defines a second axis, and wherein the first axis and the second axis are substantially perpendicular to each other; a first cable end extending outwardly from the first end of the conduit; a second cable end extending outwardly from the second end of the conduit, the second cable end being communicatively connected through the conduit to the first cable end; and a sealant filling at least a portion of the interior of the conduit, the sealant preventing substantially all fluid communication through the conduit.

In a feature of this apparatus, the cable device includes an electrical wire connected between the first and second cables. In another feature of this apparatus, the cable device includes a fiber optic cable connected between the first and second cable ends. In another feature of this apparatus, the apparatus further includes a printed circuit board positioned within the interior of the conduit. In another feature of this apparatus, the device includes a first wire attached to a first connection point on the printed circuit board and a second wire attached to a second connection point on the printed circuit board.

The present invention also includes a method of manufacturing a seal-off for use in completing a communications connection through a vessel wall, the method comprising the steps of inserting a cable device through a conduit, the conduit having a bend interposed between two distal conduit ends; orienting the conduit in a rocker position in which the bend points downward; and filling at least a portion of the interior of the conduit with a sealant such that substantially all fluid communication through the conduit is prevented; whereby a signal may be transmitted through the seal-off via the communications connection without permitting a fluid to be transmitted through the seal-off.

In a feature of this method, the step of inserting a cable device includes the step of inserting an electrical wire into the conduit. In another feature of this method, the step of inserting a cable device includes the step of inserting a fiber optic cable into the conduit. In another feature of this method, the step of inserting a cable device includes the steps of inserting a first electrical wire into one of the distal conduit ends, inserting a second electrical wire into the other distal conduit end and inserting a printed circuit board into the conduit, and the method further includes the steps of electrically connecting the first and second electrical wires to the printed circuit board; and positioning the printed circuit board within the interior of the conduit. In another feature of this method, the method further includes the step of sandblasting the interior of the conduit for ensuring an effective seal between the sealant and the conduit, the sandblasting step occurring before the step of filling at least a portion of the interior with a sealant.

The present invention also includes a motor system for use in a adsorber system, the motor system comprising a motor assembly, the motor assembly including a motor, means for determining real-time status information about the motor; and a first fiber optic connector for transmitting a light signal representing the real-time motor status information; a motor controller operatively connected to the motor, the motor controller including a second fiber optic connector for receiving the light signal; and a fiber optic cable connected between the first and second fiber optic connectors for carrying the light signal between the motor assembly and the motor controller.

In a feature of this motor system, the motor assembly has a rotor, and the real-time motor status information describes the current angular position of the rotor. In another feature of this motor system, the adsorber system includes a blower fan for increasing the pressure of a gas stream, and the blower fan is operatively connected to the motor assembly.

The present invention also includes a method for controlling a motor system in an adsorber system, the motor system including a motor assembly and a motor controller, a portion of the motor assembly being rotatable through a plurality of angular positions, wherein the method comprises the steps of detecting the angular position of a portion of the motor assembly; generating a status signal corresponding to the detected angular position; transmitting the status signal from the motor assembly to the motor controller; generating a control signal as a function of the status signal; transmitting the control signal from the motor controller to the motor assembly; and operating the motor assembly as a function of the control signal.

In a feature of this method, the motor assembly includes a rotor having a rotational axis, and the step of detecting the angular position includes detecting the angular position of the rotor relative to the rotational axis. In another feature of this method, the method further includes the step of providing a Hall effect sensor adjacent to the rotor, and the step of detecting includes determining when the rotor passes by the Hall effect sensor. In another feature of this method, the motor assembly includes a coil and the step of operating the motor assembly as a function of the control signal comprises energizing the coil to cause the rotor to rotate.

The present invention also includes a drain system for draining liquid from a separator in an adsorber system, the drain system comprising a drain valve for alternatively prohibiting and permitting the flow of the liquid from within the separator; a timer for periodically opening the drain valve; and a liquid level sensor for opening the drain valve.

In a feature of this drain system, the timer periodically opens the drain valve to permit liquid to flow from within the separator for a predetermined period of time. In another feature of this drain system, the liquid level sensor opens the drain valve to permit liquid to flow from within the separator upon determining that liquid within the separator has reached a predetermined level.

The present invention also includes a drain system for draining liquid from a separator in an adsorber system, the drain system comprising a first drain valve for alternatively prohibiting and permitting the flow of the liquid from within the separator; a second drain valve for alternatively prohibiting and permitting the flow of the liquid from within the separator; a timer for periodically opening the first drain valve; and a liquid level sensor for opening the second drain valve.

In a feature of this drain system, the timer periodically opens the first drain valve to permit liquid to flow from within the separator for a predetermined period of time. In another feature of this drain system, the liquid level sensor opens the second drain valve to permit liquid to flow from within the separator upon determining that liquid within the separator has reached a predetermined level.

The present invention also includes a system for removing contaminants from a first gas stream, the first gas stream having a first pressure level, the system comprising: an adsorber apparatus, the adsorber apparatus producing a second gas stream having a second pressure level; and a pressure controller assembly for equalizing the pressure level of the second gas stream to the first pressure level, the pressure controller assembly including a plurality of rotating fan blades, the pressure of the second gas stream being generally proportional to the rotational speed of the fan blades; a motor operatively connected to the fan blades, the rotational speed of the fan blades being controlled by the motor; and a controller assembly for controlling the operation of the motor, the controller assembly including a speed adjustment device for adjusting the rotational speed of the fan blades by adjusting the operation of the motor.

In a feature of this system, the speed adjustment device includes a potentiometer. In another feature of this system, the speed adjustment device may be manually controlled. In another feature of this system, the speed adjustment device may be controlled by a microprocessor. In another feature of this system, the pressure controller assembly further includes a pressure transducer for determining a detected pressure level of the second gas stream, the speed adjustment device being controlled by the microprocessor as a function of the detected pressure level. In another feature of this system, the pressure transducer is connected downstream from the fan blades.

The present invention also includes a motorized apparatus for collecting a quantity of liquid separated from a gas stream, the apparatus comprising a housing into which the gas stream flows, the housing for collecting the liquid; a motor supported within the housing for urging the gas stream out of the housing; a sensor for sensing the quantity of liquid within the housing; and an electrical control system connected between the sensor and the motor for deactivating the motor when the quantity of liquid within the housing reaches a predetermined magnitude.

In a feature of this apparatus, the electrical control system includes a switch for triggering the deactivation of the motor, and the switch is triggered when the liquid reaches the predetermined magnitude. In another feature of this apparatus, the motor apparatus further includes a drain system for draining liquid from the housing. In another feature of this apparatus, the drain system begins draining liquid from the housing when the quantity of liquid within the housing reaches a predetermined magnitude.

The present invention also includes an electrical system for controlling the operation of a rotary drum adsorber system having a plurality of elements, the electrical system comprising a rotary drum motor; a blower motor; a plurality of input connections, each input connection for receiving at least one electrical signal indicative of an operating condition of the adsorber system, the operating condition being one of the following: the operational status of one of the elements of the adsorber system, a temperature condition in the adsorber system, a liquid level condition in the adsorber system, a pressure condition in the adsorber system or an angular position of an element of the adsorber system; a first power supply connection for distributing power to the rotary drum motor in response to at least one operating condition reaching a predetermined state; and a second power supply connection for distributing power to the blower motor in response to at least one operating condition reaching a predetermined state.

In a feature of this electrical system, the rotary drum adsorber system includes a pressurized housing, and the blower motor is enclosed within the pressurized housing. In another feature of this electrical system, a cooling device having an electrically operated fan is provided for removing heat from the cooling device, and a third power supply connection is provided for distributing power to the cooling device fan in response to at least one operating condition reaching a predetermined state. In another feature of this electrical system, the rotary drum adsorber system is adapted to be utilized in association with a compressor having a sensor for detecting whether the compressor is currently operative, wherein one of the plurality of input connections is connected to the sensor, and wherein power is distributed to the rotary drum motor through the first power supply connection only in response to the sensor indicating that the compressor is currently operative. In another feature of this electrical system, the rotary drum adsorber system is adapted to be utilized in association with a compressor having a sensor for detecting whether the compressor is currently operative, wherein one of the plurality of input connections is connected to the sensor, and wherein power is distributed to the blower motor through the second power supply connection only in response to the sensor indicating that the compressor is currently operative. In another feature of this electrical system, the system further includes a timer for disconnecting the second power supply connection after a predetermined period of time, wherein the power supply connection is disconnected only upon the condition that the sensor does not indicate to the input connection that the compressor is operative within the predetermined period of time.

The present invention also includes a method of installing an electrical system in an adsorber system, the electrical system including a blower motor, a blower controller assembly for controlling the blower motor, a rotary drum motor and a system controller for controlling at least the rotary drum motor, wherein the method comprises the steps of housing the blower controller assembly in a first enclosure; housing the system controller in a second enclosure; and controlling the blower controller assembly with the system controller.

In a feature of this method, the method further includes the steps of providing primary power supply inputs for connection to an external power supply; and housing the primary power supply inputs outside the second enclosure. In another feature of this method, the method further includes the step of installing the blower motor outside the first and second enclosures.

The present invention also includes a method of protecting a blower motor in a housing having a drain and at least one drain valve, wherein the method comprises the steps of collecting a quantity of liquid in the housing; periodically opening a drain valve to allow at least a portion of the quantity of liquid to exit the housing through the drain; detecting the magnitude of the quantity of liquid in the housing; and opening a drain valve upon detecting that the magnitude has reached a predetermined level.

In a feature of this method, the method further includes the step of deactivating the blower motor upon detecting that the magnitude has reached the predetermined level. In another feature of this method, the method further includes the step of providing an indication to a user of the presence of an excessive quantity of liquid in the separator upon detecting that the magnitude has reached the predetermined level. In another feature of this method, the step of providing an indication to a user is repeated until the user manually acknowledges the indication.

The present invention also includes a method of protecting a blower in an adsorber system, the blower having a blower motor and a blower controller assembly and the adsorber system having a system controller for controlling the operation of the blower controller assembly, wherein the method comprises the steps of providing at least one input power connection at the blower controller assembly; supplying power from the system controller to the blower controller assembly via the input power connection; detecting an interruption in the supply of power at the input power connection; monitoring the input power connection for a predetermined period of time to determine if the supplying of power has resumed; generating a signal indicating that the supplying of power has not resumed; transmitting the signal to the system controller; and discontinuing the supplying of power to the blower controller assembly.

In a feature of this method, the method further includes the step of providing an indication to a user of a problem with the blower.

The present invention also includes a method of protecting a blower in an adsorber system having a cooling device for cooling a gas stream and a temperature sensing device positioned in the gas stream downstream from the cooling device, wherein the method comprises the steps of monitoring the temperature of the gas stream downstream from the cooling device; and de-activating the blower upon the determination that the temperature of the gas stream exceeds a predetermined level.

In a feature of this method, the method further includes the step of providing an indication to a user of a high temperature in the gas stream. In another feature of this method, the step of providing an indication to a user is repeated until the user manually acknowledges the indication. In another feature of this method, the method further includes the step of positioning the temperature sensing device at the outlet of the cooling device. In another feature of this method, the de-activation step further comprises de-activating the blower upon determining that the temperature of the gas stream has exceeded a level of approximately 140 degrees F.

BRIEF DESCRIPTION OF THE DRAWINGS

Further features, embodiments, and advantages of the present invention will become apparent from the following detailed description with reference to the drawings, wherein:

FIG. 15A is a front view of the heat conducting device of the blower controller assembly.

FIG. 15B is a top, cross-sectional view of the heat conducting device of FIG. 15A.

FIG. 15C is a side, cross-sectional view of the heat conducting device of FIG. 15A.

FIG. 30 is a graph showing the relationship between the average regeneration section outlet temperature and the regeneration time.

FIG. 31 is a graph showing the relationship between the instantaneous temperature out of the regeneration flutes and the average temperature.

DESCRIPTION OF THE PREFERRED EMBODIMENTS

Figure 1:
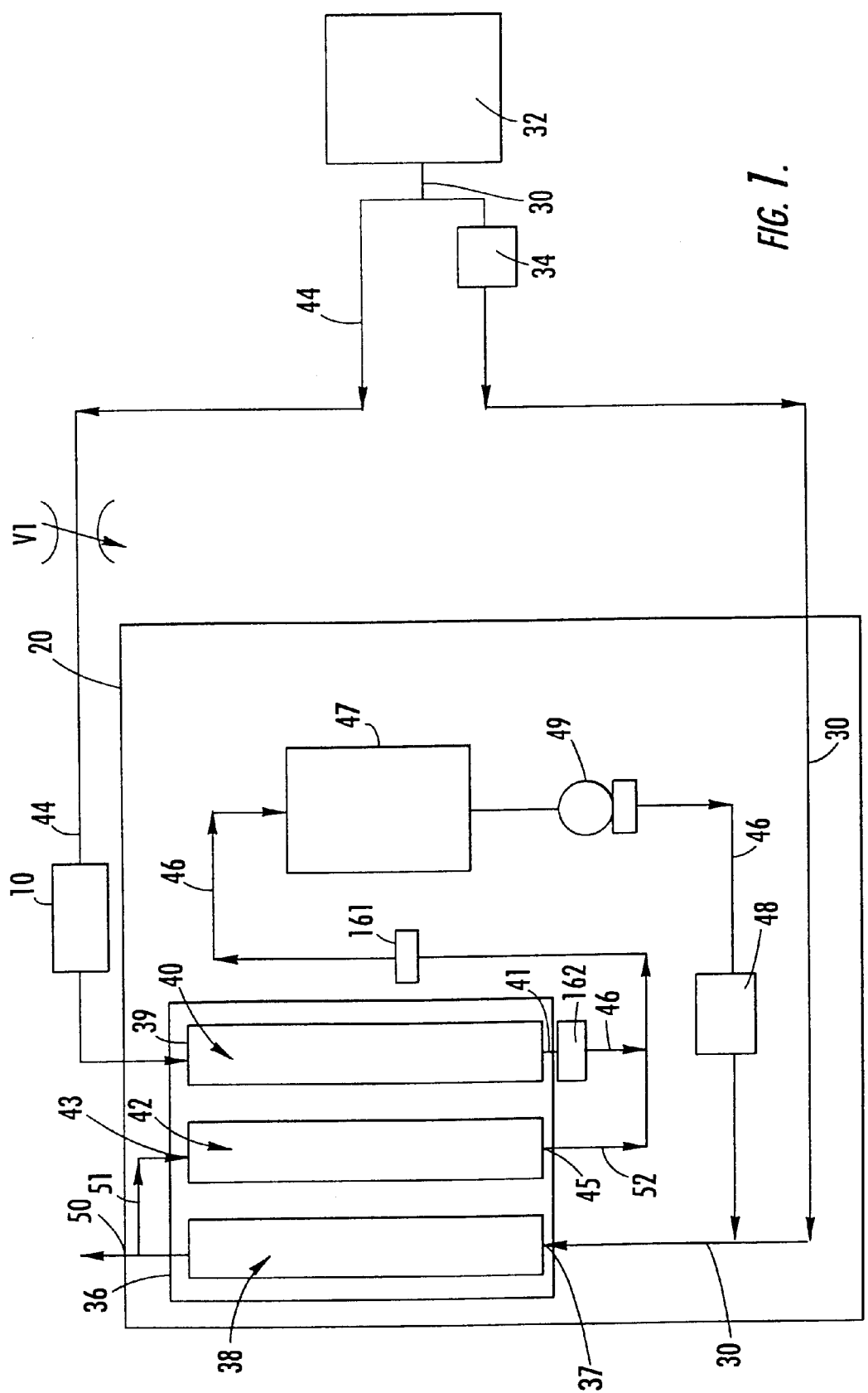
FIG. 1 is a schematic diagram showing a flow according to the first preferred embodiment of the rotating drum adsorber process and system utilizing the moist gas stream for regeneration and increasing the pressure of the regeneration exhaust stream before combining it with the moist gas inlet stream.

Looking now in greater detail at the accompanying drawings, FIG. 1 illustrates a diagrammatic view of the rotating drum adsorber process and system according the first preferred embodiment of the present invention. As shown in FIG. 1, a contaminated or moist gas feed inlet stream 30, such as, by way of example, hot, compressor gas discharged from a compressor 32, is cooled, such as, by way of example, in a compressor aftercooler 34, and then directed to a rotating drum adsorber system 20 which comprises a rotating desiccant impregnated wheel or drum 36, which includes an adsorption sector 38, a regeneration sector 40, a cooling sector 42, a cooling device 47, a separator 49 and a blower 48. A detailed description of the rotating drum 36 and other components of the rotating drum adsorber system 20 of the present invention is set forth below with reference to FIGS. 5–17.

Referencing FIG. 1, the moist gas feed inlet stream 30 enters the adsorption sector 38 through an adsorption sector inlet 37 and is passed through the adsorption sector 38 of the drum 36. Prior to or upstream from the compressor aftercooler 34, a portion of the hot discharge stream 30 is diverted for use as a regeneration stream 44. The regeneration stream 44 may optionally be passed through a booster heater 10 to achieve an elevated temperature and then directed into the regeneration sector 40 of the rotating drum 36. Heat sources which may be used as a booster heater 10 include electric immersion heaters, steam heating coils, heat tubes, hot oil coils and solar heat. The regeneration stream 44 then enters the regeneration sector 40 through a regeneration sector inlet 39 and is passed through the regeneration sector 40. A regeneration exhaust stream 46 exiting from a regeneration sector outlet 41 is cooled by a cooling device 47, which is preferably a heat exchanger, and condensed water is separated in a separator 49 and collected. As shown in FIG. 1, the cooled regeneration exhaust stream 46 is combined with the moist gas feed inlet stream 30 and channeled into the adsorption sector 38. In order to ensure that any leakage will pass only in the direction from the adsorption sector 38 into the regeneration sector 40 thereby avoiding contamination of the adsorption sector 38, the regeneration sector 40 is kept at a lower pressure than the adsorption sector 38. Because the regeneration exhaust stream 46 exiting the regeneration sector outlet 41 is at a lower pressure than the moist gas feed inlet stream 30, the pressure of the cooled regeneration exhaust stream 46 must therefore be increased prior to combining it with the higher pressure moist gas feed inlet stream 30. In the preferred embodiment, the pressure is increased by utilizing a uniquely designed high speed centrifugal blower 48. In use, the regeneration exhaust stream 46 is drawn into the blower 48 and the pressure is boosted to allow the regeneration exhaust stream 46 to be combined with the higher pressure moist gas feed inlet stream 30. As shown in FIG. 1, the combined streams are then fed into the adsorption sector 38 for providing a purified gas stream 50. The preferred process of the present invention also includes a cooling stream 51, diverted from the purified stream 50 upon exiting the adsorption sector 38, which enters the cooling sector 42 through a cooling sector inlet 43 and then passes through the cooling sector 42. The cooling exhaust stream 52 exits through a cooling sector outlet 45 and is then combined with the regeneration exhaust stream 46. While the cooling sector 42 and the step of passing a portion of the purified stream 50 through the cooling sector 42 together provide additional desiccant polishing and drum cooling for improved separation efficiency and lower product discharge temperature and is preferably included in the process and system of the present invention, the cooling sector 42 may be omitted.

The rotating drum adsorber process and system of the present invention advantageously includes means for sensing a temperature in the regeneration exhaust stream 46 and utilizing the temperature to adjust the hot air flow rate until a predetermined temperature or temperature range is reached. In the preferred embodiment, the means comprises a temperature sensor 161 installed in the piping between the regeneration sector outlet 41 and the cooling device 47. The temperature sensor 161 includes a controller, and an output of the temperature sensor controller is connected to a gas control valve V1 for controlling the flow rate of the gas in the regeneration stream 44. The gas control valve V1 is preferably a diaphragm-operated modulating control valve of either the globe, butterfly or ball type. However, in a nonautomated system, the gas control valve V1 may be a manually operated valve. In one embodiment, a microprocessor may be utilized to collect temperature data from the temperature sensor 161 and information from other components of the adsorber system 20, and the gas control valve V1 may be controlled as a function of those inputs. If the temperature of the regeneration exhaust stream 46 departs from a predetermined range, which in a preferred embodiment may be 150 to 180 degrees F., the gas control valve V1 is adjusted to increase or decrease the gas flow rate and thus adjust the temperature accordingly.

Optionally, the rotating drum adsorber process and system of the present invention may also or alternatively include means for sensing a temperature differential and utilizing the temperature differential for automatically controlling various operating conditions of a rotating drum adsorber system to effectively operate the system to achieve complete regeneration and the lowest outlet product dew point. In the preferred embodiment, the process includes sensing the temperature differential between the temperature of the discharge exiting a leading edge 54 of the drum at the regeneration sector outlet 41, best shown schematically in FIG. 5, and the average discharge temperature of the regeneration sector 40, where the leading edge of the drum is that portion of the drum which is about to rotate out of the regeneration sector 40 and thus has been in the regeneration sector 40 the longest. Specifically, the temperature differential may be compared to a predetermined value and the operating conditions are adjusted based on the comparison of the temperature differential to the predetermined value. For example, if the temperature differential is below the predetermined value, indicating that the complete regeneration of the adsorbent medium has not been achieved and that the adsorption sector 38 is potentially contaminated, the drum 36 rotational speed may be decreased, the regeneration stream 44 flow rate may be increased, or the speed of the blower 48 may be increased, or a combination of these steps. If the temperature differential is excessive, indicating over-regeneration and wasted energy, the drum 36 rotational speed may be increased, the regeneration stream 44 flow rate may be reduced or the interstage blower 48 speed may be reduced or a combination of these steps. This process is described in greater detail below.

Figure 2:
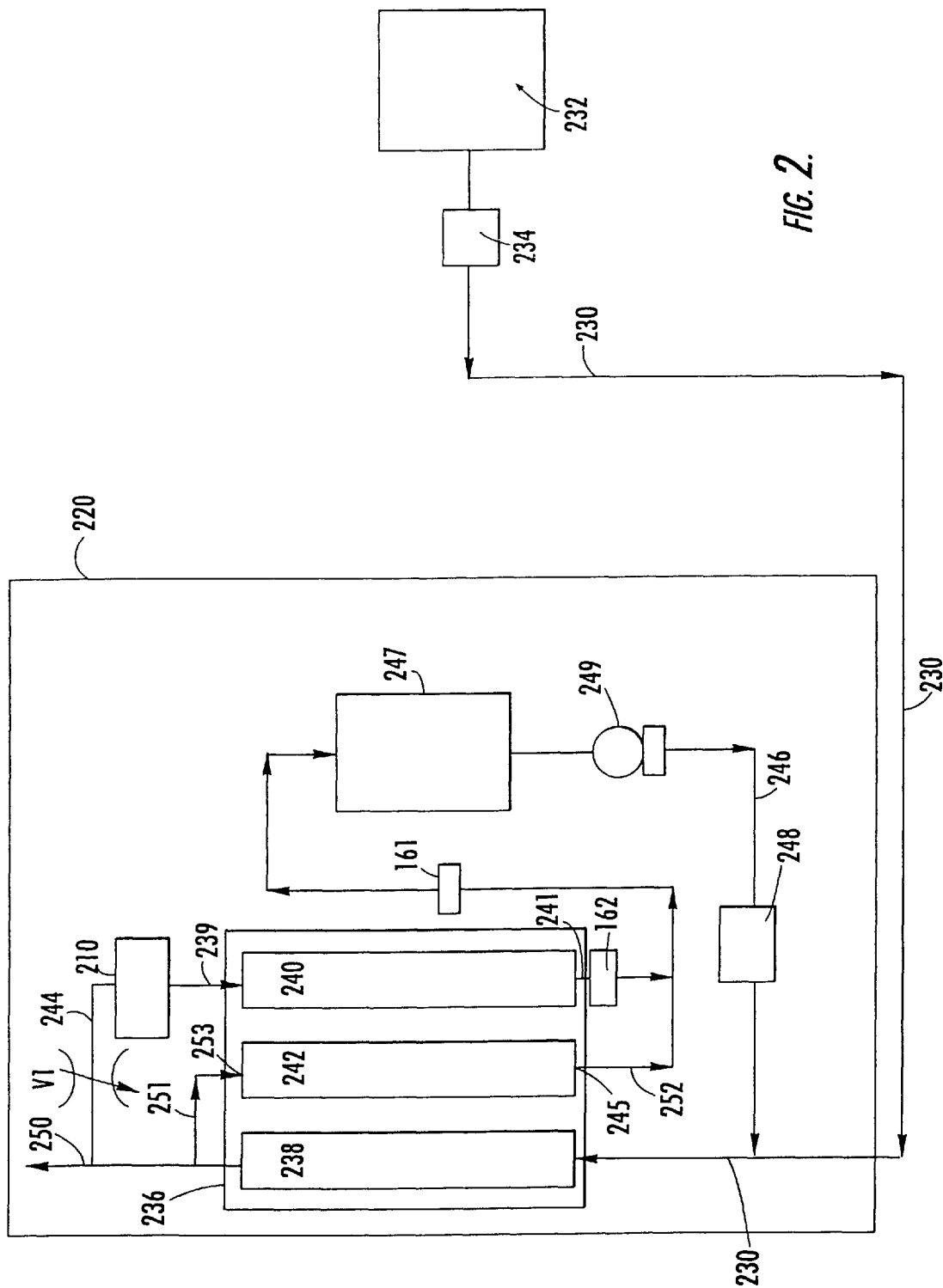
FIG. 2 is a schematic diagram showing a flow according to the second preferred embodiment of the rotating drum adsorber process and system utilizing a portion of the purified gas stream for regeneration and increasing the pressure of the regeneration exhaust stream before combining it with the moist gas inlet stream.
Figure 3:
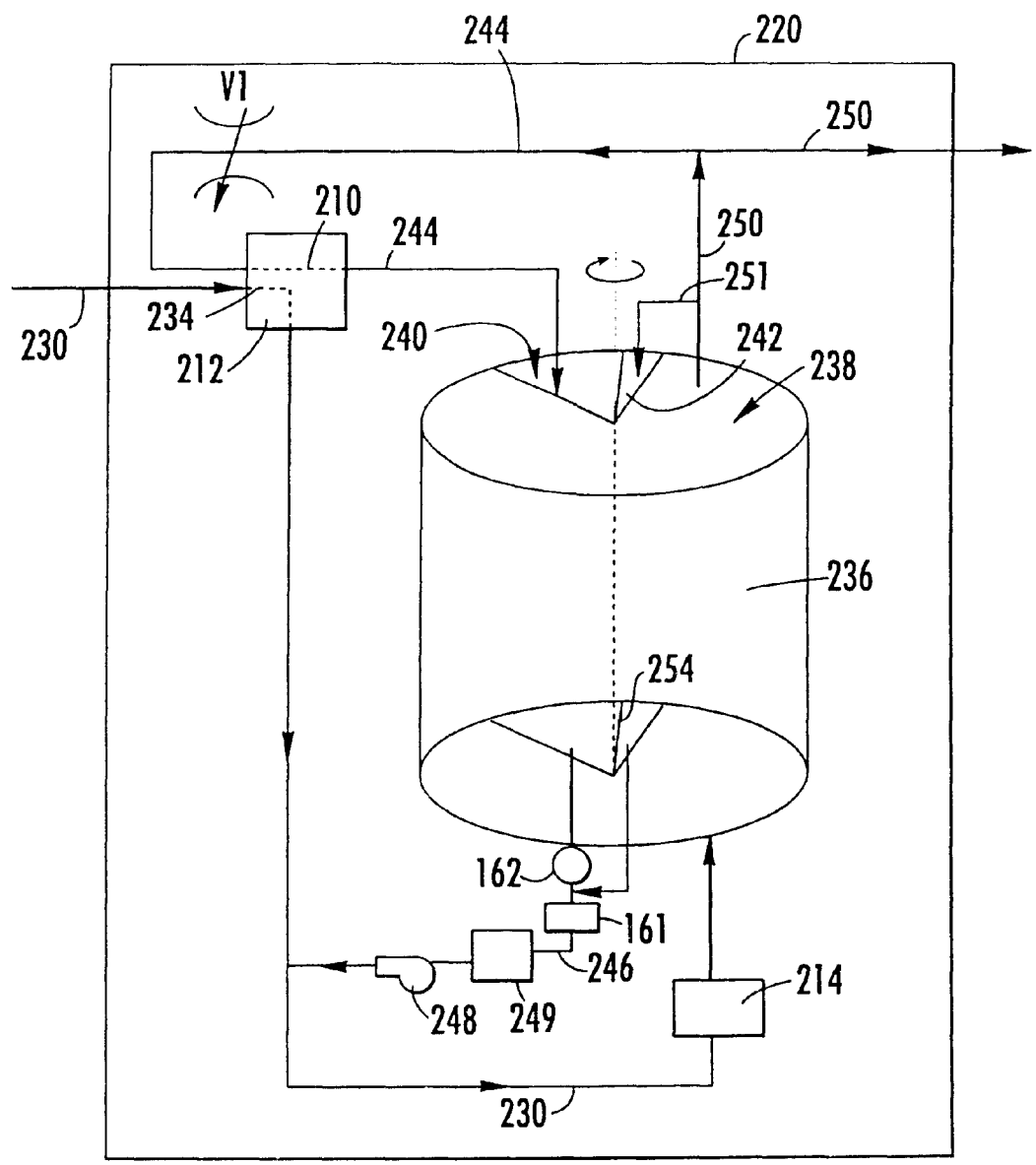
FIG. 3 is a schematic diagram showing a flow according to two variations of the second preferred embodiment wherein in a first variation a unitary heat exchanger is utilized and in a second variation the combined moist gas inlet stream and the pressurized regeneration exhaust stream are cooled concurrently, before the combined streams enter the drying sector.

FIGS. 2 and 3 illustrate a second preferred embodiment of the rotating drum adsorber process and system of the present invention which is substantially similar to the process and system of the first preferred embodiment. Thus, the process steps and system components of the second preferred embodiment which correspond to similar process steps and system components of the first preferred embodiment, bear like reference numerals to those of the first embodiment but in the 200 series. For the sake of simplicity, the components of the rotating drum adsorber system of the second preferred embodiment will not be discussed in detail with reference to the second preferred embodiment and reference is made to the detailed description herein of the rotating drum adsorber system of the first preferred embodiment.

As compared to the system of the first preferred embodiment, the rotating drum adsorber process and system of the second preferred embodiment utilizes an additional sub-portion of the purified stream 250 at the effluent end of the adsorption sector 238 to achieve improved regeneration and a lower effluent dew point. Referring now to FIG. 2, a portion of the purified stream 250 exiting the absorption sector 238 of the rotating drum 236 is diverted for use as a purified regeneration stream 244 and passed through the regeneration sector 240 for improved regeneration, instead of using a portion of the moist gas feed inlet stream 30 diverted from the compressor 32 as shown in FIG. 1. Thus, in the second preferred embodiment, the entire moist gas feed inlet stream 230 is directed to and passed through the adsorption sector 238 of the rotating drum 236. The purified regeneration stream 244, extracted from the purified stream 250 exiting the adsorption sector 238, is preferably passed through a booster heater 210 to achieve an elevated temperature and then directed into the regeneration sector 240 of the rotating drum 236. Heat sources which may be used as a booster heater 210 include electric immersion heaters, steam heating coils, heat tubes, hot oil coils and solar heat. The preferred elevated temperature of the purified regeneration stream 244 after it has been heated is in the range of approximately 200° F. to 600° F.

In a first variation of the second preferred embodiment, illustrated in FIG. 3, the booster heater 210 may be an indirect heat exchanger 212 which combines the regeneration stream booster heater 210 and the gas inlet stream cooler 234 into a single unit in order to utilize the heat of the hot, compressor discharge gas of the moist gas feed inlet stream 230 to heat the purified regeneration stream 244 for use in the regeneration sector 240. This provides for the advantageous reduction of the temperature of the moist gas feed inlet stream 230 to attain better adsorption at a lower temperature while simultaneously elevating the temperature of the purified regeneration stream 244 to attain better desorption of the contaminant in the regeneration sector 240. Thus, by utilizing the heated purified regeneration stream 244, the effluent gas quality can be easily and effectively altered by controlling the regeneration stream temperature, or by controlling the regeneration stream flow rate, or both.

As shown in FIG. 2, the regeneration exhaust stream 246 is cooled to separate the water and the pressure of the regeneration exhaust stream 246 is increased by the high speed blower 248. The increased pressure regeneration exhaust stream 246 is then combined with the moist gas feed inlet stream 230. The combined streams are directed to the adsorption sector 238 and the purified stream 250 exits the adsorption sector 238 and the process begins again with a portion of the purified stream 250 being directed to the regeneration sector 240.

In a second variation of the second preferred embodiment illustrated in FIG. 3, the combined regeneration exhaust stream 246 and moist gas feed inlet streams 230 are simultaneously cooled prior to entering the adsorption sector. In this variation, the pressurized regeneration exhaust stream 246 is combined with the moist gas feed inlet stream 230. The combined streams are then cooled together by a cooler 214 at the inlet of the adsorption sector 238 of the drum 236 and the cooled combined stream is fed into the adsorption sector 238. The cooler 214 is preferably a compressor aftercooler which has been moved to the inlet of the adsorption sector 238, thereby eliminating the need for a second cooler. The cooled combined inlet stream 230 advantageously improves the process of adsorption because the outlet dew point is directly related to the temperature of the feed gas. And thus lowering the feed gas temperature causes a corresponding drop in the outlet dew point. Because the cooler 214 is located downstream of the blower 248, both the moist feed gas inlet stream 230 and the regeneration exhaust stream 246 are cooled concurrently after they have been combined to provide a cooler inlet stream. This is preferable to cooling upstream of the blower 248 where only the regeneration exhaust stream 246 is cooled.

Figure 4:
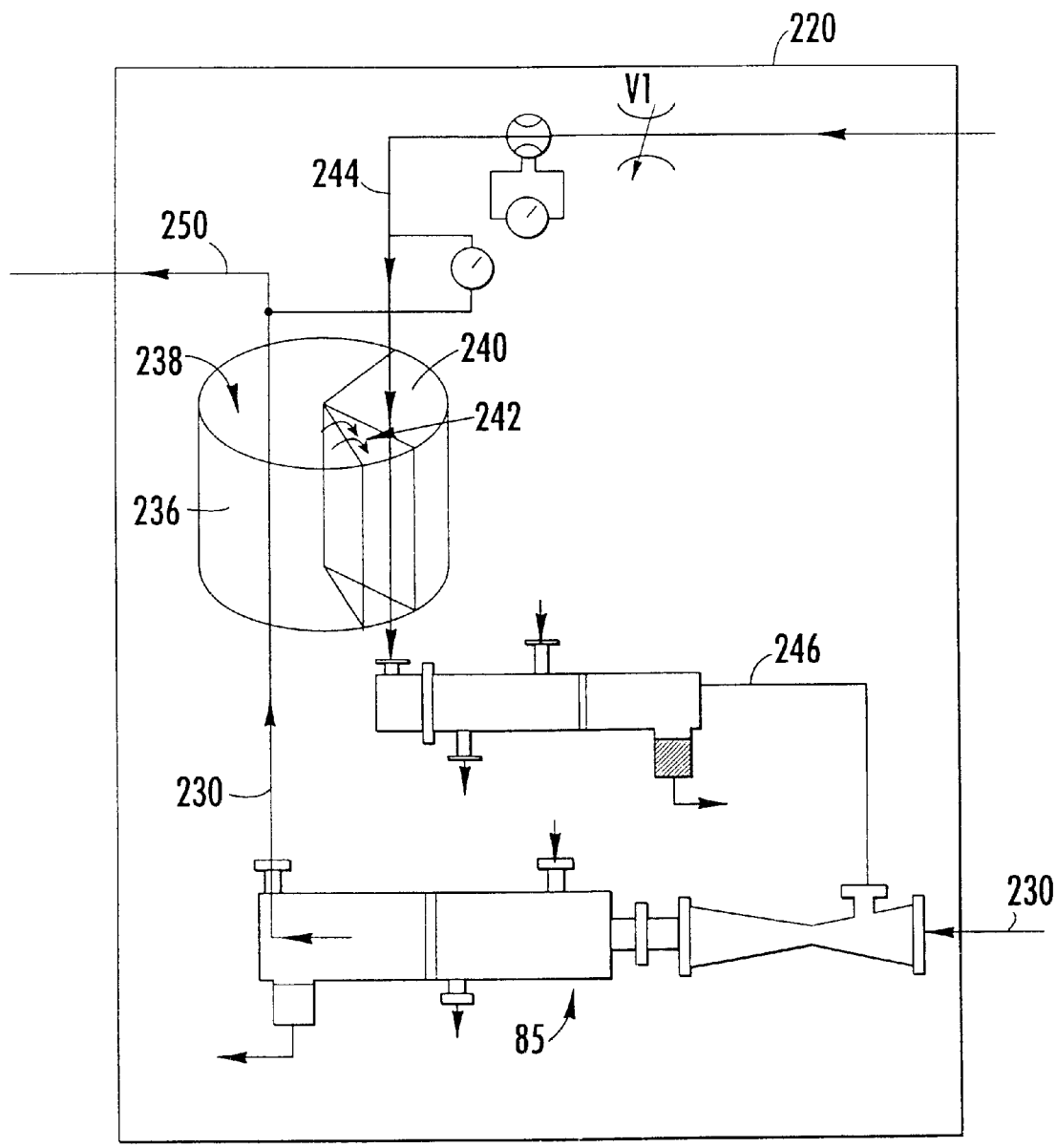
FIG. 4 is a schematic diagram showing a flow according to a third variation of either the first or second preferred embodiment wherein the regeneration exhaust stream is simultaneously cooled and its pressure increased.

FIG. 4 illustrates another variation of either the first or second preferred embodiment which includes combining the steps of boosting the pressure of and cooling the regeneration exhaust stream 246 by combining a pressure boosting device and a cooling device into a single combination apparatus 85. The regeneration stream 244, which may be diverted as shown in either FIG. 1 or FIG. 2, is passed through the regeneration sector 240. As in either FIG. 1 or FIG. 2, the water from the regeneration exhaust stream 246 is condensed and collected. Next, the regeneration stream 246 and moist gas feed inlet stream 230 are each directed to the combination apparatus 85. The combination apparatus 85 shown in FIG. 4 includes an air ejector combined with a heat exchanger to significantly reduce the size of the invention.

As in the first preferred embodiment, the process and system of the second preferred embodiment may include means for sensing the temperature of the regeneration exhaust stream 46 and using it to control the gas flow rate. The process and system of the second preferred embodiment may also, or alternatively, include means for detecting the temperature of the regeneration exhaust stream 246 at the edge of the drum 236 leaving the regeneration sector 240 and the average or bulk temperature of the regeneration exhaust stream 246 exiting the regeneration sector 240 and utilizing the temperature difference between the two temperatures to control the drum 236 rotational speed, the purified regeneration stream 244 flow rate, the blower 248 speed, or a combination of these operating conditions.

Figure 5:
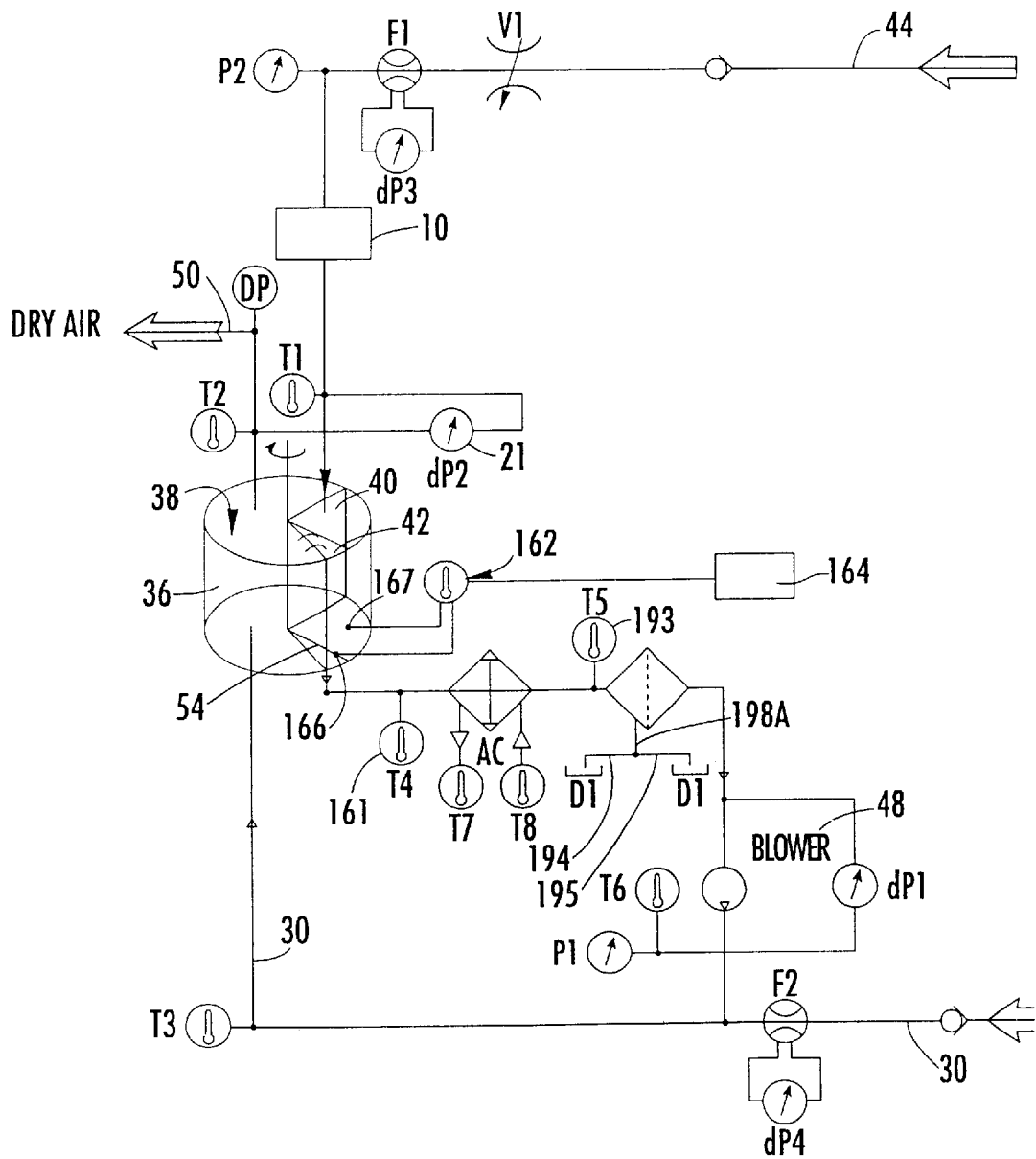
FIG. 5 is a schematic diagram illustrating the process and system components of the preferred embodiment of the rotating drum adsorber process and system.
Figure 5A:
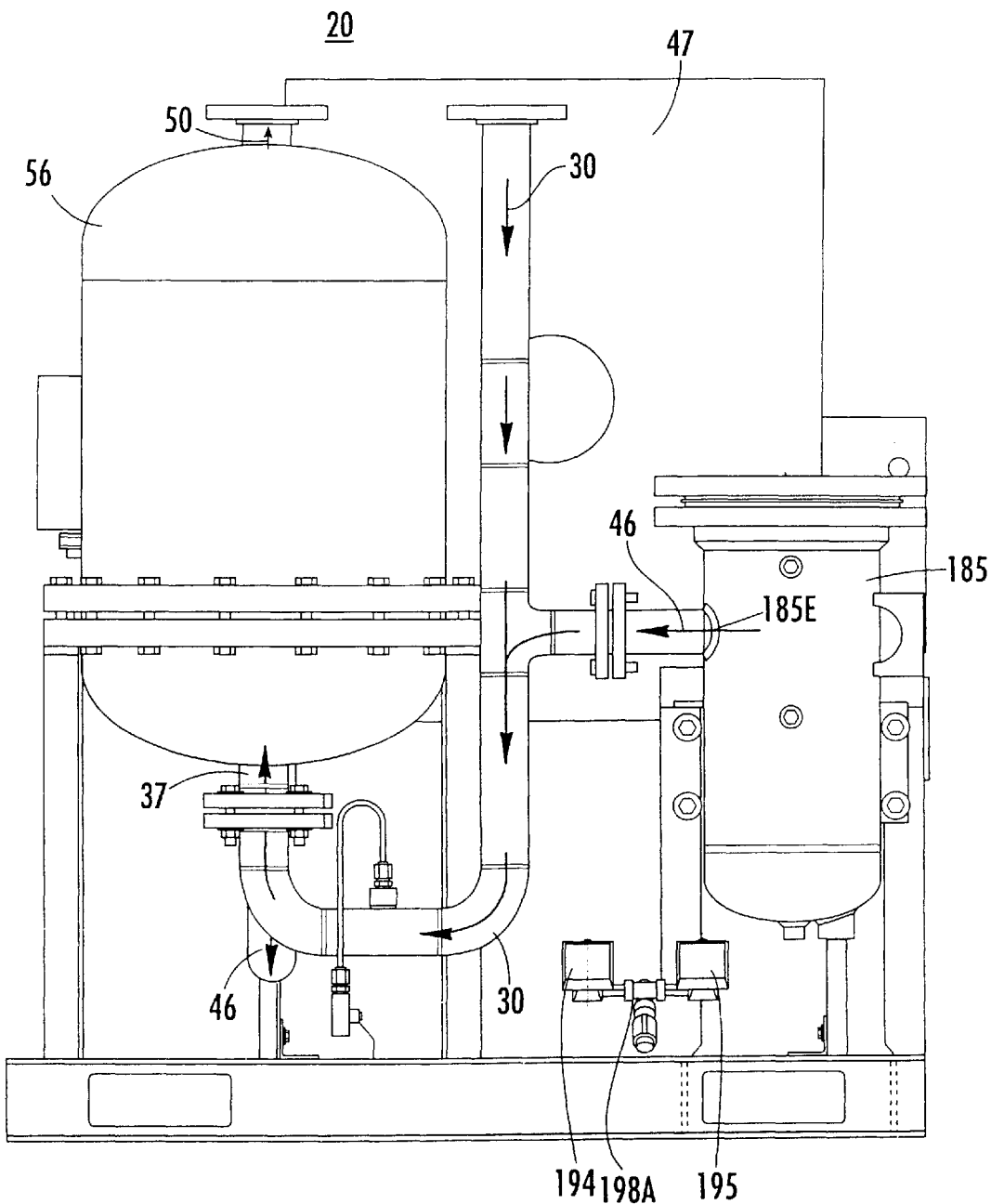
FIG. 5A is a front view of a rotating drum adsorber system for carrying out the processes shown in FIG. 5.
Figure 5B:
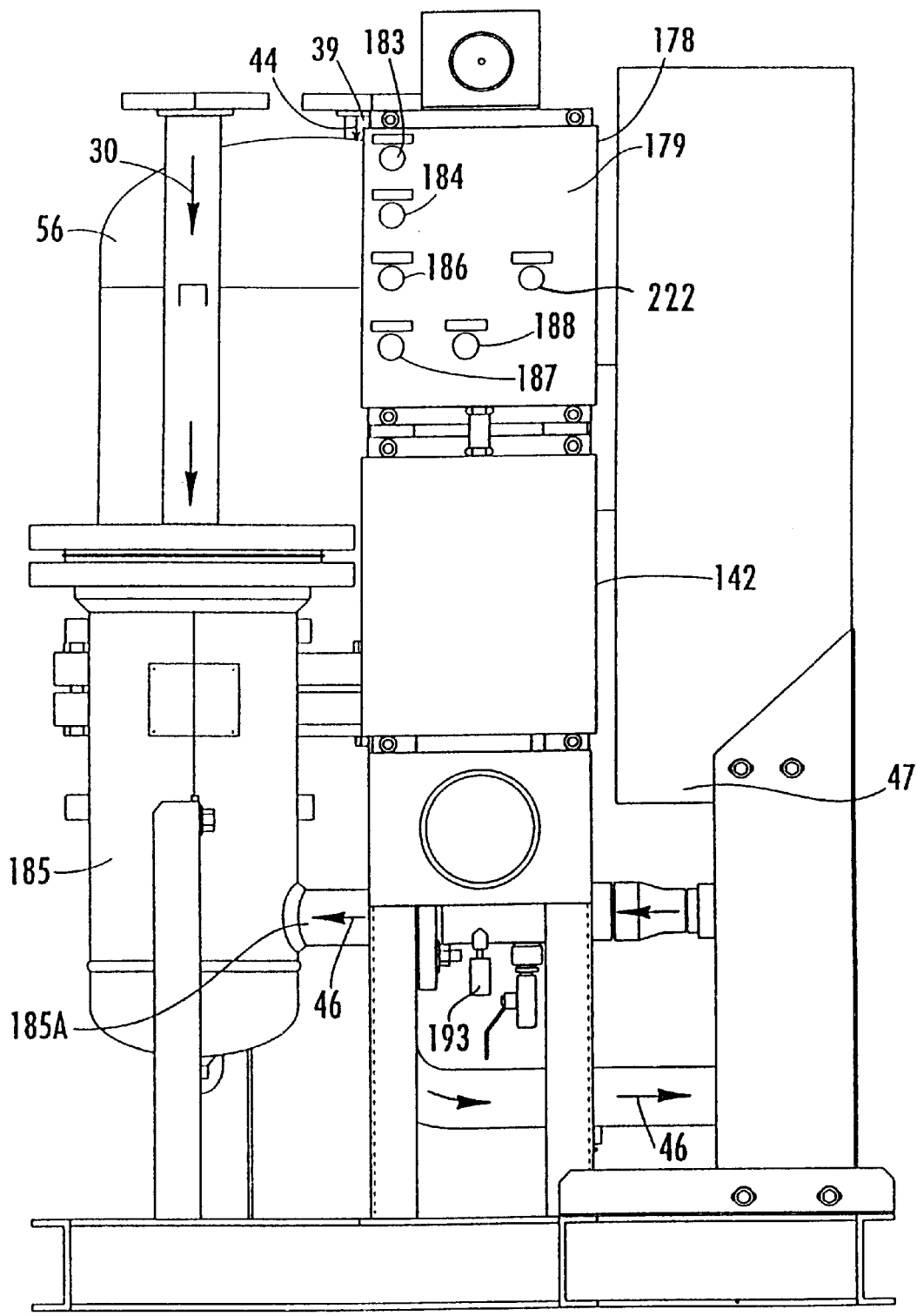
FIG. 5B is a side view of a rotating drum adsorber system for carrying out the processes shown in FIG. 5.
Figure 6:
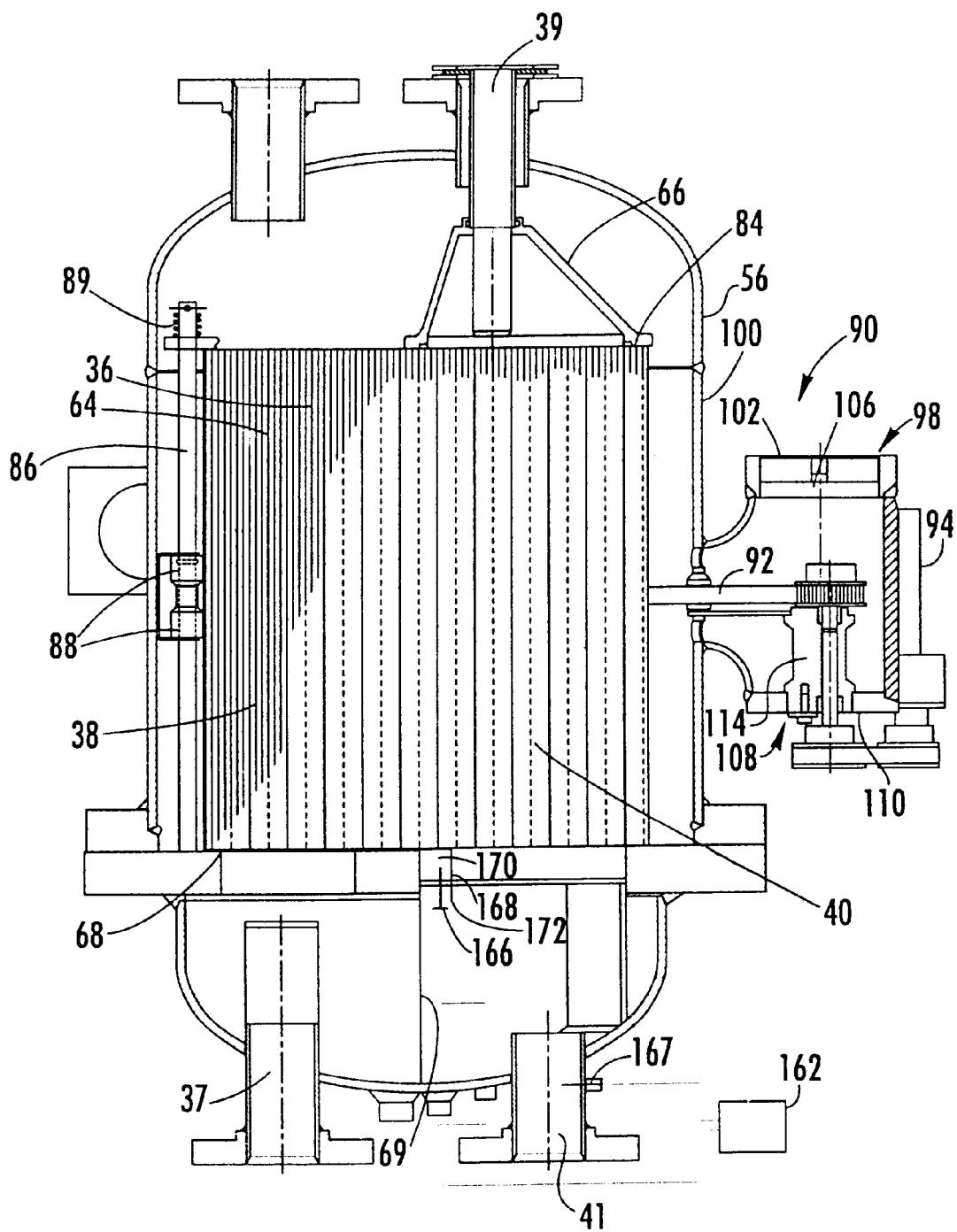
FIG. 6 is a cross-sectional side view of the containment shell including the adsorbent drum and the belt drive system for rotating the drum.
Figure 7:
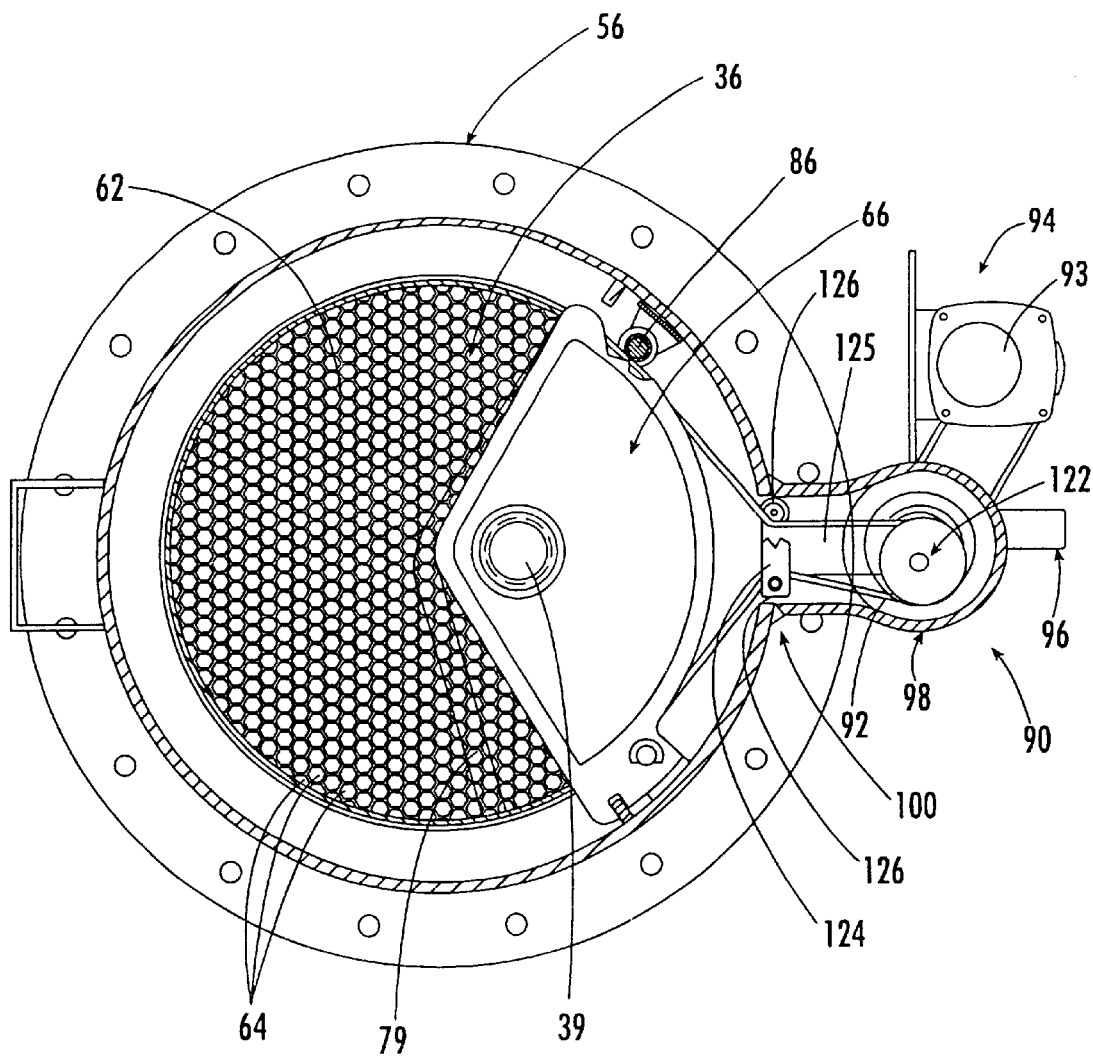
FIG. 7 is a top view of the open containment shell showing the top partition plate, the adsorbent drum and the belt drive system for rotating the drum.

Referring now to FIGS. 5–17, FIG. 5 is a flow schematic of the rotating drum adsorber process and system showing the process and system components of the preferred embodiments of the present invention. FIGS. 5A and 5B are front and side views, respectively, of a rotating drum adsorber system for carrying out the processes shown in FIG. 5. Although the figures and description which follow generally make reference to the first preferred embodiment of the present invention, it should be clear to one of ordinary skill in the art that the description provided may also be applied to the second preferred embodiment. As shown in FIG. 5, the preferred drum is generally cylindrical and has circular top and bottom faces. As shown in FIG. 6, the rotating drum 36 is contained within a pressurized containment shell 56 which includes a moist gas feed stream inlet 37, or adsorption sector inlet, for receiving the moist gas feed inlet stream 30 from the compressor 32, and a regeneration sector inlet 39 for receiving the portion of the moist gas feed inlet stream 30 diverted to the regeneration sector 40. As best seen in FIG. 7 the preferred drum 36 has a bed 62 with a honeycomb construction including axial flutes or drum flow passages 64 extending vertically through the drum 36. As shown in FIGS. 6 and 7, the containment shell 56 includes a top partition plate 66 above the rotating drum 36, a bottom partition plate 68 below the rotating drum 36 and a shell partition wall 69 for separating the adsorption sector inlet 37 from the regeneration sector outlet 41 in the head of the shell 56. Together, as illustrated in FIGS. 6 and 7 in conjunction with FIGS. 1 and 9, the partition plates 66, 68 define the adsorption sector 38, the regeneration sector 40 and the cooling sector 42 to properly channel, in conjunction with the partition wall 69, the various flow streams including the moist or contaminated gas feed inlet stream 30, the hot regeneration stream 44 and the cooling stream 51 through the various process sectors.

Figure 8A:
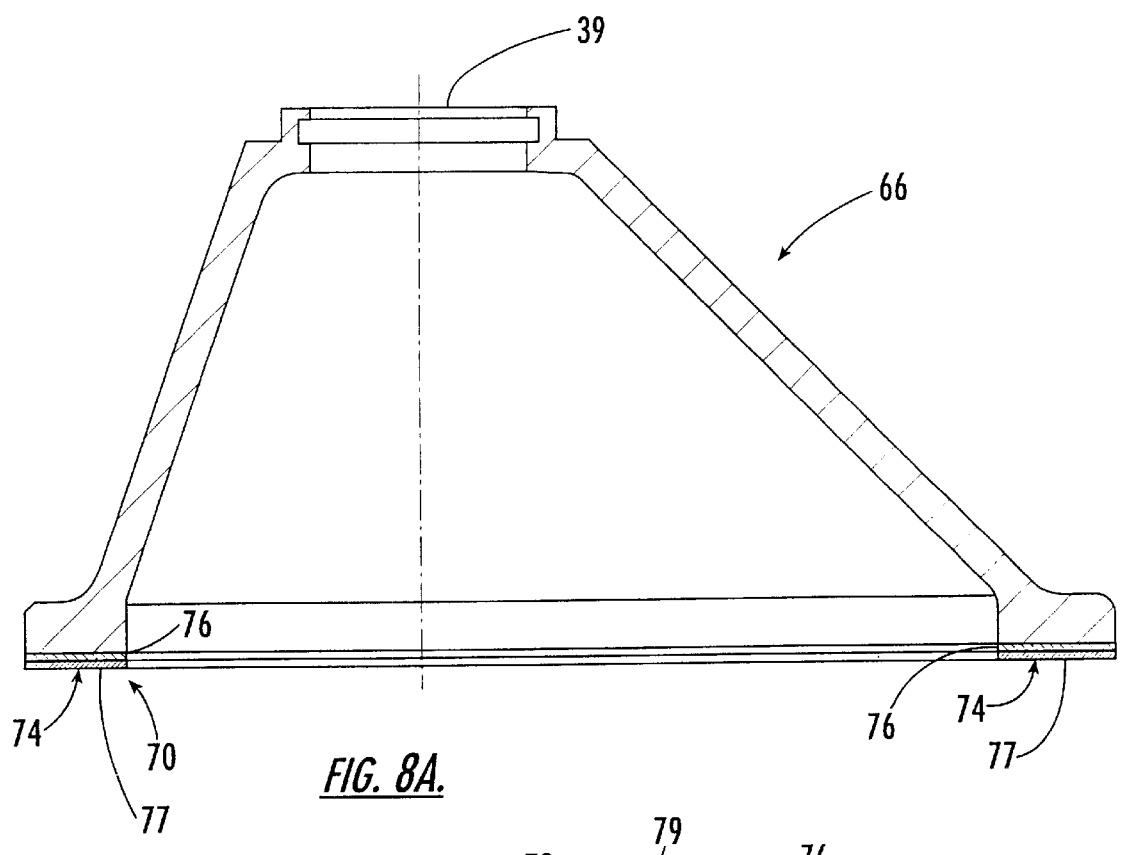
FIG. 8A is an enlarged cross-sectional view of the top partition plate showing the sealing material positioned on the edge of the top partition plate.
Figure 8B:
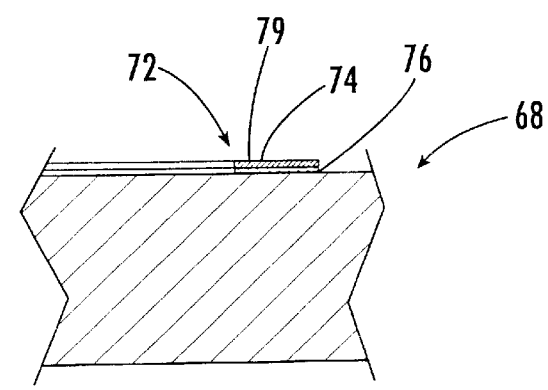
FIG. 8B is an enlarged partial cross-sectional view of the bottom partition plate showing the sealing material positioned on the edge of the bottom partition plate.

In the preferred embodiments, the rotating drum adsorber process and system of the present invention includes a sealing process and system for sealing between the sectors of the partitioned shell 56 to segment the drum 36 into distinct heating, cooling and drying sectors and to prevent excessive flow leakage between the various sectors 38, 40, 42. As shown in FIGS. 8A and 8B, the sealing process of the preferred embodiments includes providing a unique sealing material and positioning the material on the edges 70, 72 of partition plates 66, 68 to form seals between the various process sectors 38, 40, 42 with minimal wear on the adsorbent drum 36 and providing excellent sealing quality, very low frictional resistance to the rotating drum face, chemical resistance, and thermal stability. In the preferred embodiment, the partition plates 66, 68 are steel and the sealing material used to form the partition seals 74 is a fluoropolymeric material, such as, by way of example, Teflon®, PFA (fluorinated ethylene perfluoroalkyl vinyl ether copolymer), PTFE (a polymer of tetrafluoroethylene monomer), and FEP (a copolymer of tetrafluoroethylene and hexafluoropropylene). Use of a fluoropolymeric material for sealing the rotating drum 36 advantageously provides excellent sealing with minimal wear of the adsorbent drum 36 and the fluoropolymeric material has a long life.

In the preferred embodiment, the flouropolymeric sheet is fastened to the edges 70, 72 of the top and bottom partition plates 66, 68 by a high temperature silicone gasket material 76, such as, by way of example, the silicone gasket manufactured by Permatex, Part No. 26BR (Item No. 81160)

which retains its flexibility under high temperature and in high pressure installations. The silicone gasket material of the present invention preferably consists of amorphous silica, (1 to 15%); an organic radical, such as dimethylsiloxane (poly dimethyl), (20 to 90%); and a metal oxide, such as iron oxide or carbon black, (0.1 to 5%); and has better elastomeric properties than epoxy, enabling it to bond the fluoropolymeric sheet even under radically different temperature conditions.

In the preferred embodiments, the seals 74 include a top seal 77 and a bottom seal 79 which are attached to the top and bottom partition plates 66, 68, respectively. Together, the top and bottom seals 77, 79 and top and bottom partition plates 66, 68 define sealing partitions which are specifically formed to provide for and maintain an equal pressure loss across the regeneration sector 40 and the adsorption sector 38. As illustrated in FIG. 5, the greatest pressure differential 21 exists between the regeneration sector outlet 41 and the adsorption sector inlet 37. The pressure of the regeneration sector 40 is kept lower than the pressure of the adsorption sector 38 for preventing flow from the regeneration sector 40 to the adsorption sector 38 in the event of a leak, thus avoiding contamination of the adsorption sector 38. In the preferred embodiment, the pressure differential 21 across the sealing partitions is maintained at ten (10) inches of water or less to prevent excessive flow leakage between the adsorption and regeneration sectors 38, 40.

Also preferably, in order to further enhance the sealing of the interface between the bottom face of the drum 36 and the bottom seal 79 the lower ends of the outermost flutes 64 of the drum 36 are coated with a suitable polymeric filler such as an epoxy to create a uniform sealing rim on the bottom face of the drum 36. The width of the sealing rim corresponds to that of the seals 74. Thus, as the drum 36 rotates on the bottom partition plate 68 direct contact is made only between the sealing rim and the bottom seal 79 instead of between the flute surfaces and the bottom seal 79. As a result, the interface between the drum 36 and the partition plate 68 is more effectively sealed.

Figure 9:
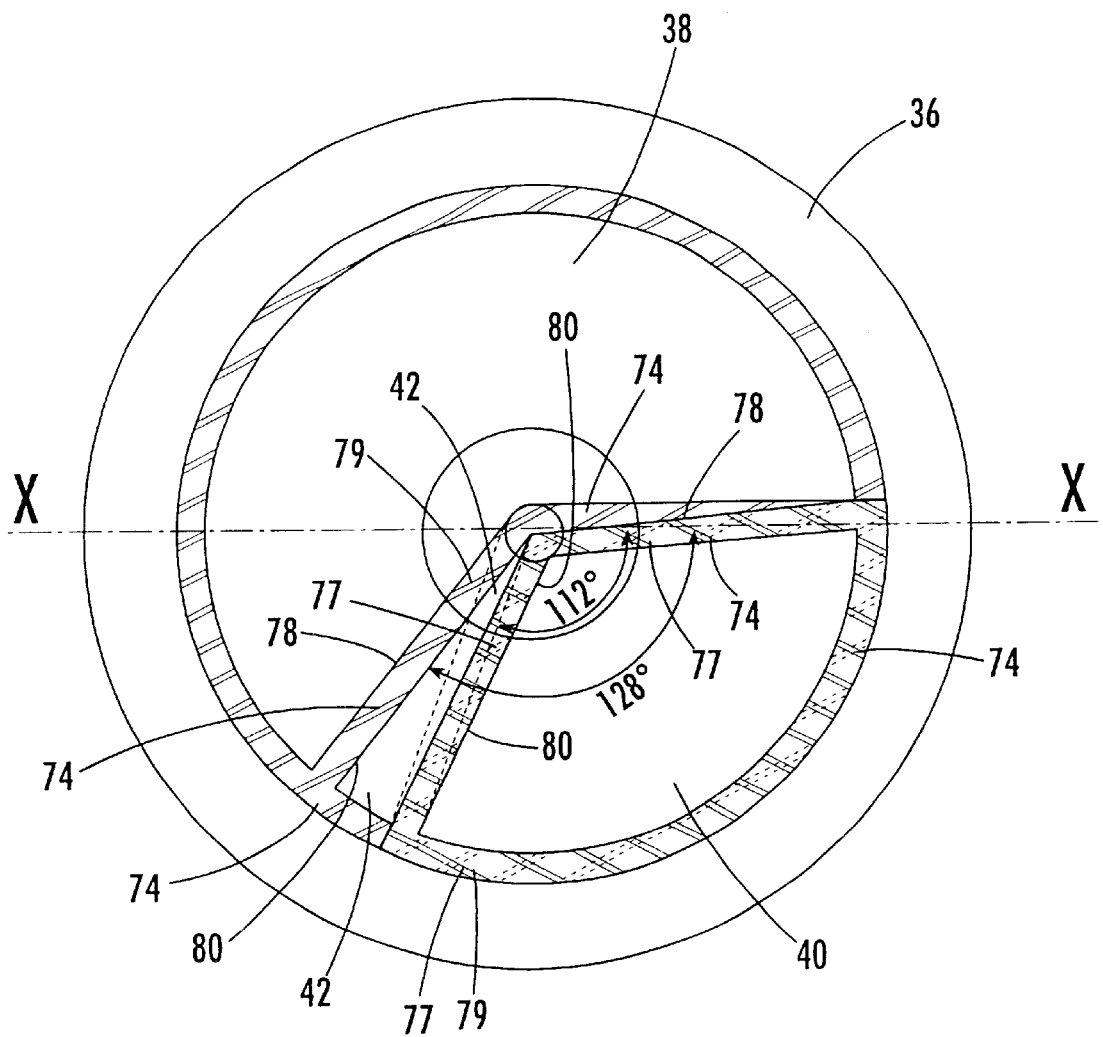
FIG. 9 is a top view showing the unique alignment of the top and bottom partition plates of the present invention.

The sealing process and system of the preferred embodiments also includes means for cooling the rotating drum 36 all the way to the center of the drum 36 to ensure that the entire portion of the drum 36 entering the adsorption sector 38 is cooled in the cooling sector 42 prior to that portion of the drum 36 entering the adsorption sector 38 FIG. 9 is a top view showing the unique alignment of the top and bottom seals 77, 79 of the present invention. As shown, the sealing partitions are formed with one partition seal positioned on, and aligned with, a center line X of the drum 36 and the other partition seal positioned inside the center line X. Each partition seal 77, 79 has a predetermined width and includes an outer edge 78 and an inner edge 80. As shown in FIG. 9, each seal 77, 79 includes two generally radial segments extending from a point at or near the center of the drum and extending toward the perimeter of the drum, and a perimeter portion extending substantially along the perimeter of the drum between the outer ends of the radial segments. Further, the top seal 77 is positioned such that at least a point along the outer edge 78 of the top seal 77 lines up with the center line X of the drum 36 and the bottom seal 79 is positioned such that the inner edge 80 of the bottom seal 79 lines up with the center line X. This unique alignment of the top and bottom sealing partitions eliminates the problem caused when a portion of the adsorbent drum 36 near the center is blocked by the width of the partition seal 77, 79 and passes into the adsorption sector 38 and ensures that all of the effective adsorbent bed is cooled prior to entering the adsorption sector 38.

As best shown in FIGS. 7 and 9 the top seal 77 surrounds only a portion of the area of the top drum face, while the bottom seal 79 surrounds only a portion of the area of the bottom drum face. As perhaps best illustrated in FIGS. 5 and 9 the area of the top drum face surrounded by the top seal 77 is smaller than, and completely overlapped by, the area of the bottom drum face surrounded by the bottom seal 79. Thus, when taken in combination, the top partition plate 66 and the top seal 77 define those flutes 64 which are part of the regeneration sector 40; the bottom partition plate 68 and that portion of the area surrounded by the bottom seal 79 which is not overlapped by the area surrounded by the top seal 77 together define those flutes 64 which are part of the cooling sector 42; and the remaining flutes 64 generally form the adsorption sector 38. As shown in FIG. 5, this arrangement allows a gas stream to flow directly from the adsorption sector 38 to the cooling sector 40 at the top of the drum 36 and permits the cooling exhaust stream 52 and the regeneration exhaust stream 46 to be directly joined at the bottom of the drum 36 minimizing the amount of piping necessary and the size of the partition plates 66, 68. The drum 36 continuously rotates through the various process sectors 38, 40, 42 to process the moist or contaminated feed stream 30 therethrough for removing contaminants or moisture from the feed stream 30. The drum 36 of the preferred embodiments is constructed to be advantageously small for reducing the size of the pressurized housing 56 while processing a large flow rate of a contaminated or moist feed stream 30.

Figure 6A:
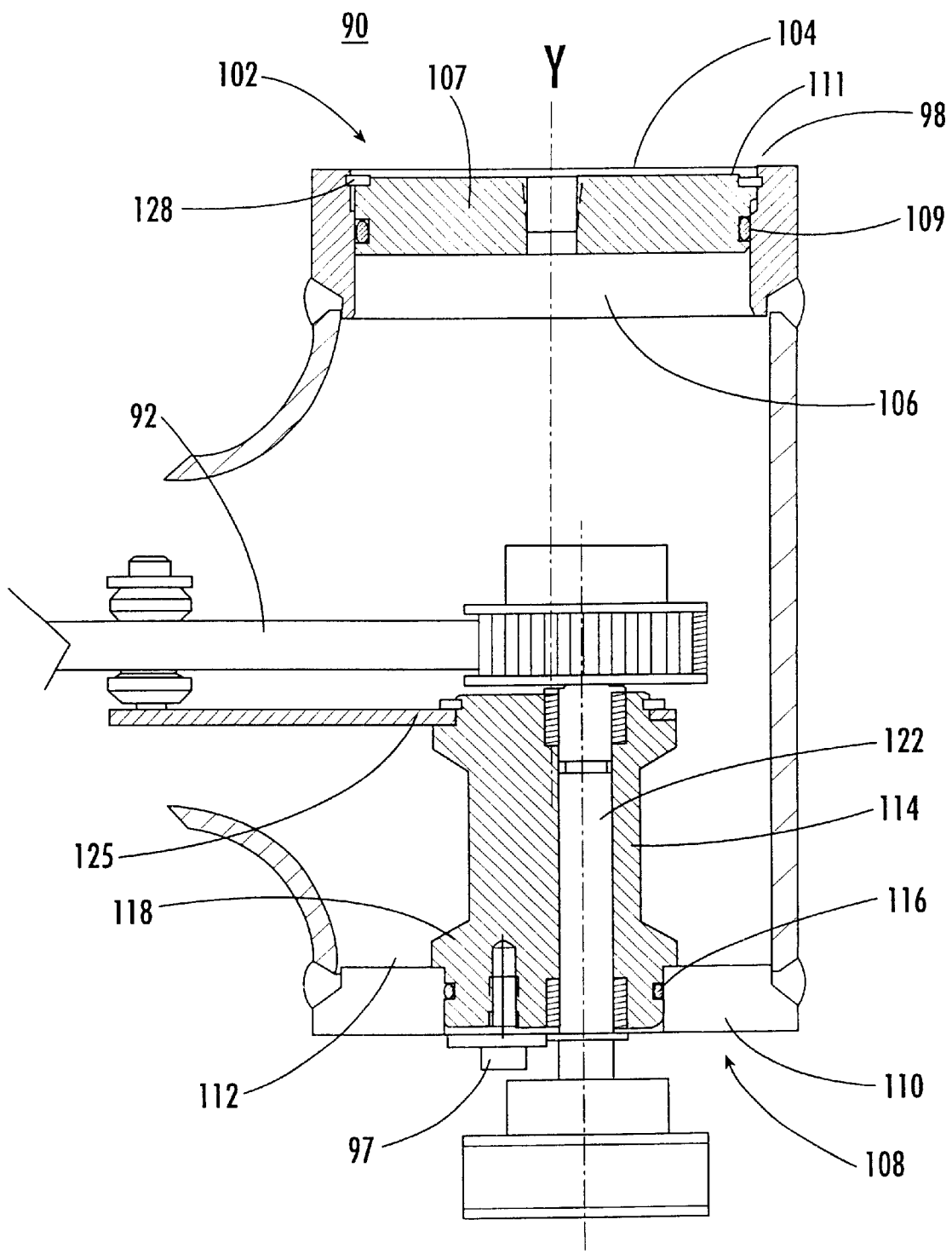
FIG. 6A is an enlarged view of some of the components of the belt drive system shown in FIG. 6.
Figure 10:
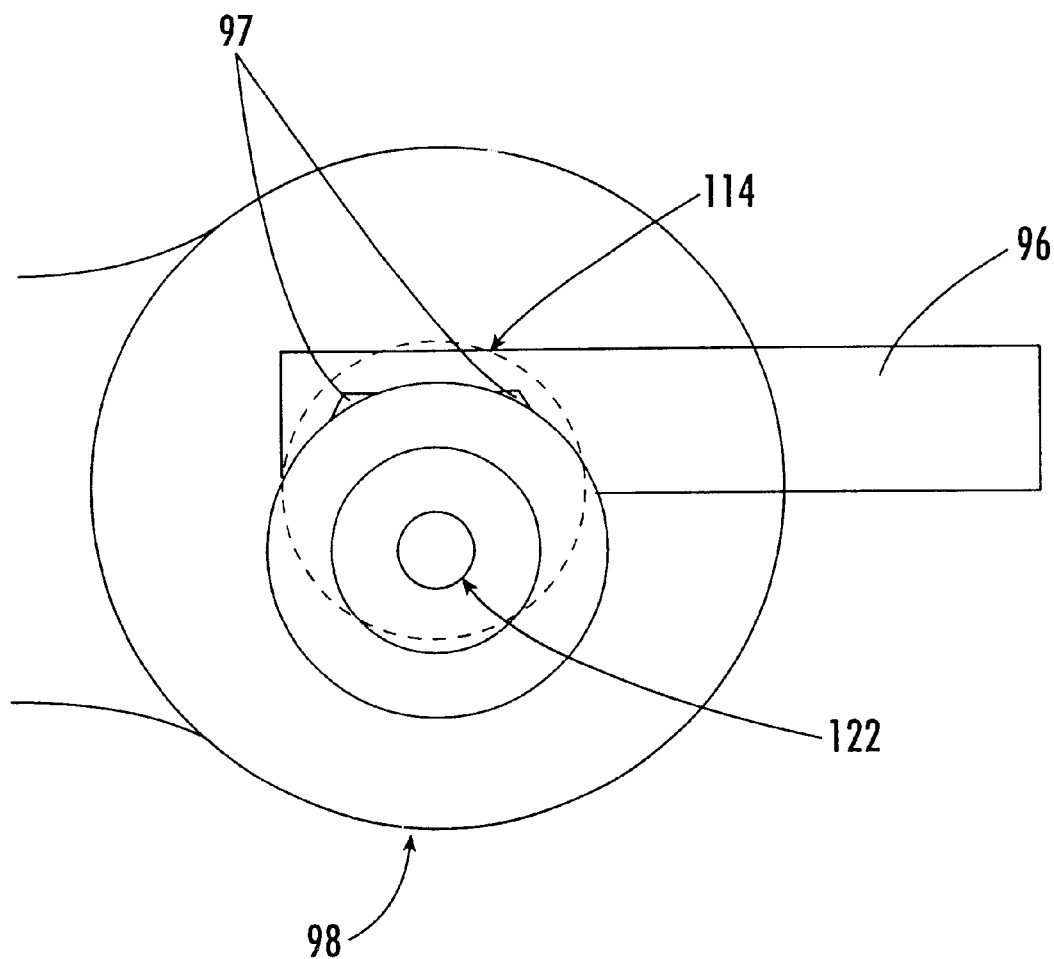
FIG. 10 is a top view illustrating the operation of some of the components included in the drive piping tee of the belt drive system.

Referring now to FIGS. 6, 6A and 10 the rotating drum adsorber process and system of the present invention also includes a process and system for supporting and rotating the adsorbent drum 36 within the pressurized containment shell 56. In the preferred embodiments, the bottom partition plate 68 is fixedly attached to the walls of the containment shell 56 and the top partition plate 66 is adjustable. As shown in FIG. 7, the top partition plate 66 includes a circumference area with portions of the circumference area cut away to form a pie-shaped plate. With portion of the circumference area cut away, there is less area which must be flat to form a seal thereby providing a better seal. In the preferred embodiments, the bottom partition plate 68 includes two round retaining rods 86 attached thereto and extending upward above the upper surface of the drum 36. As shown in FIG. 6, the rods 86 support drum positioning rollers 88 which are preferably located at the middle section of the rotating drum 36. The top partition plate 66 is preferably spring-loaded onto the rods 86 with springs 89 and the spring-loaded top seal plate 66 bears down on the drum 36 and may be adjusted upward or downward on the two round retaining rods 86 to accommodate slightly variable drum heights.

In the preferred embodiments, the process and system for rotating the adsorbent drum 36 within the containment shell 56 includes a belt drive system 90 which is designed for operation at elevated pressure and eliminates the alignment problem and tendency of the drum 36 to jam and the motor shaft to break. As best seen in FIGS. 6, 6A and 7 the belt drive system 90 includes an adjustable inner belt 92 coupled to an external motor drive 94 which is driven by a DC motor 93. Preferably, the motor 93 is controlled by an AC-to-DC controller which is fed 230 volts power by a remotely-located system controller 180 described below. The AC-to-DC controller may be located either adjacent to the motor 93 or in a remote location. In a simple embodiment, the controller may be a simple rheostat which may be set by the manufacturer, or optionally, by the user. Alternatively, the controller may incorporate a microprocessor mounted on a printed circuit board. By programming the microprocessor appropriately, the drum motor may then be controlled as a function of input signals received by the microprocessor from other components of the adsorber system 20. The selection of a suitable motor 93 and AC-to-DC controller would be obvious to one of ordinary skill in the art.

The inner belt 92 can be adjusted from outside the drum 36 thus allowing tightening of the belt 92 without depressurizing the rotating drum adsorber system and while maintaining a constant contact area to provide consistent belt tension. As shown in FIGS. 6 and 6A, the belt drive system 90 of the present invention is coupled inside a piping tee or housing 98 such as, by way of example, a four inch reducing tee, attached to one side 100 of the pressurized containment shell 56 containing the drum 36. As best seen in FIGS. 7 and 10 a locking or adjusting lever 96 extends outward from the piping tee 98 and is secured with bolts 97 and the maximum belt tension is limited by varying the length of the locking lever 96. In use, the lever 96 is freed by loosening the bolts 97. The lever is turned to apply a tightening force on the adjustable inner belt 92 and the bolts 97 are retightened. As best seen in FIG. 6A, the piping tee 98 has a top end 102 including a circular top plate 104 with a large opening defining an access port 106 to facilitate belt installation, and a bottom end 108 including a bottom plate 110 with a large opening 112 and an eccentric adjuster 114 positioned in the bottom plate 110. The preferred eccentric adjuster 114 is fixed in place but may be alternatively secured by springs connecting the adjuster to the bottom plate 110 of the piping tee 98 so that belt slackening is automatically taken up by the spring tension. In the first preferred embodiment, the eccentric adjuster 114 is sealed to the bottom plate 110 with a radial o-ring groove 116 which is inserted from the top end 102 of the piping tee 98. The preferred eccentric adjuster 114 includes a shoulder 118 that rests on the inside of the bottom plate 110 to retain it inside the pressurized piping tee 98. The eccentric adjuster 114 is secured from the outside and is prevented from rotating, after the belt 92 is tightened, by the bolts 97 securing the locking lever 96 in place.

As shown in FIG. 6, a drive shaft 122 extends through the eccentric adjuster 114 and is offset from the vertical center line Y of the eccentric adjuster 114. The drive shaft 122 is arranged to rotate within the eccentric adjuster. As best shown in FIG. 10, the eccentric adjuster 114 may be rotated to provide inner belt 92 adjustment to change the tension on the belt 92 by rotationally moving the drive shaft 122 closer to or further away from the rotating drum 36. As shown in FIG. 7, the belt drive system 90 also includes a bracket 124 with two idlers 126 mounted to it to prevent the adjustable inner belt 92 from touching the pressurized containment shell 56. The bracket 124 is preferably secured with a retaining ring 125 which is adapted to freely rotate around the eccentric adjuster 114. In operation, the eccentric adjuster 114 may be rotated causing the drive shaft 122 to move in and out while the bracket 124 remains in the same location within the piping tee 98. This design maintains a constant contact area with the desiccant drum 36 for consistent belt and drum roller loading and for insuring that predictable friction forces are maintained.

Referring again to FIG. 6A, the access port 106 at the top end 102 of the piping tee 98 is closed by a flat head 107 including a radial o-ring seal 109. The head 107 is uniquely designed to be retained by a retaining ring 128 in a manner which prevents the head 107 from being removed while the rotating drum adsorber system is pressurized. The head 107 includes a raised shoulder 111 which is slightly smaller than the internal diameter of the retaining ring 128 when it is installed. Because the wall of the retaining ring 128 must be pulled inward for removal of the head 107 it is impossible to remove the head 107 without pushing the top of the raised shoulder 111 below the bottom of the retaining ring 128. When the rotating drum adsorber system is pressurized, the pressure forces the raised shoulder 111 of the head 107 up through the inside of the retaining ring 128 such that the retaining ring 128 cannot be removed. Thus, the system pressure must be released before the head 107 will move down thereby allowing the retaining ring 128 to be removed. This unique design provides an access port closure which may be quickly removed when the rotating drum adsorber system is depressurized yet is almost impossible to remove while the system is pressurized for safer operation and to permit easy access for installing the belt 92 without disturbing other parts of the belt drive system 90.

As described previously, in the preferred embodiments shown in FIGS. 1 and 2 the regeneration exhaust stream 46 exiting from the regeneration sector outlet 41 is cooled. Preferably, the cooling device 47 utilized to cool the regeneration exhaust stream 46 is a heat exchanger located as shown in FIGS. 5A and 5B. In a first preferred embodiment of the heat exchanger 47 the heat exchanger 47 may be air-cooled, and a fan may be utilized to blow air across the heat exchanger coils to aid in the cooling process. Preferably, such a fan may be controlled by a 120 VAC contactor which has adjustable thermal trip points and wiring. In a second preferred embodiment of the heat exchanger 47 the heat exchanger 47 may be water-cooled.

Figure 11:
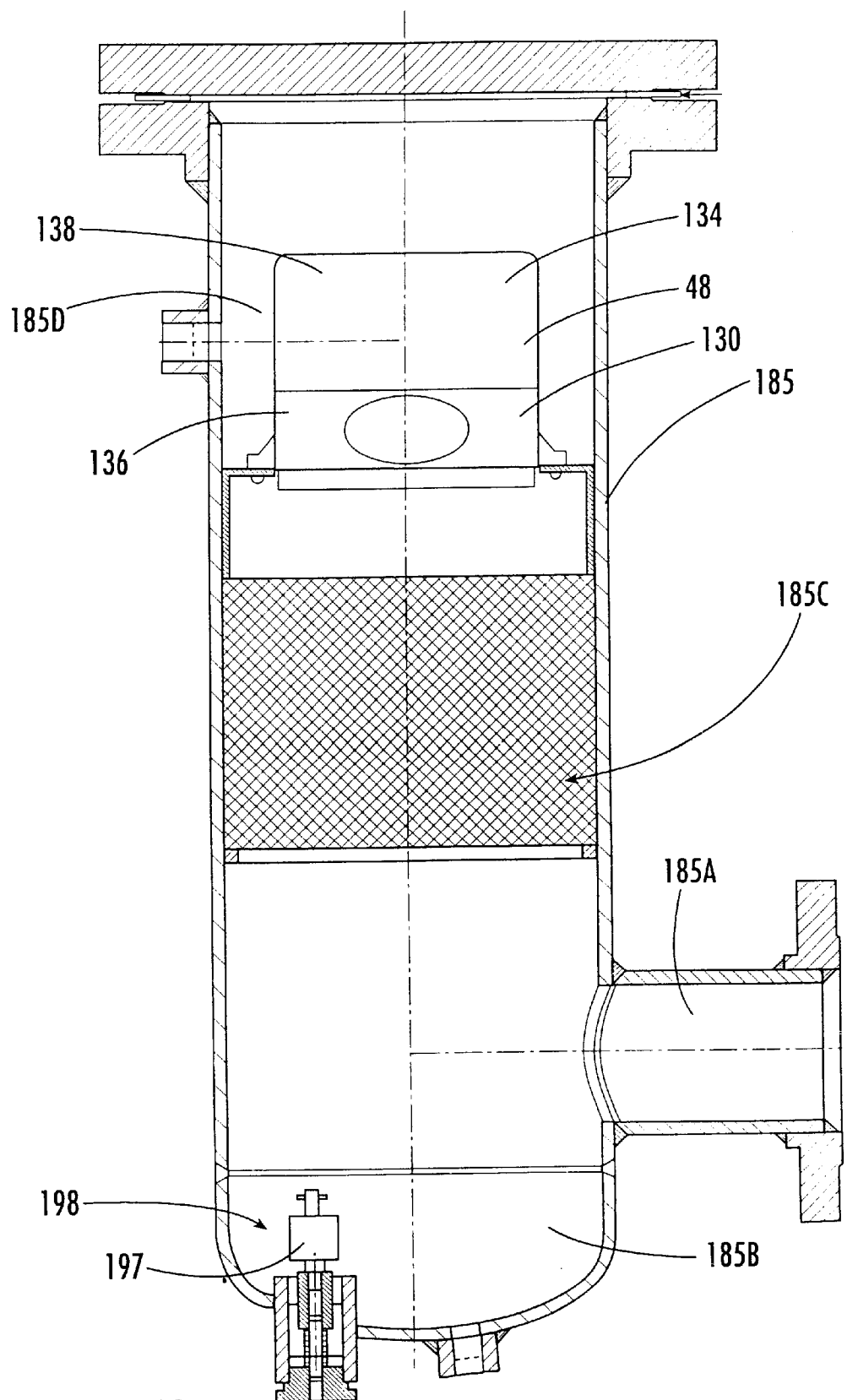
FIG. 11 is a side, cross-sectional view of a unit for separating moisture from the regeneration exhaust stream and for increasing the pressure of the stream using a blower motor assembly enclosed within the separator housing.

Also as described previously, condensed water is separated from the cooled regeneration exhaust stream 46. Further, because the regeneration exhaust stream 46 exiting the regeneration sector outlet 41 is at a lower pressure than the moist gas feed inlet stream 30 the pressure of the cooled regeneration exhaust stream 46 must be increased prior to combining it with the higher pressure moist gas feed inlet stream 30. FIG. 11 is a side, cross-sectional view of a unit for separating moisture from the regeneration exhaust stream 46 and for increasing the pressure of the stream 46. Such a unit comprises a pressurized separator housing 185 an inlet 185A, a sump region 185B, an automated drain valve system 198 a demister 185C, a pressurization region 185D and an outlet 185E. The regeneration exhaust stream 46 enters the housing 185 through the inlet 185A and rises within the unit. Moisture in the stream 46 condenses and drops into the sump region 185B, in which the automated drain valve system 198 is located. A demister 185C may also aid in separating moisture from the stream 46. Rising drops of water tend to strike the surfaces of the demister 185C and then drip back down into the sump region 185B.

The water may be drained from the sump region 185B by utilizing the automated drain valve system 198. The automated drain valve system 198 comprises a drain 198A, a primary drain valve 194 controlled by a primary drain valve solenoid 196A, a secondary drain valve 195 controlled by a secondary drain valve solenoid 196B and a liquid level sensor 197. The automated drain valve system 198 is operated by periodically energizing the primary drain valve solenoid 196A to open the primary drain valve 194 allowing water to drain out of the sump region 185B of the housing 185 through the drain 198A. Alternatively, the primary drain valve solenoid 196A may utilize a dual mode timer, with one set time for how often the solenoid valve 196A should be energized and another set time which controls how long the solenoid valve 196A will remain energized. If for some reason the primary drain valve 194 fails to operate properly, or if water builds up within the sump region 185B too quickly, then the water level may rise to the level of the liquid level sensor 197. Such an event triggers the energizing of the secondary drain valve solenoid 196B to open the secondary drain valve 195 allowing the water to exit through the drain 198A. The electrical operation of these events will be described later.

A feature of the present invention is the process and system utilizing a uniquely designed high speed blower 48 to increase the pressure of the regeneration exhaust stream 46 for combining it with the higher pressure moist gas feed inlet stream 30. A preferred embodiment of the high speed blower 48 includes a blower fan 130 an electrical blower controller assembly 132 and a motor assembly 134. As shown in FIG. 11, the motor assembly 134 is preferably enclosed with the blower fan 130 in a blower/motor casing 136 in the pressurization region 185D inside the pressurized separator housing 185. Because the preferred motor assembly 134 runs at high speeds from approximately 5,000 to 30,000 rpm, the blower fan 130 may be relatively small, with a much smaller diameter impeller than might otherwise be required. In the preferred embodiment, the fan 130 preferably includes backward curved centrifugal impeller vanes for yielding high flow rates at high differential pressure.

The motor assembly 134 of the high speed blower 48 of the preferred embodiment includes a brushless direct current (DC) motor 138. The brushless DC motor 138 has a long life and can operate at the high speed required to operate the blower 48 successfully. An exemplary motor 138 suitable for use with the present invention is a 240 VAC brushless DC high flow bypass blower with standard fan and no exhaust tube provided by AMETEK, Kent, Ohio, Part No. 119420-00.

The blower controller assembly 132 controls the operation of the blower 48. In the preferred embodiment, the blower controller assembly 132 including the electrical controls of the high speed blower 48 is separated from the blower/motor casing 136 contained within the pressurized separator housing 185 in order to protect the electrical controls of the blower 48 from the heat and high pressure conditions within the housing 185 The blower controller assembly 132 is housed within a first enclosure 142 and includes a blower motor controller 146 mounted on a standard blower motor board 133 which is a small printed circuit board (PCB). The electrical interconnection between the blower motor 134 and the blower controller assembly 132 is best shown schematically in FIG. 17. The blower controller assembly 132 supplies high-voltage power to the motor assembly 134 via stator driver power supply connections 132A, and supplied low-voltage power to sensor devices on the motor assembly 134 via sensor power supply connections 132B. In addition, motor operating speed information is received by the blower controller assembly 132 from the motor assembly 134 via additional sensor feedback connections 132C. The operation of these connections is next described.

Figure 16:
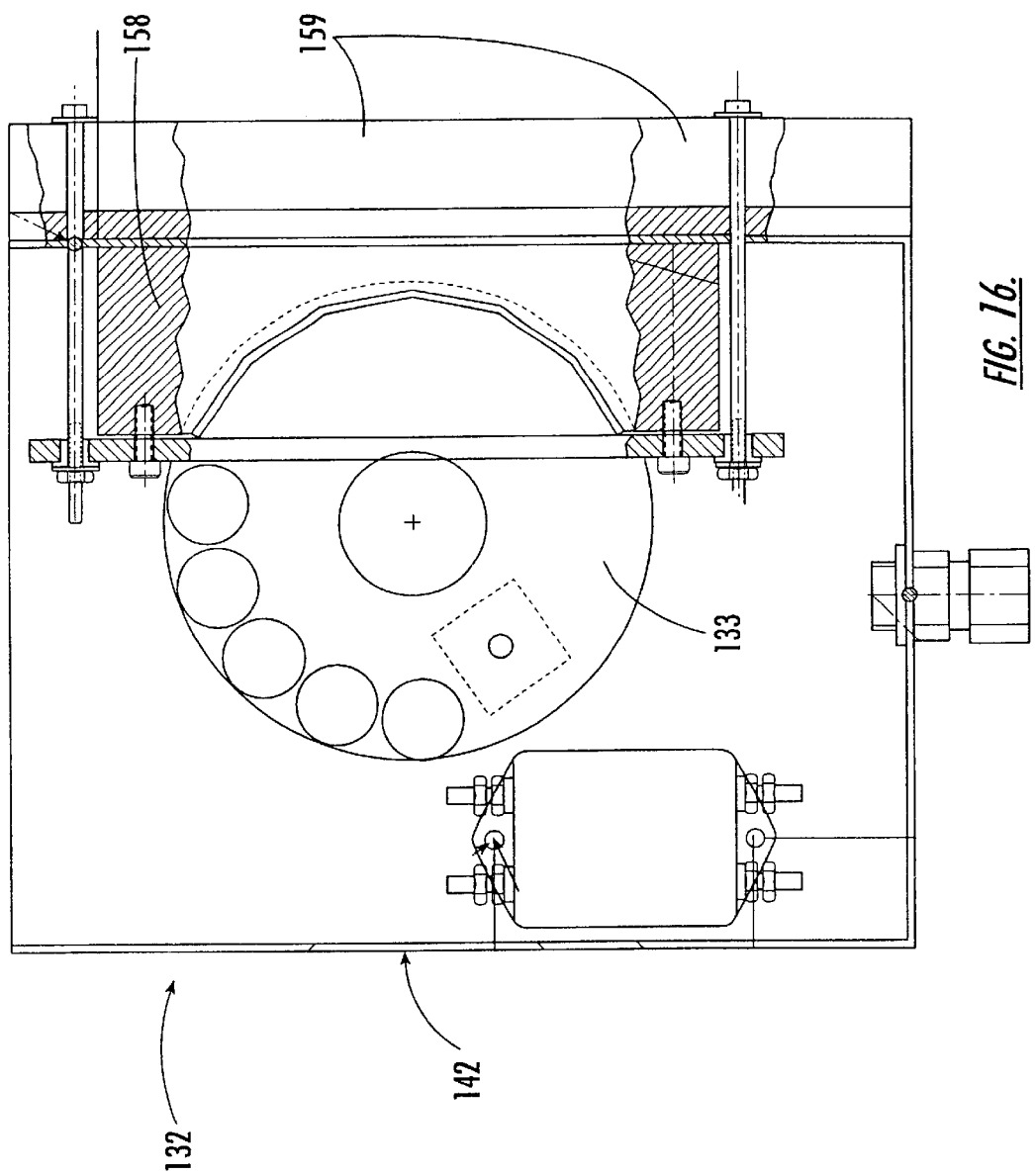
FIG. 16 is a top, partial cross-sectional view of the blower controller assembly enclosure.
Figure 17:
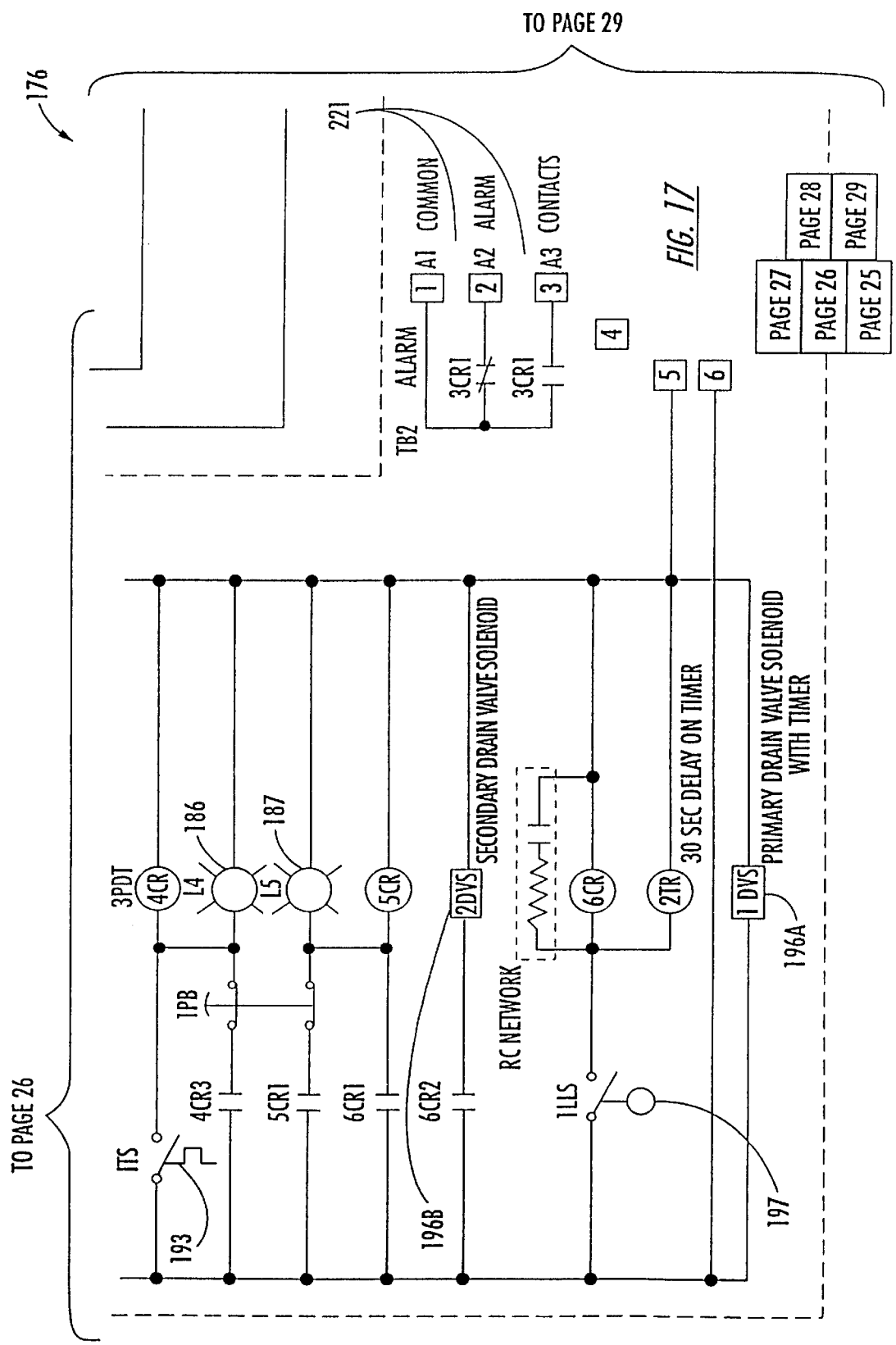
FIG. 17 is a schematic diagram of the electrical system of the first preferred embodiment of the present invention including the blower controller assembly.
Figure 17:
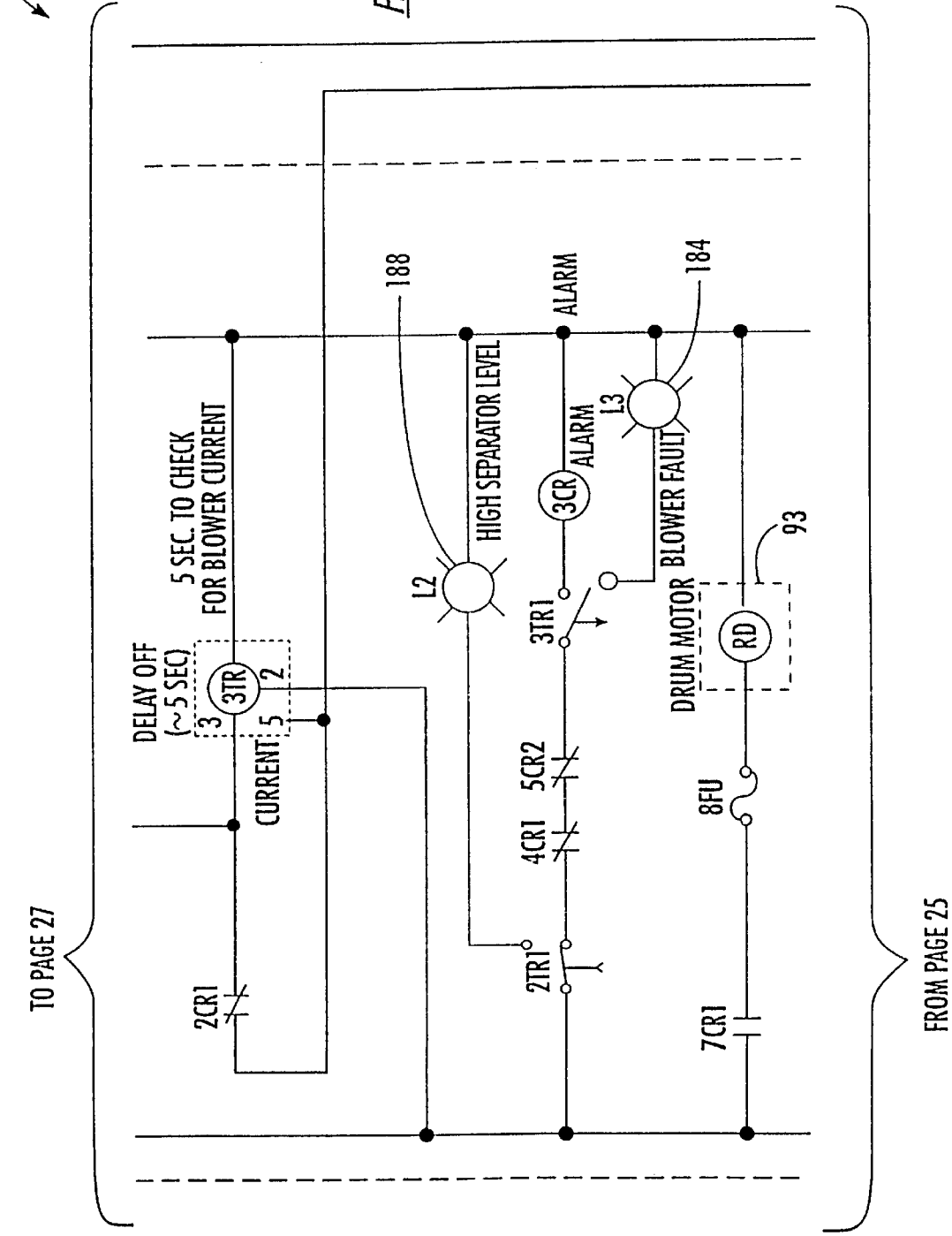
Figure 17:
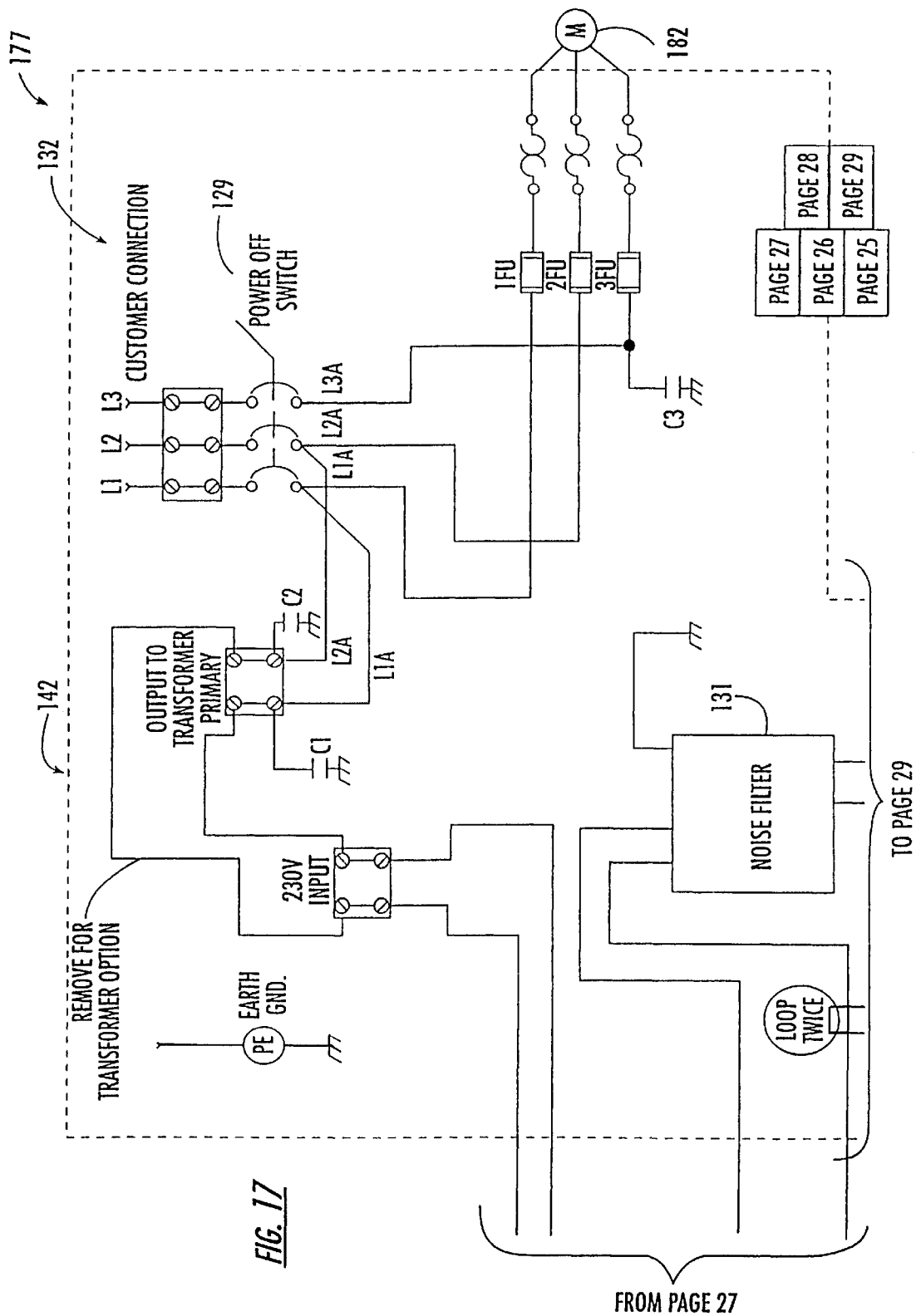
Figure 17:
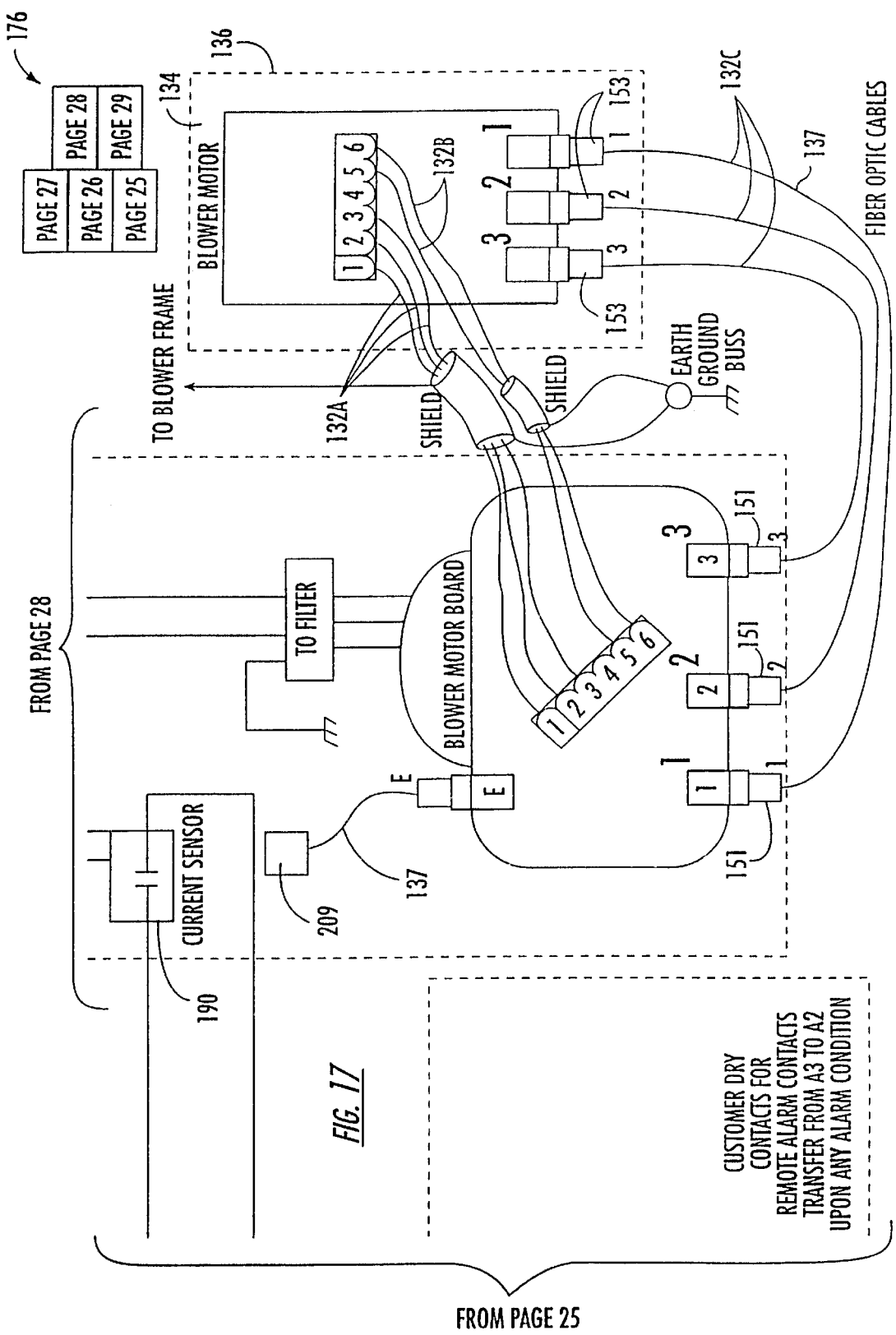

Referring now to FIG. 16, the electrical controls of the controller assembly 132 are housed within a first enclosure 142. As shown in FIG. 17, the electrical controls of the controller assembly 132 are preferably controlled by a relay 149 which is energized through a fuse 150 and a series of relay contact switches 152. The blower motor controller 146 controls the blower motor 138 by providing pulses of high-voltage power to the motor 138 via each of the stator driver power supply connections 132A sequentially. The motor 138 includes a plurality of stator windings or coils, each of which corresponds to a particular power supply connection 132A. When the motor 138 receives an electrical pulse on one of the power supply connections 132A, the coil corresponding to the connection 132A is energized. By controlling the sequence and timing of the electrical pulses, the operation of the motor 138 may be effectively controlled.

The operation of the motor 138 may be farther controlled using one or more position-sensing or speed control sensor devices and a feedback loop. In a preferred embodiment of the present invention, the sensor devices are Hall Effect sensors, but it should be clear to one of ordinary skill that alternative methods of determining speed may be utilized, including, but not limited to, back EMF frequency detectors, laser indicators and other speed control sensors. Power may be supplied to the Hall Effect sensors by the blower motor controller 146 via Hall Effect power supply connections 132B. Preferably, the motor assembly 134 includes one Hall Effect sensor for each stator driver power supply connection 132A such that each sensor corresponds to one stator driver power supply connection 132A. As the rotor turns, it passes by each of the Hall Effect sensors sequentially, and a feedback signal is generated by each sensor. Each Hall Effect sensor transmits its respective feedback signal back to the blower motor controller 146 via a respective Hall Effect feedback connection 132C. Upon receiving a feedback signal from one of the Hall Effect sensors, the blower motor controller 146 generates an electrical pulse on the corresponding stator driver power supply connection 132A. Thus, the coils of the blower motor 138 may be energized at precisely the point in the rotation of the rotor which provides the greatest efficiency.

The blower motor control 146 should be chosen or designed to be compatible with the blower motor 138. A blower motor controller 146 suitable for use with the present invention, and preferable because of its ready availability, is a 1200 W modified external brushless DC blower controller with mechanical speed control provided by AMETEK, Kent, Ohio, Part No. 48125-00. However, the preferred embodiment of the blower motor controller 146 includes a number of features, described next, which have not previously been incorporated in a blower motor controller 146 Preferably, IGBT-type transistors are IGBT-instead of MOSFETS, thus providing controls that run faster, cooler, trigger quicker and have longer life. Further, in the preferred embodiment, the blower controller assembly 132 includes a speed adjustment device 148 for adjusting the speed of the blower motor 138 to increase or decrease the amount of pressure boost provided by the blower 48. The means for adjusting the speed of the blower motor 138 to a particular pressure may also include means for automatically controlling the speed of the blower 48 such as, by way of example, a pressure transducer connected to a microprocessor. The speed adjustment device 148 is easily accessible and is preferably top mounted to provide better access for adjusting the speed of the blower 48. This is necessary because the speed of the blower 48 should be readily adjustable during normal operation of the system 20. The speed adjustment device 148 is preferably a +10 VDC power supply or a potentiometer. One example of a potentiometer, suitable for use with the present invention, is the speed adjustment potentiometer Bourns 32964-1 503 (top adjust). The speed adjustment device 148 preferably generates a 0–10 VDC analog control signal and transmits it to the blower controller assembly 132. Although in the preferred embodiment an analog signal of varying magnitude is utilized, it will be clear to one of ordinary skill that other types of control signals may be utilized, such as a pulse-width modulated square wave varying in frequency from 150 to 400 Hz, or some other variable frequency AC motor drive and controller. It will also be clear to one of ordinary skill that alternatively, the motor assembly 134 of the present invention may include a synchronous speed AC motor and gear drive to cause it to run at high rpm levels.

Figure 17A:
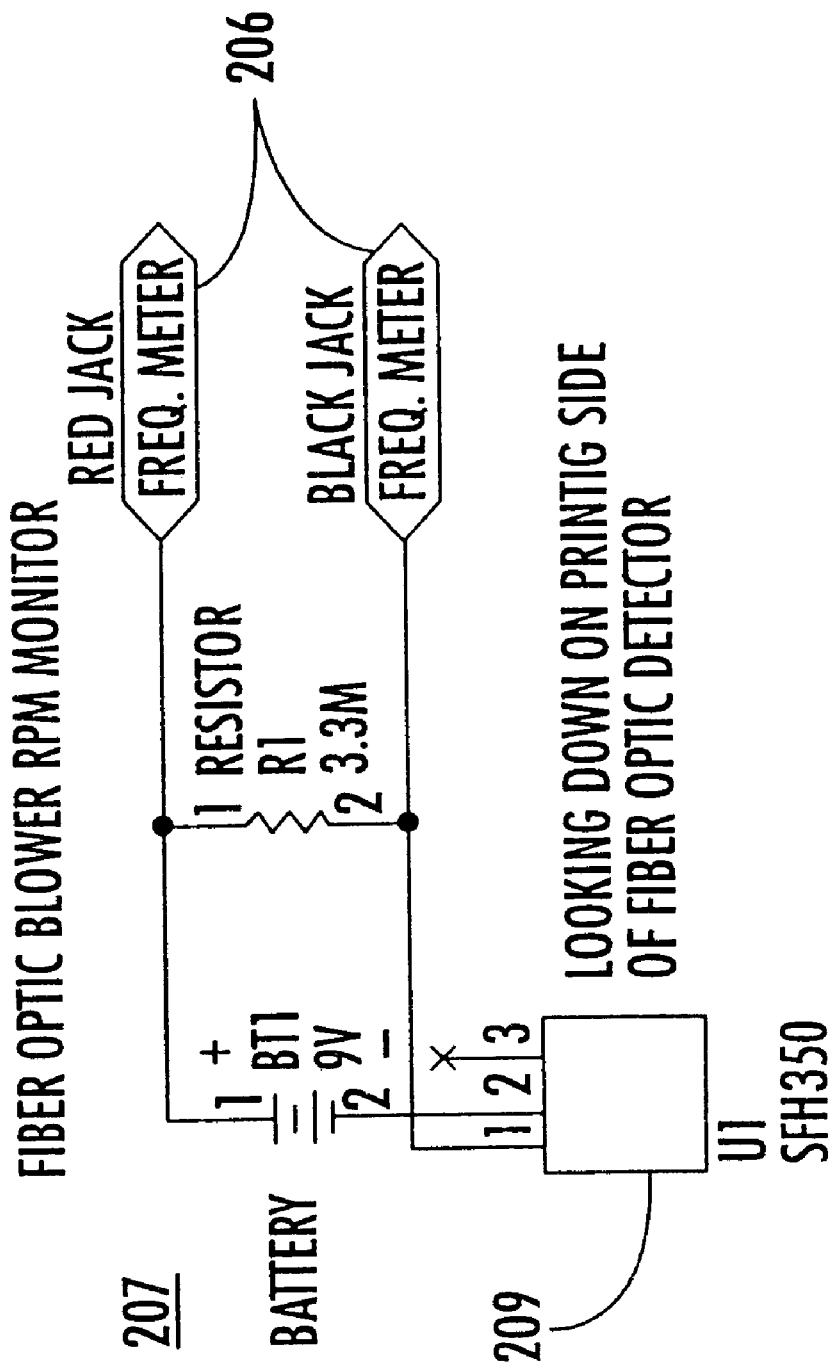
FIG. 17A is an electrical circuit schematic of a monitor interface circuit.

The speed of the motor 138 can be further controlled by utilizing the feedback signals from the Hall Effect sensors to determine the current speed of the motor 138 and to use this information to adjust the speed accordingly. This function may be accomplished utilizing one of the speed sensors, its respective feedback connection 132C, a frequency meter or monitor 206 and a monitor interface circuit 207. FIG. 17A is a schematic diagram showing a monitor interface circuit 207 suitable for use with the present invention. Each time the controller assembly 132 receives a pulsed signal from the selected speed sensor via its respective feedback connection 132C, it transmits a corresponding pulse to the input 209 of the monitor interface circuit 207. The frequency meter 206 may be connected to the monitor interface circuit 207 to count the number of pulses per second. By multiplying the number of pulses per second by 30 the speed of the blower motor 138 may be determined and the pressure boost provided by the blower motor 138 at that speed can be calculated for optimum performance of the rotating drum adsorber system and process.

In a preferred embodiment, the Hall effect feedback connections 132C and the monitor interface circuit input 209 comprise fiber optic signal cables 137. The low voltage signals generated by the Hall effect sensors and the low voltage signals transmitted to the monitor interface circuit 207 are very susceptible to electromagnetic interference from the high voltage power supply connections when carried by conventional wire cables. When the electromagnetic interference is of sufficient magnitude, the blower controller assembly 132 may interpret a signal generated by that interference on a conventional wire cable as a feedback signal generated by a Hall effect sensor. As a result, the blower controller assembly 132 could lose track of the rotor position and could energize the stator windings at inappropriate times, which could result in excessive current and catastrophic failure of the motor 138. Similarly, an extra pulse on the input to the monitor interface circuit 207 may cause the frequency meter 206 to register an inaccurate speed. Fiber optics, however, are unaffected by electromagnetic interference, and thus provide increased reliability.

Figure 13:
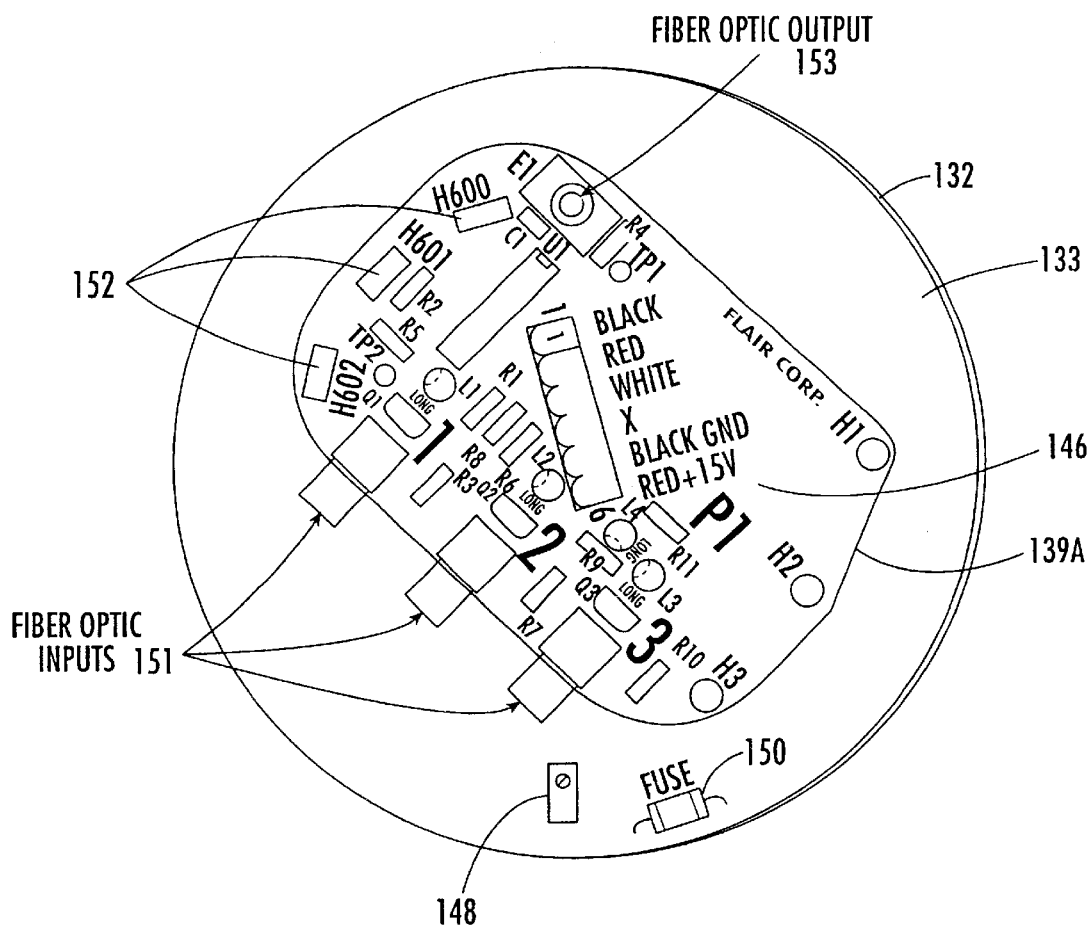
FIG. 13 is a top view of an electrical blower controller assembly.

FIG. 13 shows a top view of an electrical blower controller assembly 132 in which an auxiliary blower motor board 139A is "piggy-backed" on the standard blower motor board 133 in order to accommodate the functionality required to utilize fiber optic signal cables. Thus, the power supply connections 132A, 132B and the sensor feedback connections 132C may be connected to the blower controller assembly 132 via the auxiliary blower motor board 139A rather than directly to the standard blower motor board 133. The auxiliary blower motor board 139A may then be connected to the standard blower motor board 133 at the connection points which were designed to be used for direct connections between the power supply connections 132A, 132B and sensor feedback connections 132C and the board 133 as can be seen by comparing FIGS. 13 to 13A, which shows a top view of an electrical blower controller assembly in which the power supply connections 132A, 132B and sensor feedback connections 132C are connected directly to the standard blower motor board 133.

Figure 13A:
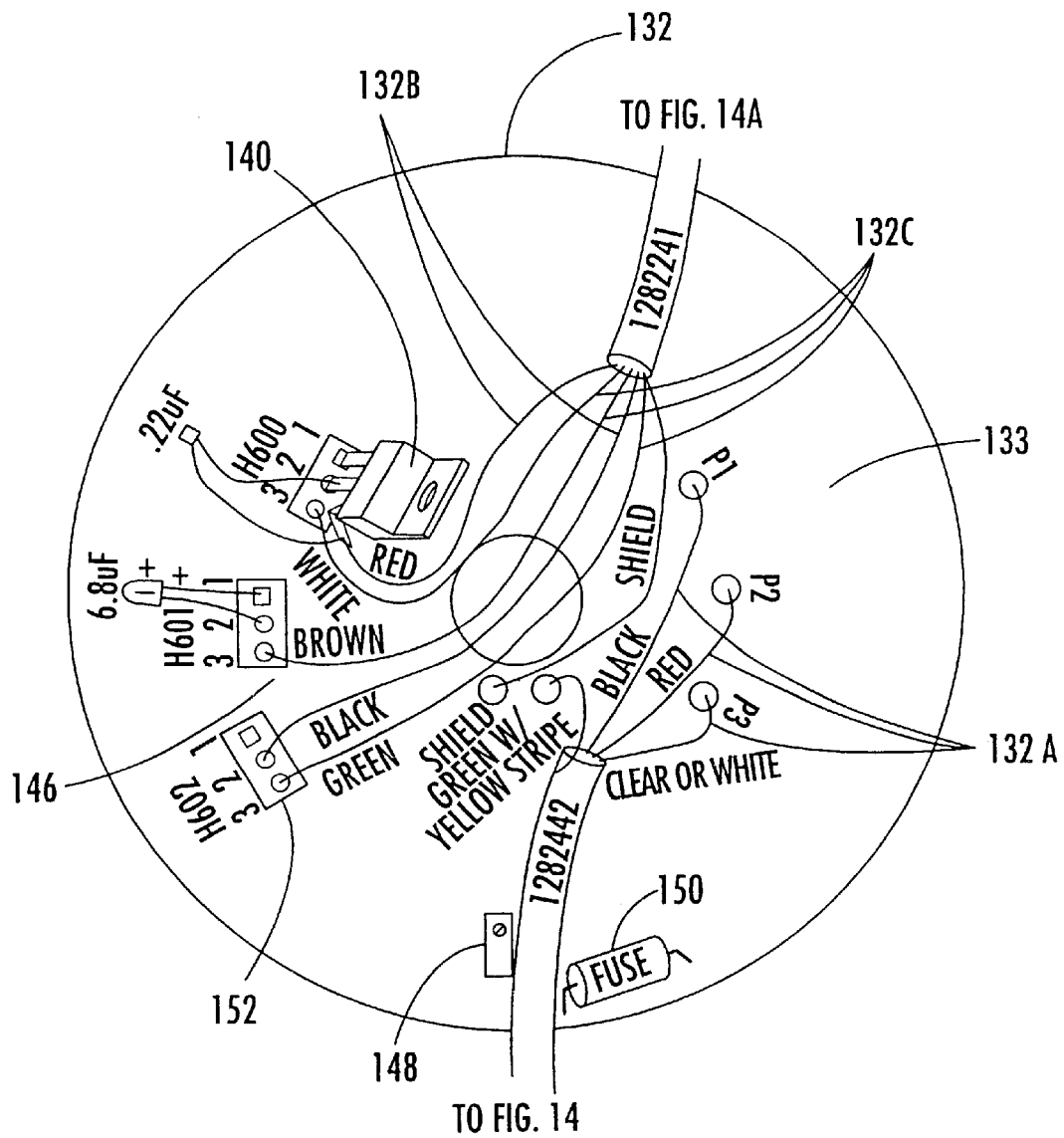
FIG. 13A is a top view of an alternative electrical blower controller assembly.

It should be obvious to one of ordinary skill in the art, however, that other methods may instead be utilized in the blower controller assembly 132 shown in FIG. 13A, without the auxiliary blower motor board 139A, to limit the effects of such electromagnetic interference. For example, additional ceramic filter capacitors may be located on the motor assembly 134 to filter out the high voltage transients that could damage the Hall Effect switches or cause misfiring. In addition to the ceramic filter capacitors, a voltage regulator 140 may be added to the Hall Effect power supply circuit along with all the necessary wires and cables to the controller assembly 132 as shown in FIG. 13A. The voltage regulator 140 may act as a filter to reduce the noise and problems which may be created by the wiring distance thereby causing the Hall Effect switches to misfire. A preferred voltage regulator 140 may reduce the Hall Effect sensor input voltage from 14 volts to 6 volts in order to reduce the risk of voltage transients.

Figure 17B:
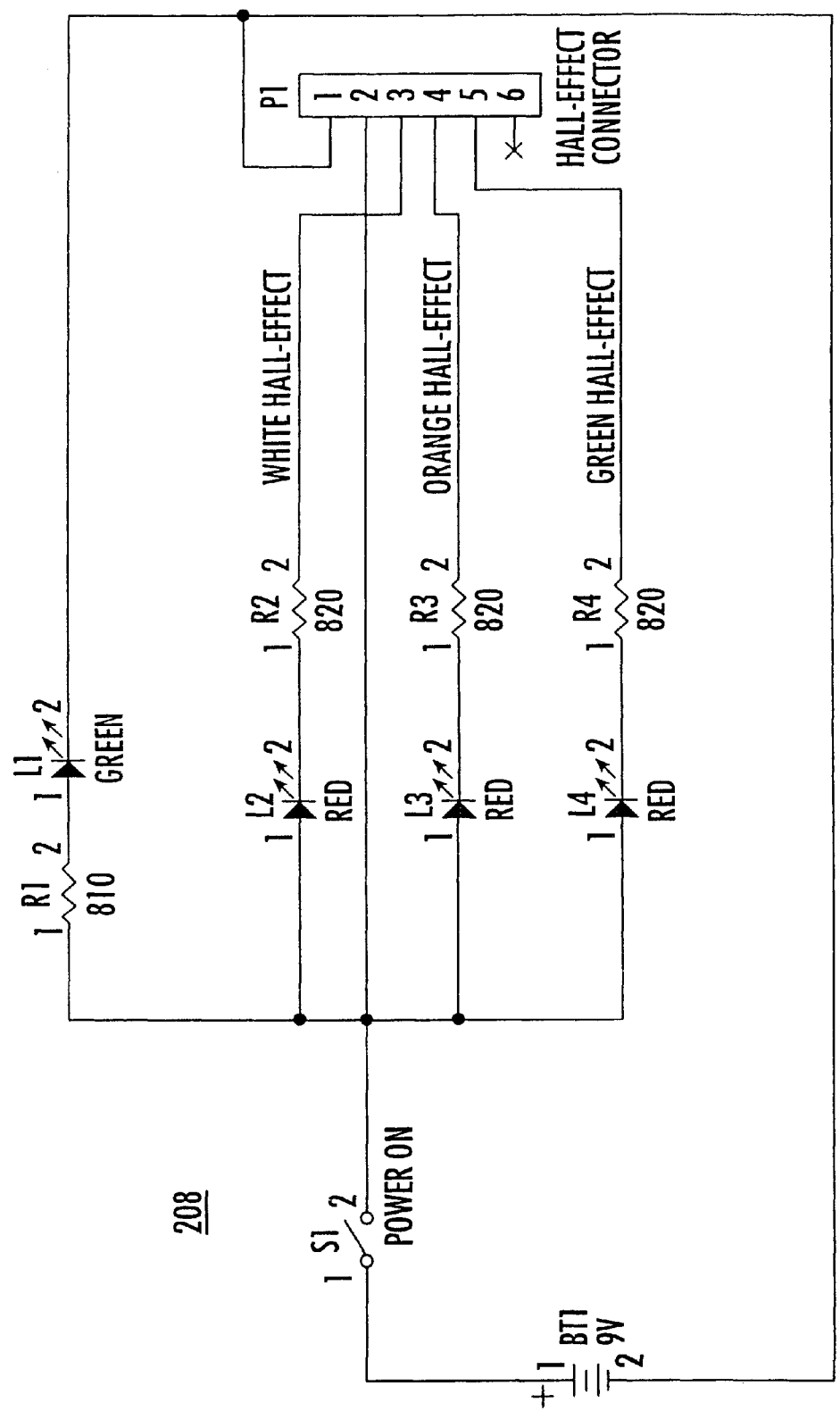
FIG. 17B is an electrical circuit schematic of a Hall Effect tester.

The blower controller assembly 132 of the preferred embodiment includes a means for determining whether the Hall Effect switches are operational. In the first preferred embodiment, the Hall effect sensors may be tested visually by examining the fiber optic emitters 153 located at the motor assembly 134 while the blower motor 138 is turned. If a light signal is generated, then the corresponding Hall effect sensor must be operational. Alternatively, the Hall effect sensors may be tested by examining the fiber optic inputs 151 at the blower controller assembly 132. If, on the other hand, conventional wire cables are utilized as feedback connections 132C, then a Hall effect tester 208 such as that shown in FIG. 17B may be utilized to test the Hall effect sensors and also provides a good quality control device to check whether the motor 138 is alert, without transmitting power to the motor 138.

Figure 14:
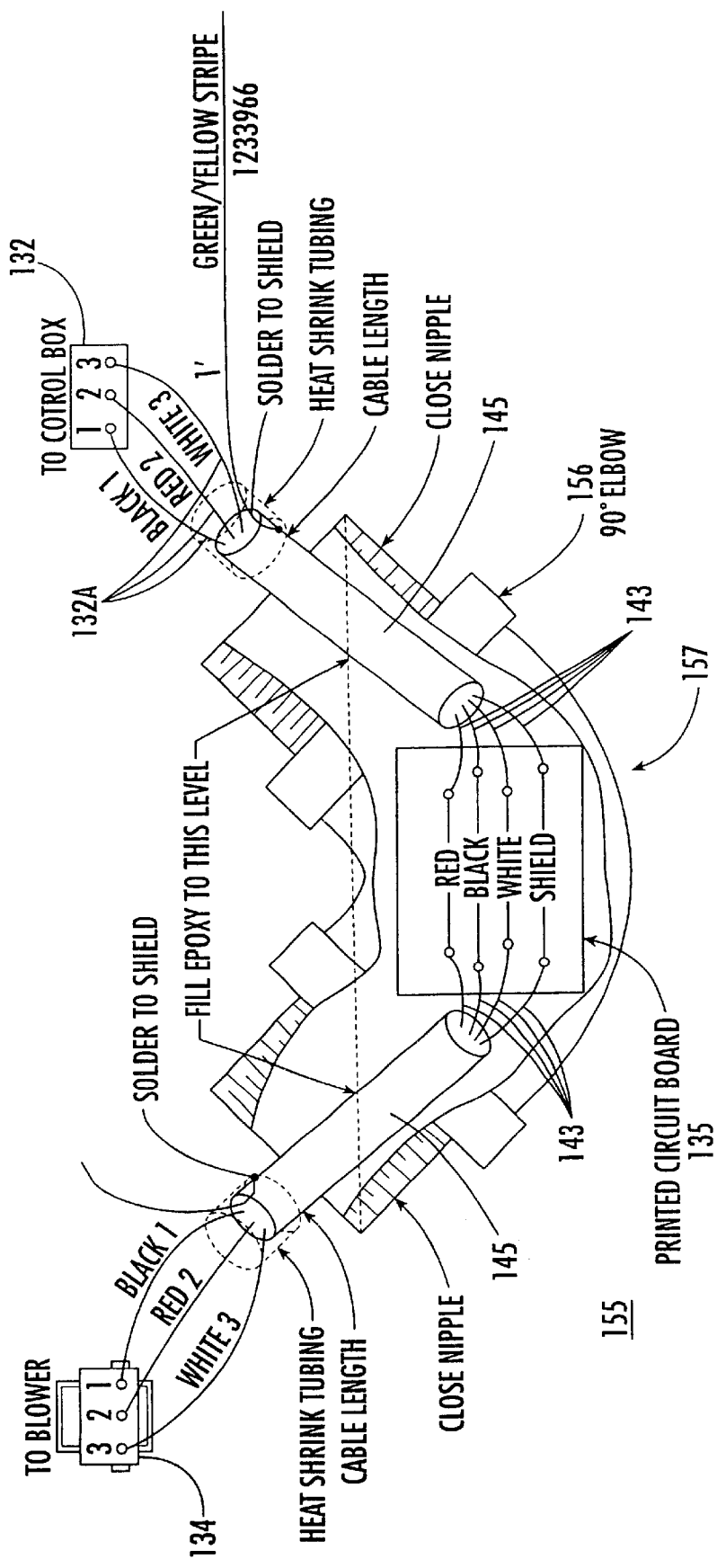
FIG. 14 is an enlarged cross-sectional view of a first seal-off for use with the present invention.
Figure 14A:
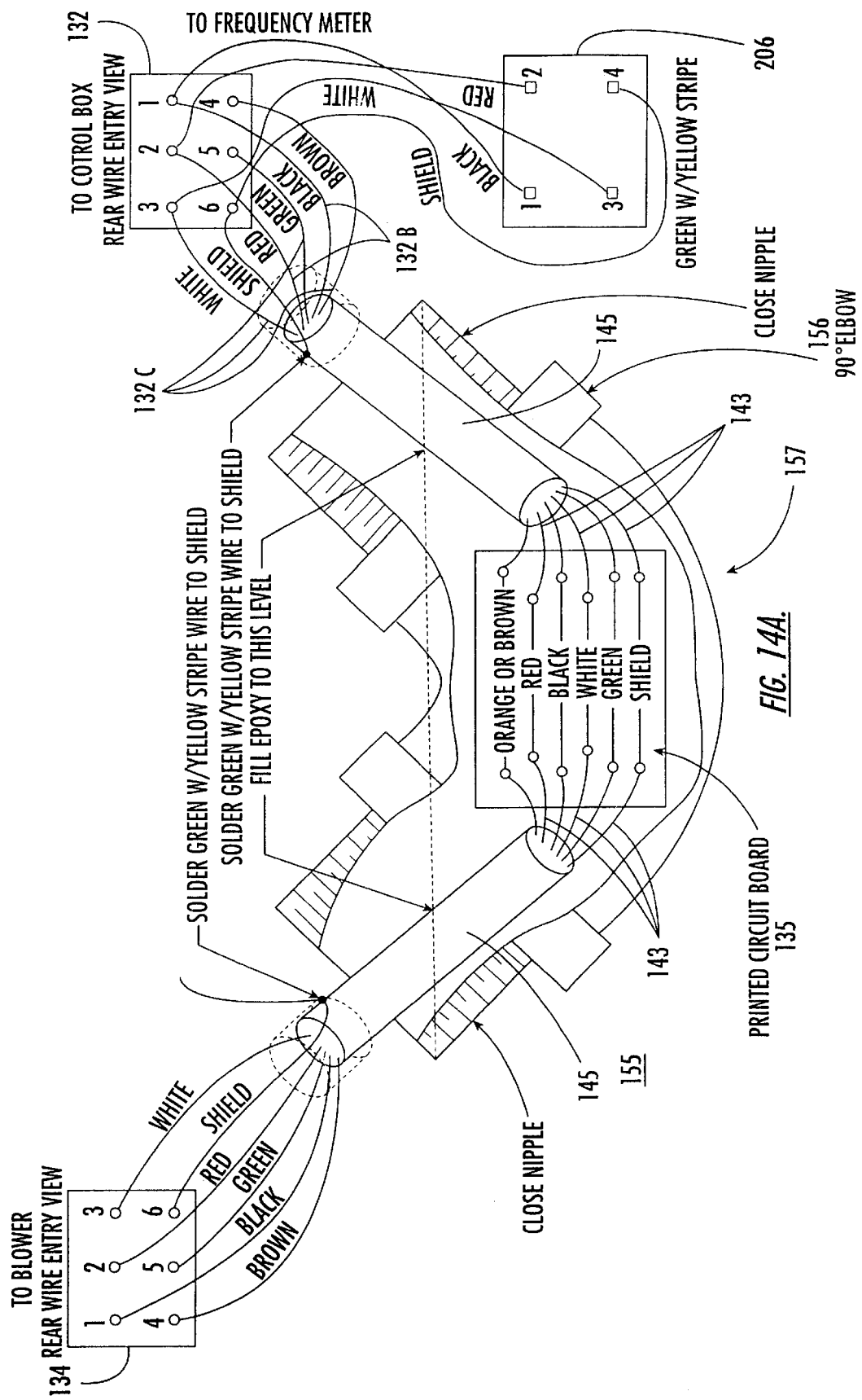
FIG. 14A is an enlarged cross-sectional view of a second seal-off for use with the present invention.
Figure 14B:
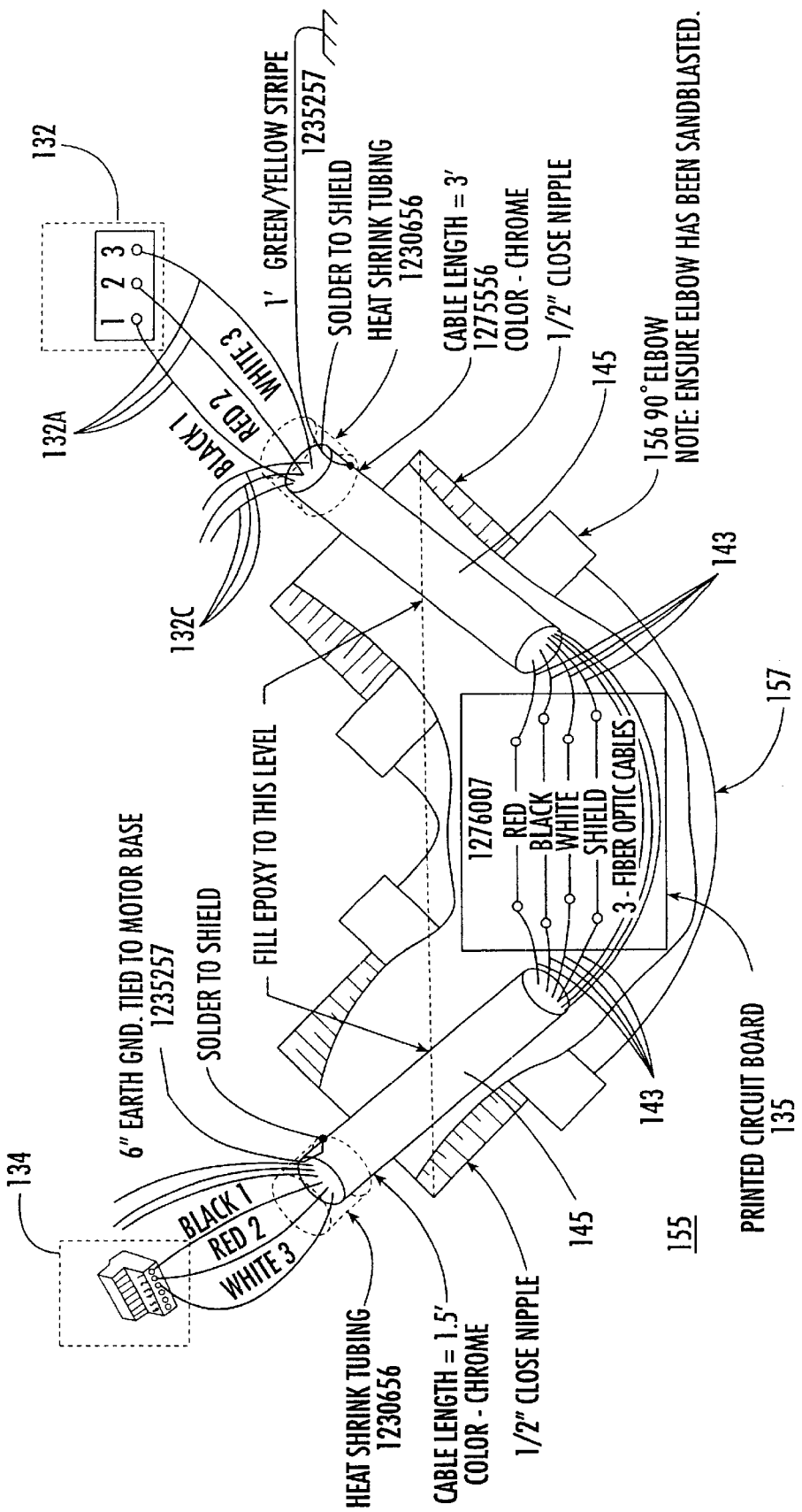
FIG. 14B is an enlarged cross-sectional view of an alternative first seal-off
Figure 14C:
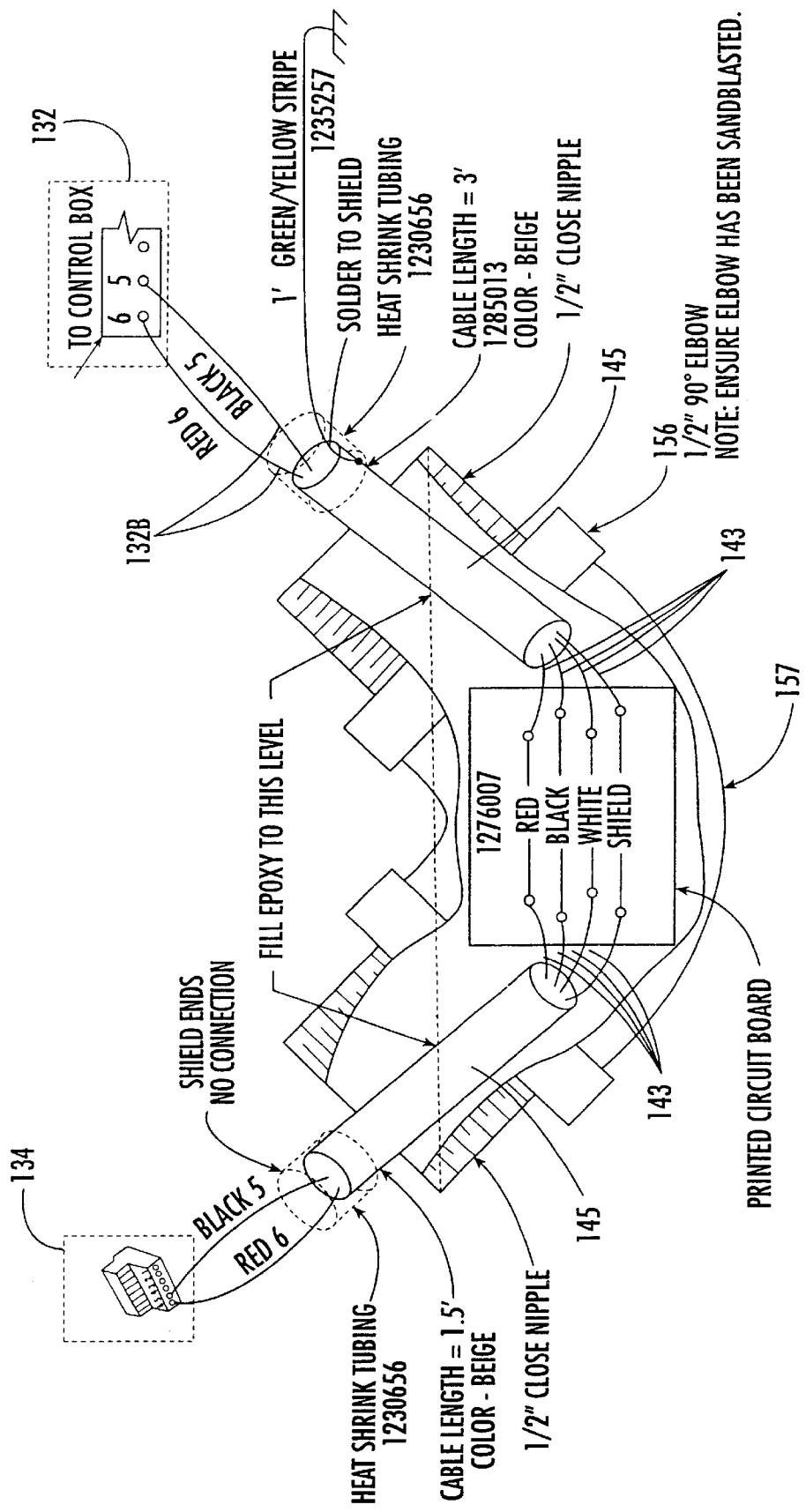
FIG. 14C is an enlarged cross-sectional view of an alternative second seal-off.

Preferably, the stator driver power supply connections 132A comprise wires 143 having suitable diameters, surrounded individually by insulation, and together surrounded by a shield 145. Similarly, the Hall effect power supply connections 132B preferably comprise additional wires 143 having suitable diameters, surrounded individually by insulation, and together surrounded by a shield 145. Also preferably, as described previously, the Hall effect feedback connections 132C comprise a set of fiber optic cables surrounded by a shield 145. As shown in FIGS. 14 and 14A, a unique seal-off 155 is utilized to reliably direct the connections 132A, 132B and 132C through the wall of the pressurized separator housing 185 in order to ensure that none of the wiring is damaged or otherwise affected by the operation of the pressurized separator housing 185 or its interior components and to maintain the pressure within the interior of the pressurized separator housing 185. Each seal-off 155 comprises a conduit 156 a small printed circuit board (PCB) 135 and a suitable epoxy filler. The conduit 156 may be, for example, a pipe fitting. The ends of a first set of wires 143 of the stator driver power supply connections 132A may be electrically connected to the blower controller assembly 132A, and the opposite ends of the wires are electrically connected to inputs on the small PCB 135 which is inserted into the conduit 156. The ends of a second set of wires 143 of the stator driver power supply connections 132A may then be electrically connected to the corresponding outputs on the same PCB 135 and the opposite ends of the wires 143 are electrically connected to the motor assembly 134. The conduit 156 should preferably have a 90 degree "elbow" or bend 157 the interior of which has been sandblasted. Once assembled, the conduit 156 should be oriented in a "rocker" position, with the elbow 157 pointing downward, as shown in FIGS. 14 and 14A. During production, the conduit 156 is then filled with liquid epoxy, such as, by way of example, Magnobond 55 A/B, manufactured by Magnolia Plastics, Inc. The epoxy ensures that each end of the conduit 156 is sealed to prevent any flow passage through the conduit 156. The electrical wires 143 within the conduit 156 are preferably stripped so that a flow passage is not provided within the insulation of each wire 143. The use of the PCB 135 prevents the bare wires 143 from making contact with each other which would result in an electrical short.

In addition, the invention may optionally include means for monitoring the temperature of the air in the interior of the pressurized separator housing 185 such as, by way of example, a temperature sensor, for automatically fine tuning the required blower speed to achieve an optimal pressure level. Temperature data from within the housing 185 may be transmitted to a microprocessor. Based on the readings received by the microprocessor, the microprocessor may direct the speed adjustment device 148 to increase or decrease the speed of the motor 138. A change in the speed of the motor 138 results in a corresponding change in the pressure of the gas within the pressurization region 185D of the pressurized separator housing 185.

As shown in FIG. 16, the blower controller assembly 132 of the preferred embodiment also includes an auxiliary heat conducting device or heat sink 158 positioned within the first enclosure 142 and configured to be positioned directly adjacent to the blower motor board 133 for conveying the heat generated by the blower motor board 133 through the wall of the first enclosure 142 to externally mounted heat radiating fins 159. The blower motor board 133 may have its own built-in heat sink which works in concert with the auxiliary heat sink 158 to direct the heat generated by the board to tabs which are held in place with spring clamps and extend outward from the blower motor board 133. As shown in FIGS. 15A, 15B and 15C, the heat conducting device 158 includes a plurality of recesses 160 for accommodating the spring clamps extending outward from the blower motor board 133. This design allows heat to flow from the built-in heat sink to the auxiliary heat conducting device 158. In the preferred embodiment, the heat conducting device 158 is silicon material/paste, such as, by way of example, insulating MYLAR, for maximum heat transfer to the device. The MYLAR material allows heat, but not electricity, to flow out of the enclosure through the enclosure wall. Once on the other side, the heat is dissipated via the externally mounted heat radiating fins which preferably rise vertically. Optionally, the first enclosure 142 may also house a fan for further improvement in cooling down the heat sink 158.

Figure 12:
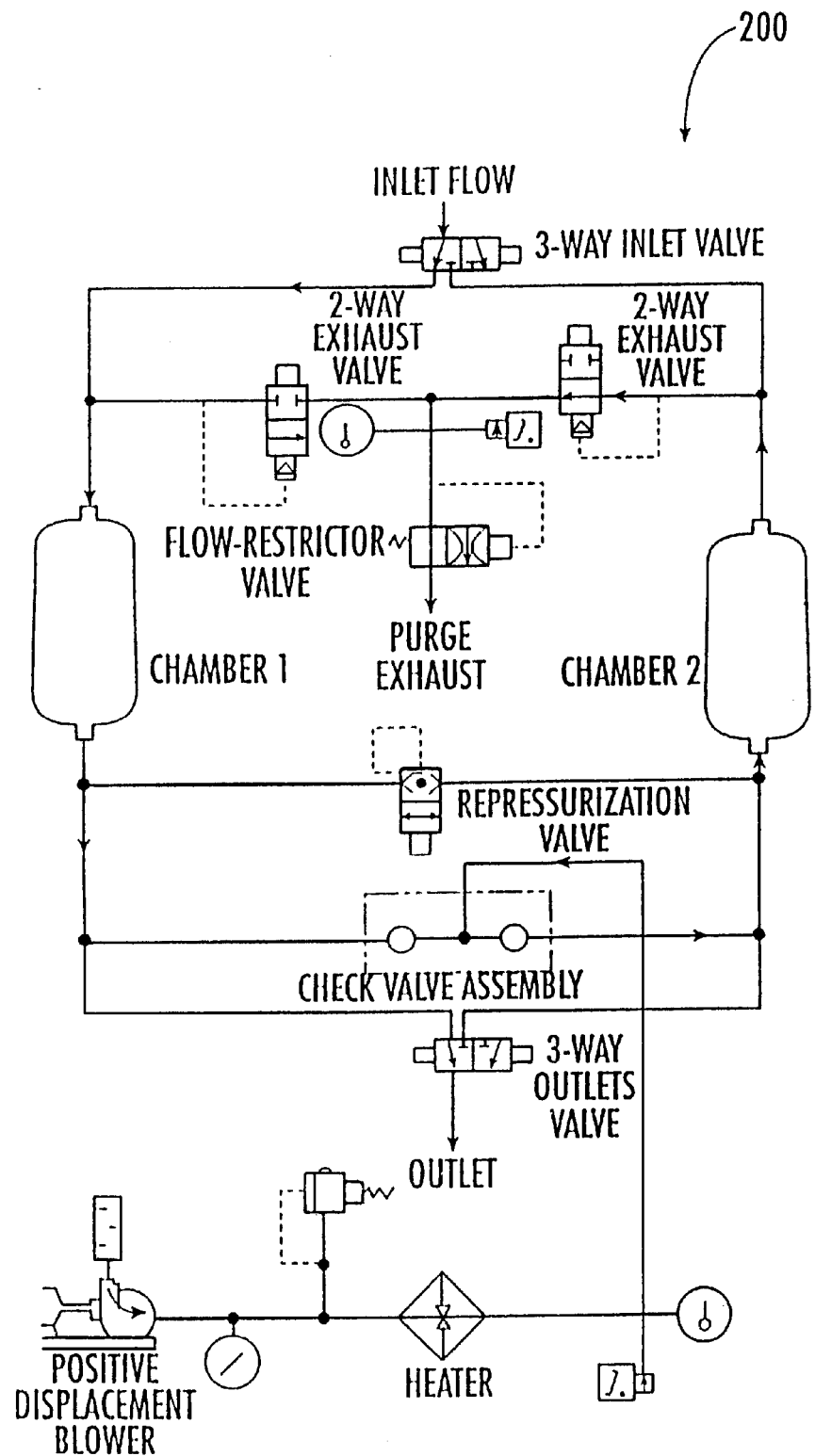
FIG. 12 is a diagram illustrating an externally heated system including the blower of the present invention.
Figure 12A:
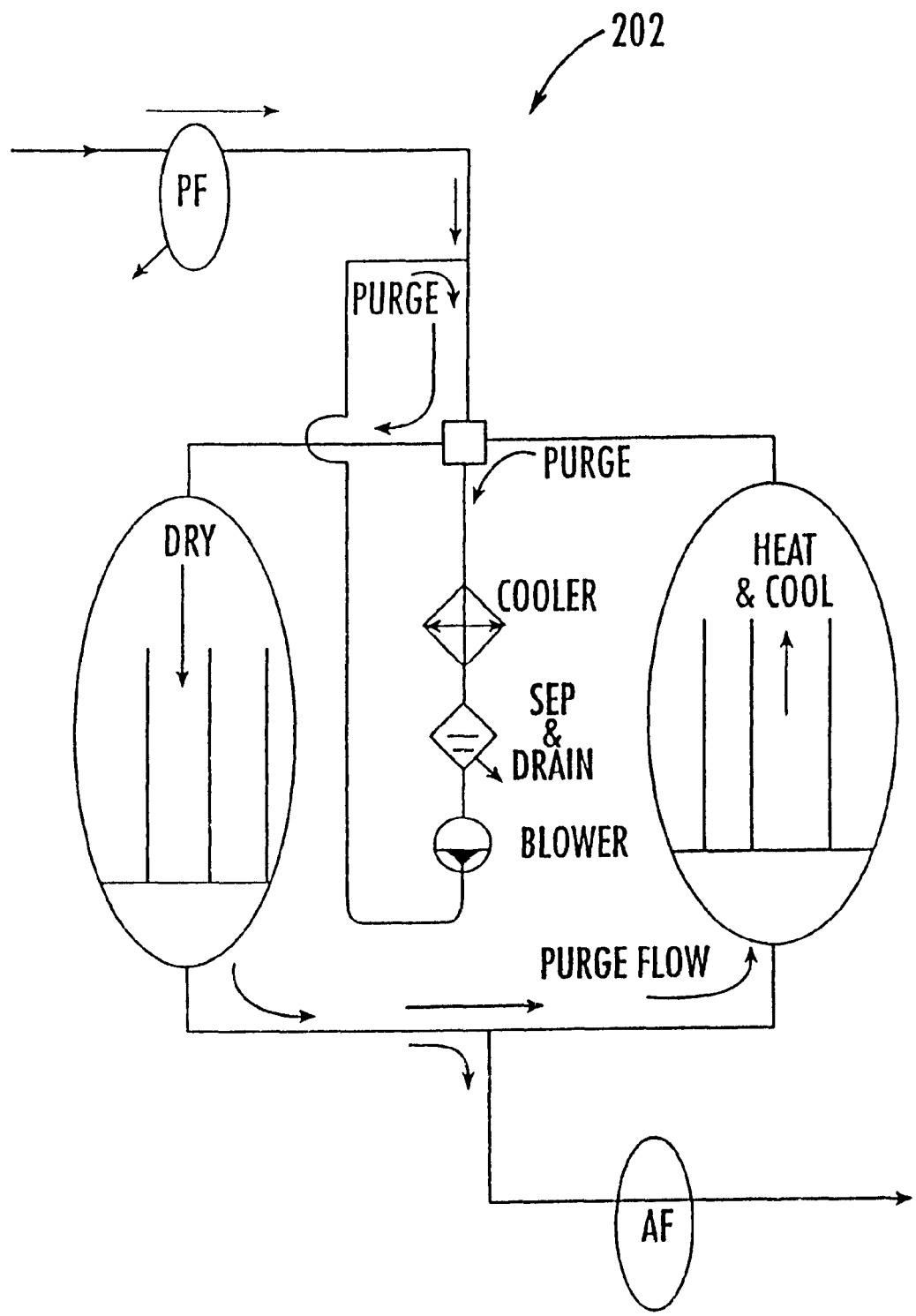
FIG. 12A is a diagram illustrating an internally heated system including the blower of the present invention.

While described herein with reference to the rotating drum adsorber process and system it will be understood that the high speed blower 48 of the present invention may be advantageously used in other applications, such as, by way of example, multi-chamber dryers in which regeneration is accomplished at atmospheric or elevated pressure. For example, the high speed blower 48 of the present invention may be used in an externally heated thermal swing dryer 200 (see FIG. 12) or in an internally heated thermal swing dryer 202 (see FIG. 12A).

The present invention includes a uniquely designed electrical system 176 and method for monitoring and controlling the rotating drum adsorber process and system. As shown schematically in FIG. 17, the electrical system 176 includes an electrical control system 177 the drum motor 93 a motor for the cooler fan 182 (if utilized), the high speed blower motor 138 a plurality of sensors, indicators, automated valves, and the like, which will be generally described below, and power distribution facilities and communication facilities which interconnect the electrical control system 177 with the other components. In the preferred embodiment of the electrical system 176 the electrical control system 177 is housed in two separate enclosures 142, 178 as shown in FIGS. 5B and 17. The first enclosure 142 includes the primary power supply connections for the system and also houses the blower controller assembly 132 as described previously. The second enclosure 178 houses a system controller 180 and preferably includes a front control panel 179 to enable direct human interaction with the system controller 180. In the preferred embodiment of the present invention, power to the electrical control system 177 is provided by an external power supply which is 3 phase, 240 VAC and which is fed directly to a main switch 129. By closing the main switch 129 power from the external power supply is fed through the first enclosure 142 directly to the system controller 180 as shown in FIG. 17. If a cooler fan is utilized, closing the main switch 129 also directs 3 phase 240 VAC power from the first enclosure 142 to the cooler fan motor 182 via a fused branch circuit.

The system controller 180 may be constructed either from electrical components or from solid state devices installed on a PC board. Incoming 230 V power may be distributed via a fused branch circuit back to the blower controller assembly 132 in the first enclosure 142 by closing a relay 1CR. A current sensor 190 is positioned adjacent the incoming power supply to monitor whether power is actually being received in the first enclosure 142. The incoming power to the blower controller assembly 132 is then passed through a noise filter 131 to prevent electrical noise from the blower motor 138 from being transmitted back through the lines and possibly harming other portions of the electrical system 176. A noise filter 131 suitable for use with the present invention is Model No. SUP-E10H-EP, available from Okaya Electric America, Inc., Valparaiso, Ind. 230 V power may also be distributed from the system controller 180 to the drum motor 93 via another fused branch circuit. Although not shown, if a fan is used to provide additional cooling within the first enclosure 142 then power of a suitable magnitude may additionally be distributed separately to such a fan in the first enclosure 142.

In a preferred embodiment, the electrical system and method of the present invention includes a plurality of indicators, including, but not limited to, a "power on" indicator 183 a blower motor fault indicator 184 a high cooler discharge temperature indicator 186 a primary drain failure indictor 187 and a high separator level indicator 188. Each of the indicators 183, 184, 186, 187, 188 may be a light, a sound alarm, or some alternative means of indicating a particular condition or combination thereof. The electrical control system 177 also preferably includes a connection to a relay on the compressor 32 at least two delayed-off timer relays 1TR, 3TR, at least one delayed-on timer relay 2TR, a temperature controlled switch connected to a sensor 193 at the outlet of the heat exchanger, a connection to the primary drain valve solenoid 196A for remotely controlling the operation of the primary drain valve 194 of the separator housing 185 a connection to the secondary drain valve solenoid 196B for remotely controlling the operation of the secondary drain valve 195 of the separator housing 185 a switch connected to the liquid level sensor 197 a connection to the blower controller assembly current sensor 190 a pair of alarm contacts 221 for interconnection with an external alarming device of a user's choosing, a "reset" push-button relay 222 and a plurality of control relays 1CR, 2CR, 3CR, 4CR, 5CR, 6CR, 7CR for controlling the operation of other components.

In use, AC power is first applied to the control system 177 by closing the main switch 129 causing the cooler fan motor 182 to be turned on. Also, if the compressor 32 is operative and loaded, thus delivering compressed gas, then a number of other events also occur. The drum motor 93 begins to turn the rotary drum 36 via the belt drive system 90. The delayed-off timer relays 1TR, 3TR and the control relay 2CR are energized, thus starting the blower fan 130 and energizing the control relay 1CR, which starts the blower motor 138. The "Power On" indicator 183 which is preferably a light, comes on and remains on as long as AC power is provided to the first housing. Also, the primary drain valve solenoid 196A begins cycling to periodically open the primary drain valve 194 as described previously.

If, as described previously, the liquid level sensor 197 is triggered by a high level of water in the sump region 185B of the separator housing 185 then control relay 6CR energizes. This causes the primary drain failure indicator 187 to be activated, energizes the secondary drain valve solenoid 196B, which opens the secondary drain valve 195 and energizes control relay 5CR. When energized, the control relay 5CR locks itself and the primary drain failure indicator 187 on, where they will remain until either the RESET push-button relay 222 as shown in FIG. 5B on the front control panel 179 is pressed by the user or until AC power is lost. Also, energizing the control relay 5CR causes control relay 3CR to be de-energized, which sets the alarm contacts 221. The alarm contacts 221 will stay active until the control relay 5CR is de-energized. Thus, if the primary drain valve 194 fails, a primary drain failure condition is indicated by the primary drain failure indicator 187 while in the meantime the secondary drain valve 195 opens to allow water to be drained from the pressurized separator housing 185 until the user manually resets the system 177. Also, if triggered, the liquid level sensor 197 also enables the delayed-on timer relay 2TR, which, when it times out, turns on the high separator level indicator 188 and de-energizes control relay 1CR, which, in turn, turns the blower motor 138 off. Thus, in addition to reporting a failure of the primary drain valve 194 the system 177 also reports the presence of a high water level within the separator housing 185 and turns the blower 48 off to protect it.

In a preferred embodiment of the electrical control system 177 the system controller 180 continuously monitors the input power of the blower controller assembly 132 using a feedback signal from the current sensor 190 in the first enclosure 142 and the second delayed-off timer relay 3TR. If current ceases to flow at the input to the blower controller assembly 132 then the current sensor 190 triggers the second delayed-off timer relay 3TR. If no current is sensed by the current sensor 190 within a predetermined period of time, then the second delayed-off timer relay 3TR turns off. Turning off the second delayed-off timer relay 3TR activates the blower motor fault indicator 184 and causes the control relay 1CR to be de-energized, which, in turn, disables the power supply from the second enclosure 178 back to the first enclosure 142. Preferably, the time delay before the second delayed-off timer relay 3TR is de-activated is approximately five to ten seconds, thus allowing uninterrupted operation when short glitches in the power supply occur.

In the event the compressor 32 is or becomes unloaded, control relay 7CR is de-energized, thus disabling the operation of the drum motor 93 and triggering the timer of the first delayed-off timer relay 1TR. If after a predetermined time the compressor has not yet begun to function normally again, the first delayed-off timer relay is de-energized. This, in turn, de-energizes control relays 1CR and 2CR, which then turn off the blower motor 138 and trigger the timer of the second delayed-off timer relay 3TR, respectively. When the timer of the second delayed-off timer relay 3TR times out, the absence of current detected by the current sensor 190 will cause the alarm contacts 221 to be set and the blower motor fault indicator 184 to be activated, as described previously. Preferably, the time delay before the first delayed-off timer relay 1TR is de-activated is approximately thirty seconds, thus allowing uninterrupted operation of the system 177 when the compressor 32 is inoperative for only short periods of time.

In a preferred embodiment of the present invention, the high cooler discharge temperature indicator 186 is connected to a temperature sensing device or thermocouple switch 193 shown schematically in FIG. 17, which monitors the temperature at the outlet of the heat exchanger 47. The thermocouple switch 193 is triggered when the temperature reaches a predetermined threshold. In a preferred embodiment, the threshold is approximately 140° F. As shown in FIG. 17, if the thermocouple switch 193 is triggered, the high cooler discharge temperature indicator 186 is activated. Also, control relay 4CR is energized, which causes a number of additional events to occur. Control relay 3CR is de-energized, which sets the alarm contacts 221 and the alarm stays active until 4CR is de-energized. Control relay 1CR is de-energized, which, in turn, turns the blower motor 138 off. Control relay 4CR locks itself on and activates the high cooler discharge temperature indicator 186. The high cooler discharge temperature indicator 186 remains activated until the thermocouple switch 193 is reopened and the RESET push-button on the front control panel 179 is pressed by the user or until AC power is lost.

As mentioned previously, the rotating drum adsorber process and system of the present invention may optionally include means for sensing a temperature differential at two different points and utilizing the temperature differential to automatically control various operating conditions of the rotating drum adsorber system. In a preferred embodiment of the present invention, the means for sensing a temperature differential and utilizing the temperature differential to control various operation conditions of the rotating drum adsorber system includes a temperature differential sensor 162 designed to detect the temperature differential between the temperature of the final flute 64 exiting the regeneration sector 40 at the leading edge of the drum 36 and the equilibrium or average temperature of the regeneration exhaust stream 46 exiting the bulk of the regeneration sector 40. According to the present invention, the temperature differential is advantageously used to control the rotational speed of the drum 36 the flow rate of the regeneration stream via control of the gas control valve V1 position, the blower speed or any combination of these characteristics. As shown in FIG. 5, the temperature differential sensor 162 may be connected to a printed circuit board 164 preferably one containing a microprocessor, and the output from the printed circuit board 164 may be used to automatically control the drum rotational speed, the flow rate of the regeneration stream, the blower speed, or a combination of these. Rotational speed control is preferably accomplished by utilizing a DC motor 93 to drive the drum 36 as described previously. The printed circuit board 164 can adjust the current to the motor fields by altering resistance in the electrical power supply to them, or by adjusting the frequency using an electronic commutation controller to change the rotational speed.

As best shown in FIGS. 5 and 6 the temperature differential sensor 162 is preferably a pair of temperature detectors 166, 167 such as, by way of example, two thermisters, two resistance temperature detectors ("RTD's") or a pair of any other type of temperature sensors, a first of which is mounted at the outlet of the leading edge of the regeneration sector 40 of the drum 36 in a short flow conduit 168 which includes a bottom end 172 and a top end 170 (see FIG. 6). The leading edge of the drum's regeneration sector 40 is that portion of the drum 36 which is about to rotate out of the regeneration sector 40 and thus has been in the regeneration sector 40 the longest. In the preferred embodiment, the conduit 168 is mounted on the partition wall 69 with the top end 170 of the conduit 168 located close to, but not necessarily touching, the drum 36 and the bottom end 172 of the conduit 168 being open to allow a small portion of the regeneration exhaust stream 46 to pass through the conduit 168 and subsequently enter the head where it is blended in with the outlet moisture ladened air. In the first preferred embodiment, the first temperature detector 166 is inserted through, for example, a pressure tight gland or a thernowell into the flow conduit 168 to sense the temperature at the leading edge while the second temperature detector 167 is added to the shell 46 at the regeneration sector outlet 41 to sense the equilibrium temperature of the regeneration exhaust stream 56 so that its value may be compared to the temperature of the leading edge 54. The temperature differential established by the two detectors 166, 167 may be used to control the operating conditions of the system 20. For example, when the temperature differential sensor 162 detects high air temperature at the leading edge 54 of the drum in the regeneration sector 40, such as, by way of example, 20° F. (to 50° F.) greater than the bulk of the air leaving the sector 40, the control system 177 may cause the motor 93 to speed up to increase the rotational speed of the drum 36. This is preferably accomplished in steps by increasing the speed 3% to 10% at a time, and then waiting for a period of time, approximately 1 minute to 10 minutes, before making further adjustments. If the temperature at the leading edge 54 of the drum 36 is too low, such as, by way of example, approximately 5° F. to 10° F. lower than the bulk of the air leaving the sector 40, this would indicate that complete regeneration may not be achieved and the control system 177 can be used to slow down the rotational speed of the drum 36 incrementally until the temperature at the leading edge 54 is 10° F. to 15° F. higher than the bulk or average temperature of the regeneration sector 40. Thus, the optimal rotational speed is attained when the drum 36 is completely regenerated and the drum 36 is rotating at the fastest rotational speed consistent with complete regeneration which results in the lowest outlet dew point because the adsorbent resides in the drying or adsorption sector 38 for the minimum amount of time. A similar process can be followed in controlling the regeneration gas stream flow rate, blower speed or a combination of these operations.

Also in the preferred embodiment, as described previously, one or more microprocessors may be utilized to control various system functions as a function of various inputs from the system 20. Separate microprocessors may be utilized to control the drum motor 93 to adjust the rotational speed of the drum 36 the blower motor 138 to adjust the speed of the blower fan 130 to affect the pressure of the regeneration exhaust stream 46 and the gas control valve V1 to adjust the flow rate of the regeneration stream 44. The functions of these microprocessors may be combined in the microprocessor on the board 164 associated with the temperature differential sensor 162 if utilized, or in some other combination of microcontrollers and microprocessors as would be obvious to one of ordinary skill.

Figure 18:
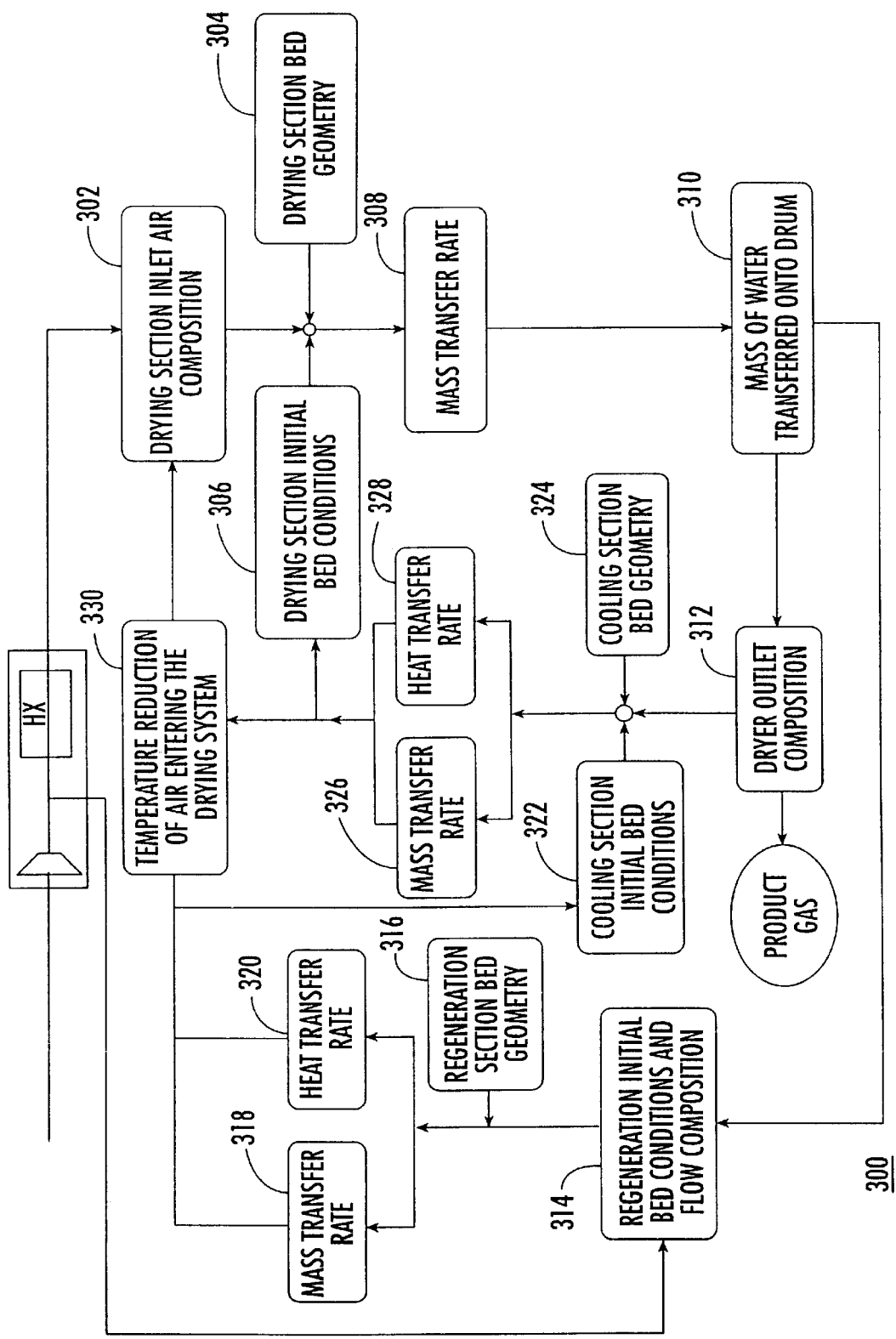
FIG. 18 is a flow chart illustrating the process for optimizing the design and operation of the rotating drum adsorber system.

Referring now to FIGS. 18–26 the rotating drum adsorber process and system of the present invention includes a computerized method 300 for providing optimal design and a novel control method to attain maximum performance of the system. In the preferred embodiment, the computerized method 300 includes determining bed and temperature information from the regeneration and cooling sectors and utilizing this information to determine the conditions in the adsorption sector for evaluating and controlling the various operating parameters of the system to achieve the lowest effluent dew point. The general process steps are illustrated in FIG. 18 and an example of the graphical displays which may be generated for evaluation are shown in FIGS. 19–26. In addition, an example of the computerized method 300 of the present invention, including a proposed set of system design parameters and initial operating conditions, and showing the equations and calculations preferably utilized in the computerized method 300 is set forth in Example 1 below.

As shown in FIG. 18, the process generally begins at step 302 with determining the inlet stream composition of the moist gas feed inlet stream 30 entering the adsorption sector 38 based on predetermined system design parameters and initial operating conditions. The process includes calculating, at step 304, the adsorption sector bed geometry based on various system inputs, including the height and base of the flute triangle. Next, the adsorption sector bed geometry and the initial adsorption bed conditions, which are obtained at steps 304 and 306 using the information determined from the regeneration and cooling sectors 40, 42, are utilized at step 308 to determine the mass transfer rate in the adsorption sector 38 and at step 310 to determine the mass of water transferred into the adsorption sector 38 of the drum 36. Utilizing this information, the outlet stream composition exiting the adsorption sector is predicted at step 312.

In the preferred embodiment, the process models the flow of the regeneration stream portion 44 of the moist feed stream as it is directed through the regeneration sector 40 and includes determining, at step 314, the regeneration initial bed conditions and flow composition, calculating the regeneration sector bed geometry at step 316 and utilizing this information to determine, at step 318, the mass transfer rate and, at step 320 the heat transfer rate of the regeneration stream 44. The mass transfer rate and heat transfer rate of the regeneration stream 44 passing through the regeneration sector 40 are utilized to determine the regeneration temperature.

In the preferred embodiment, the computerized method of the present invention models the flow of the cooling stream portion 51 of the adsorption outlet stream 50 as it is directed through the cooling sector 42. As in the process utilized in the regeneration sector 40 to determine the regeneration temperature, the computerized method 300 of the present invention includes determining, at step 322 the cooling sector initial bed conditions, which are a function of the regeneration sector conditions and regeneration temperature, and calculating, at step 324, the cooling sector bed geometry to determine, at step 326 the mass transfer rate and, at step 328, the heat transfer rate of the cooling stream 51 passing through the cooling sector 42. This information is utilized at step 330 to determine the cooling temperature of the cooling exhaust stream 52 and the temperature reduction of the regeneration exhaust stream 46, as combined with the cooling exhaust stream 52, which is then combined with the moist gas feed inlet stream 30 entering the adsorption sector 38. As shown in FIG. 18, the general process includes utilizing the information determined from the cooling sector 42 at steps 322–328 which information was determined utilizing information from the regeneration sector 40 at steps 314–320 to determine, at step 306 the conditions of the adsorption sector bed for use in the adsorption sector calculations at steps 308–312 for predicting the effluent dew point for various system design parameters and operating conditions.

The computerized method 300 of the present invention provides a means for displaying the sector temperature profiles and discharge temperatures, as well as other system conditions, for evaluation for improving the design of the rotating drum adsorber system 20 and achieving optimum performance. In the preferred embodiment, the process steps and equations and calculations of the computerized method 300 are embodied in a unique computer program (not shown) to provide in-depth knowledge of the system 20 for accurately predicting the performance and controlling the operations of a rotating drum adsorber process and system based upon a proposed set of system parameters and initial operating conditions. The proposed set of system parameters and initial operation conditions may be varied as desired to explore the operating characteristics and performance levels of different sized rotating drums or other variations of the system design parameters under any number of different operating conditions. The computer program is specifically designed for quickly and easily generating graphical displays, such as those shown in FIGS. 19–26 of the sector temperature profiles and discharge temperatures and other system data for evaluation to attain maximum system performance and an optimized product.

In the preferred embodiment, the computer program provides for the inputting of the following information: main flow (SCFM), inlet temperature (° F.), regeneration temperature (° F.), system pressure (psig), regeneration flow (SCFM), inlet relative humidity, drive motor speed (rpm) and blower flow rate (SCFM). In addition, the computer program provides for the selection of a rotating drum system model, such as, by way of example, Model No. 275, 450, 950 or 1600. The selection of the Model number determines the diameter and length of the adsorbent drum 36. In the preferred embodiment, the diameter and length of Model Nos. 275, 450, 950 and 1600 are 14.5 inches and 200 mm, 14.5 inches and 400 mm, p18.5 inches and 400 mm, and 24.5 inches and 400 mm, respectively. Further, the computer program may provide for the selection of a specific manufacturer of the adsorbent drum 36. The preferred computer program includes the choices of Nichias (silica gel or GX7 models) and Siebu Giken (silica gel or molecular sieve). With the selection of the Model number, specific information about the physical properties of the rotating drum 36 can be obtained, including the height and width of the flute triangle, the thickness of the media holding the silica, the approximate seal width, the angle of the adsorption sector 38 and the angle of the regeneration sector 40. It will be noted that while the input and calculation units of the computerized method 300 and computer program of the present invention are U.S. customary, any set of units which can be interpreted by the program may be used.

Utilizing the input information including the initial operating conditions and drum design parameters, the computer program of the present invention may then calculate various information relating to product flow, the regeneration sector 40 and the cooling sector 42. For product flow, the program may determine the predicted outlet pressure dew point (° F.) and outlet temperature (° F.). In the regeneration sector 40 the computer program may determine the equilibrium temperature (° F.), final flute outlet temperature (° F.), average outlet temperature (° F.) and flow rate (SCFM). In the cooling sector 42 the computer program may determine the final flute outlet temperature (° F.), average outlet temperature (° F.) and flow rate (SCFM). In addition, the computer program provides condensor inlet temperature (° F.), Useful capacity [# H20/100# Dscc] and water loading [# H20]. While the computer program of the preferred embodiment may generate the information and the graphical displays set forth herein, it will be understood that the computerized method 300 of the present invention and the computer program for carrying out the computerized method 300 may be varied to provide any system information and graphical displays thereof, as needed or desired to evaluate the performance of and/or to control the rotating drum adsorber process and system to attain maximum performance and an optimized product.

FIGS. 19–26 include examples of graphical displays of information which may be provided by the computerized method 300 of the present invention and were generated utilizing the following main initial operating conditions and system parameters: main flow=450 SCFM; inlet temperature=100° F; regeneration temperature=300° F.; system pressure=100 psig; regeneration flow=200 SCFM; blower head=30 WC and the rotating drum=RDD450 model. In addition, the following conditions were also included: inlet relative humidity=85%; drive motor speed=1.2 RPM; blower temperature=100° F.; and blower flow rate=225 SCFM. The initial operation conditions and system parameters provided herein are for example purposes only and may be varied, as appropriate, by the user of the computerized method 300.

Utilizing this input information, the computer program calculates a pressure outlet dew point of the product flow of 1.3° F. and an outlet temperature of the product flow of 125.3° F. The computer program determines the following information relating to the regeneration sector 40: the equilibrium temperature is 156.9° F., the final flute outlet temperature is 299.2° F., the average outlet temperature is 166.7° F. and the flow rate is 200 SCFM. In the cooling sector 42 the computer program calculates the final flute outlet temperature of 127.5° F., average outlet temperature of 264.3° F. and a flow rate of 28.5 SCFM. In addition, the computer program determines that the condenser inlet temperature is 178.9° F., Useful capacity [#H20/100# Dscc] is 9.4 and the water loading [#H 20] is 0.53.

Figure 19:
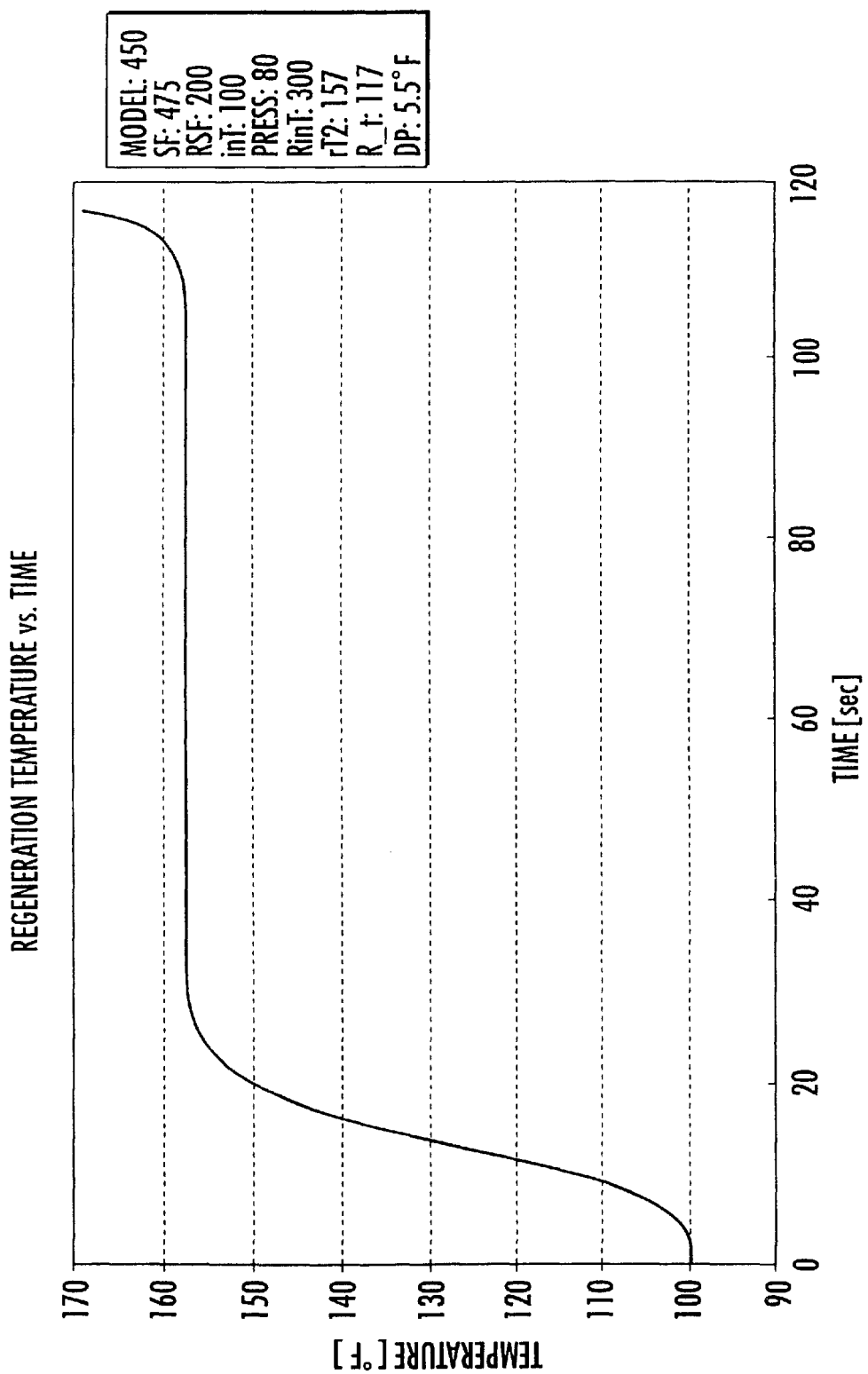
FIG. 19 is a graph showing the relationship between regeneration temperature and the time period for the drum to rotate through the regeneration sector.
Figure 20:
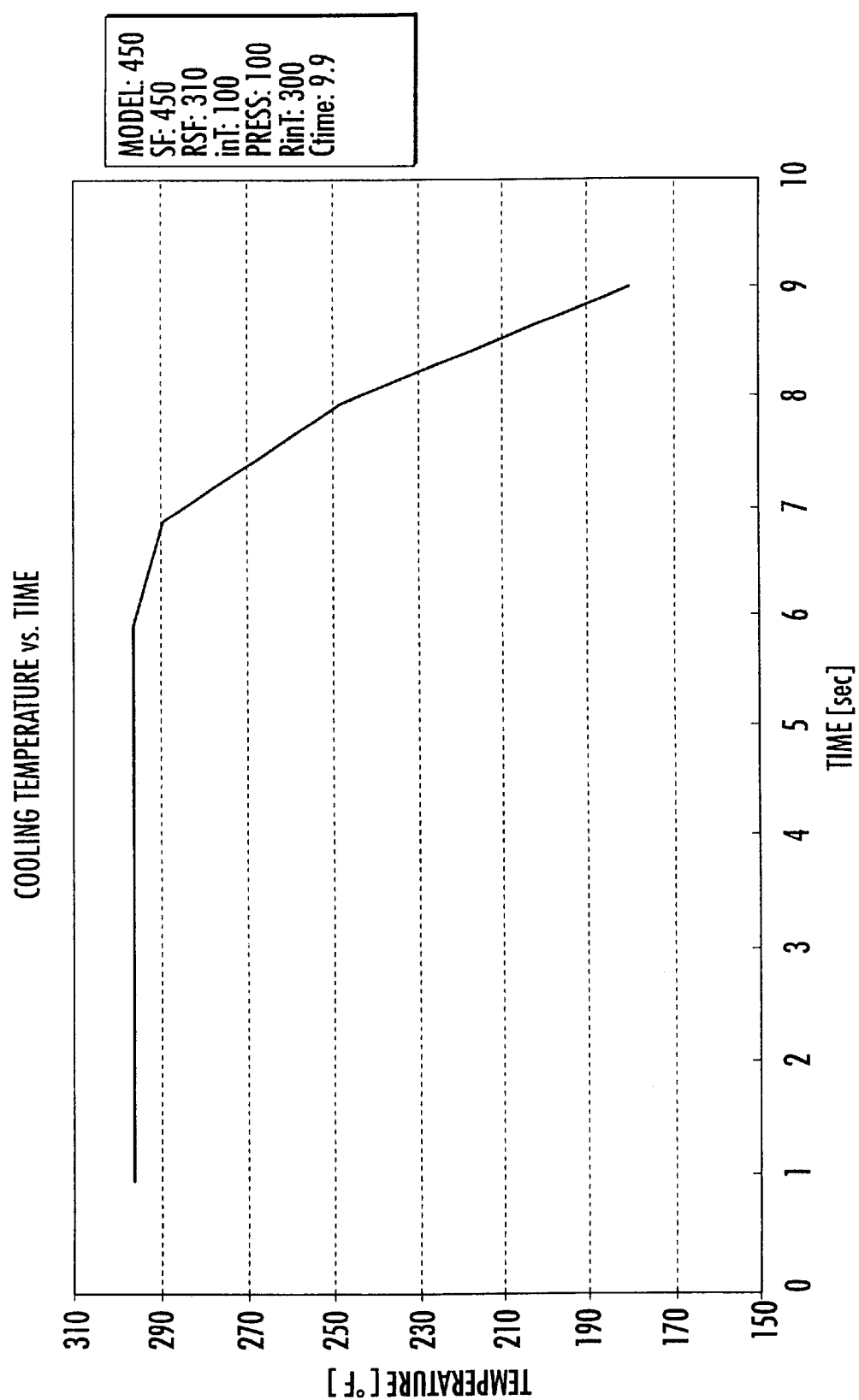
FIG. 20 is a graph showing the relationship between the cooling temperature and the time period for the drum to rotate through the cooling sector.

FIG. 19 illustrates a graphical display of the Regeneration Temperature vs. Time information provided by the computerized method 300 of the present invention. The flat portion of the double humped temperature curve shown in FIG. 19 is the time period when the temperature is constant or the equilibrium temperature. As long as some moisture remains in the regeneration sector bed, this temperature is constant. A given flute 64 is considered regenerated when the second hump begins. By adjusting the conditions, such as, by way of example, the inlet temperature, system pressure, flow rate, regeneration inlet temperature, regeneration flow rate and/or rotating drum speed, this curve will adjust accordingly and the graph can be evaluated to control system performance. In FIG. 20 illustrating the Cooling Temperature vs. Time, the temperature at the outlet of the flutes 64 as they proceed through the cooling sector 42 is depicted. It can be seen that for the same regeneration and main flow rate, more of the adsorbent drum bed may be cooled by slowing down the rotational speed of the drum 36. Because the cooling of the adsorbent drum 36 prior to entering the adsorption sector 38 is extremely important, the system can be optimized by controlling the drum speed to ensure complete cooling of the drum 36 in the cooling sector 42.

Figure 21:
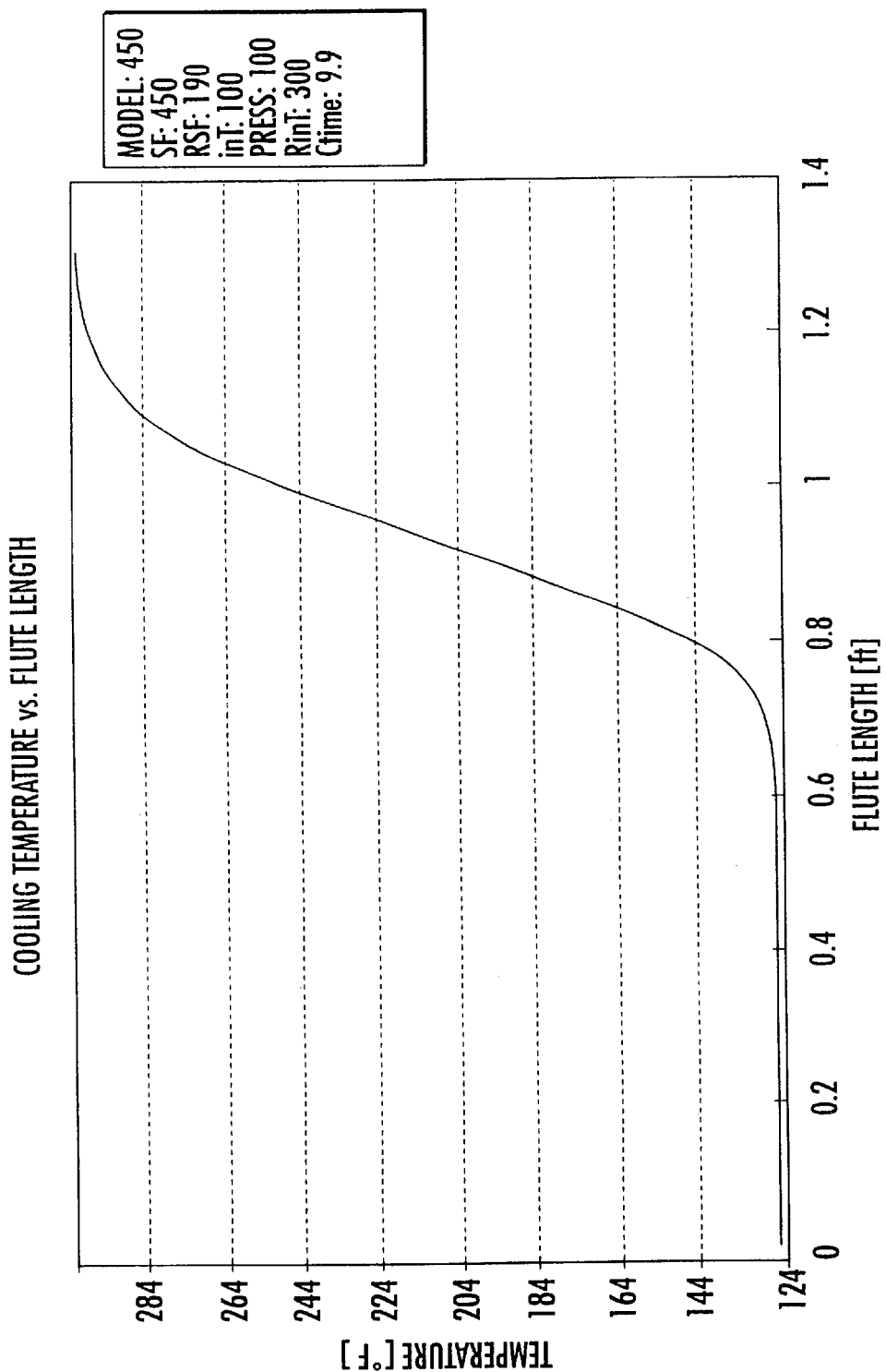
FIG. 21 is a graph showing the relationship between the cooling temperature and the flute length.

Referring now to FIG. 21 illustrating the Cooling Temperature vs. the Flute Length, the temperature profile along a flute 64 as it is about to leave the cooling sector 42 is depicted. Utilizing this graph, the flute 64 may be divided up for purposes of the adsorption sector 38 calculations due to the fact that with different temperatures, the flute 64 is effectively shortened until the heat bump is moved out of the bed 62. Based on this relationship, the residual moisture and adsorption capacities are determined. The cooling temperature value can be used to control the blower speed. For example, if the blower speed is increased but the regeneration stream gas control valve V1 is not opened, the additional air that it is trying to move must come from somewhere, resulting in increased cooling.

Figure 22:
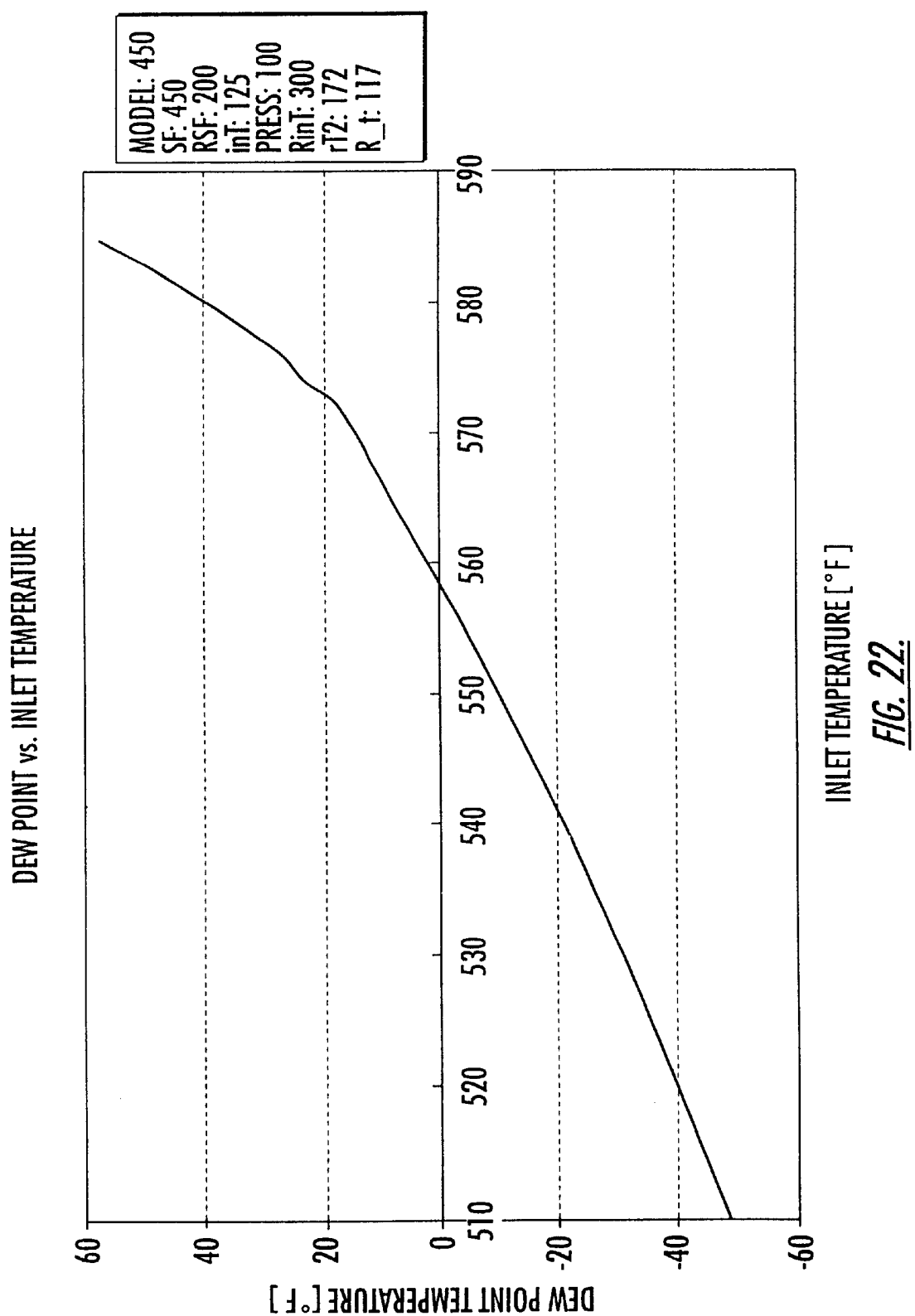
FIG. 22 is a graph showing the relationship between the dew point and the inlet temperature of the adsorption sector.
Figure 23:
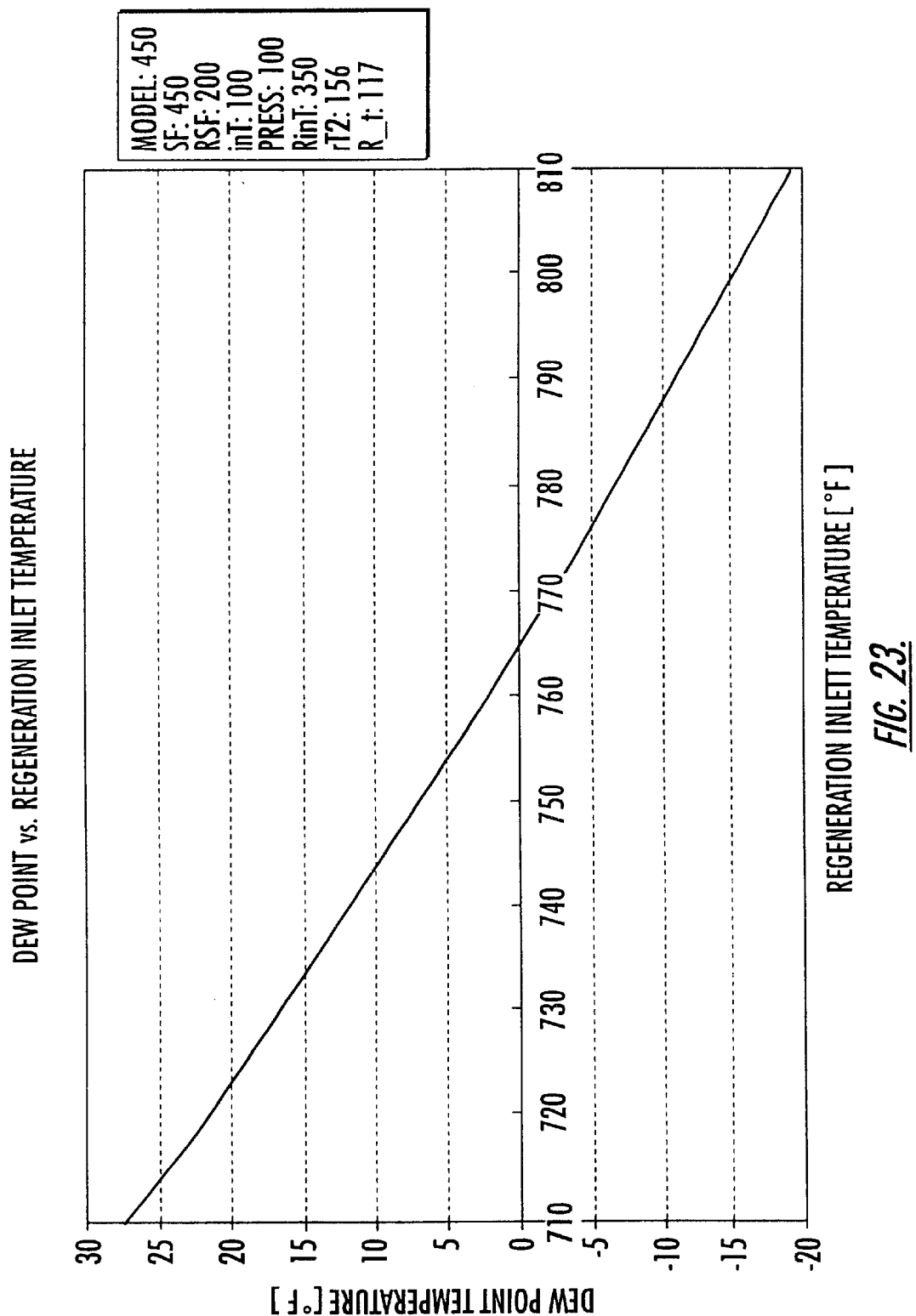
FIG. 23 is a graph showing the relationship between the dew point and the regeneration temperature.
Figure 24:
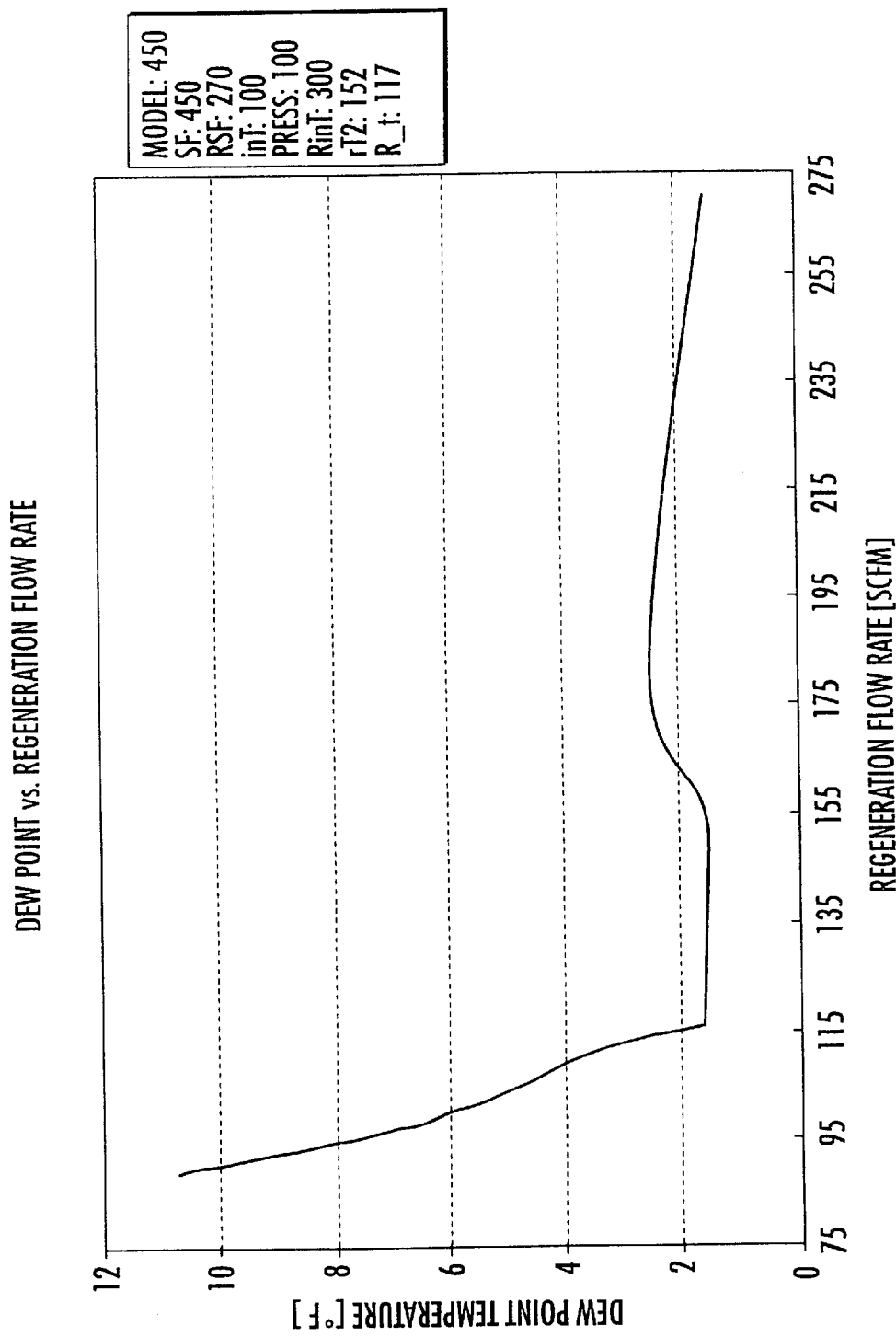
FIG. 24 is a graph showing the relationship between the dew point and the regeneration flow rate.
Figure 25:
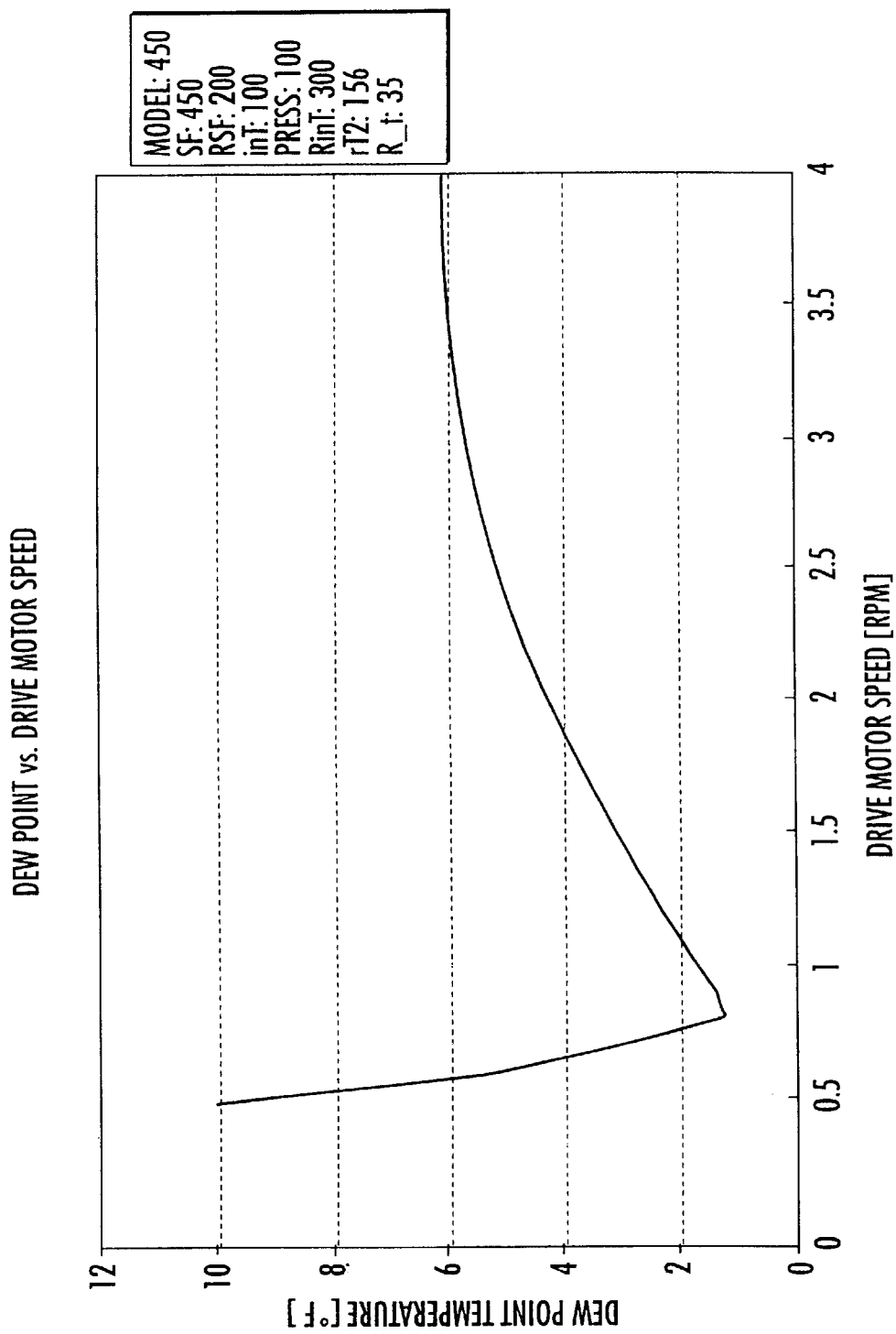
FIG. 25 is a graph showing the relationship between the dew point and the drum motor rotational speed.
Figure 26:
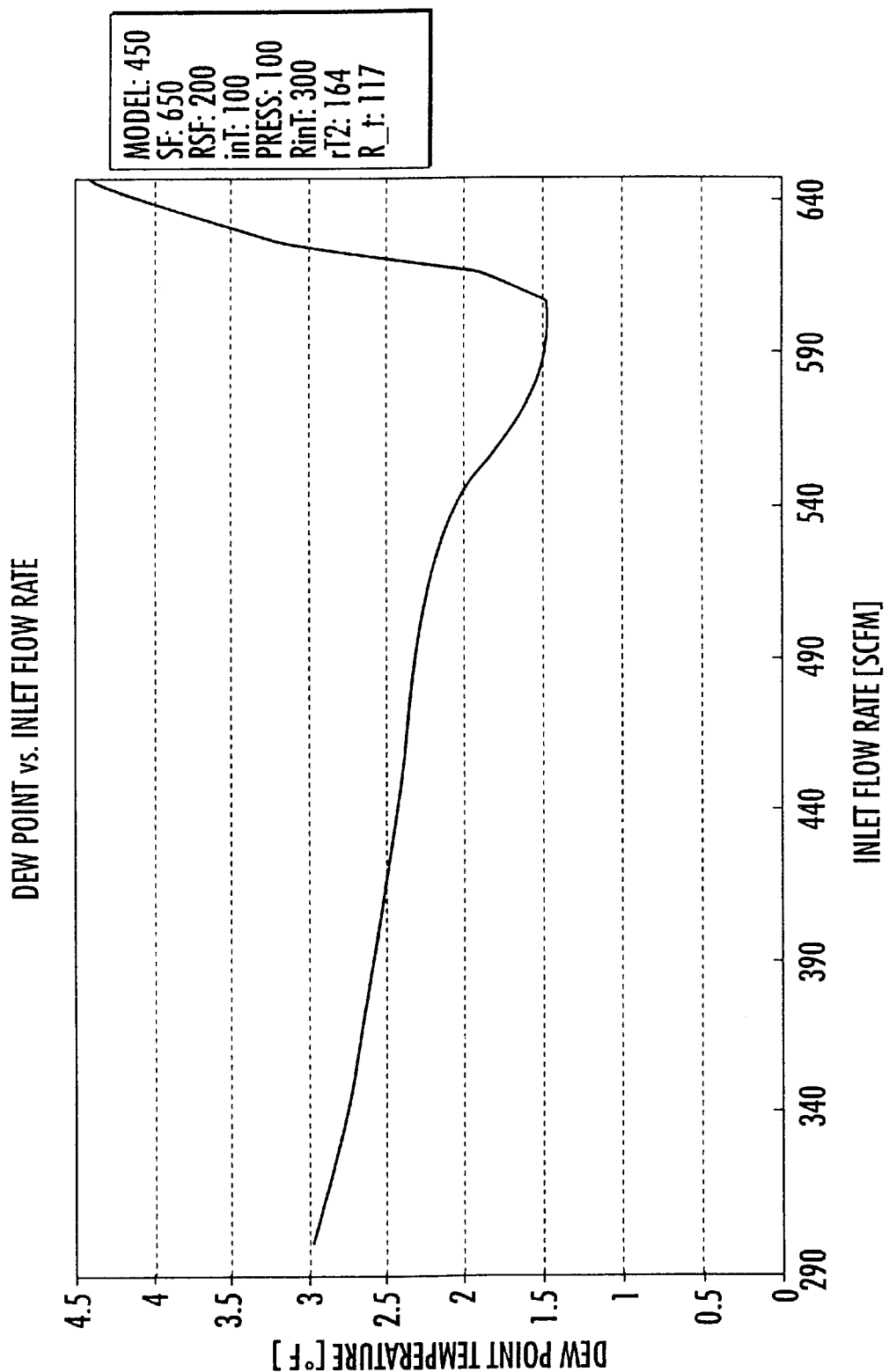
FIG. 26 is a graph showing the relationship between the dew point and the gas flow rate.

In FIG. 22, the Dew Point vs. Inlet Temperature is illustrated. A cooler inlet temperature provides a lower dew point. Thus, given all other parameters remain constant, the inlet temperature is easily controlled to a value which will deliver the dew point required. Another way to improve the dew point is to increase the regeneration temperature, thereby reducing the residual moisture as shown in FIG. 23 illustrating the Dew Point vs. Regeneration Temperature. The regeneration temperature may be increased in a variety of ways, including the addition of a controllable booster heater 210 as described previously. FIG. 24 further illustrates another method for controlling the dew point based upon the regeneration flow rate. Similar to the correlation illustrated in FIG. 19, the rotational speed of the drum 36 can be controlled based upon the dew point rather than the regeneration outlet temperature utilizing the correlation shown in FIG. 25. While adsorption systems are designed for a certain flow rate, the demand downstream often fluctuates. From the graph illustrated in FIG. 26, a correlation can be developed to control other parameters on the unit to compensate, such as, by way of example, if demand goes down by X, the rotational drum speed can be slowed down by Y.

Figure 27:
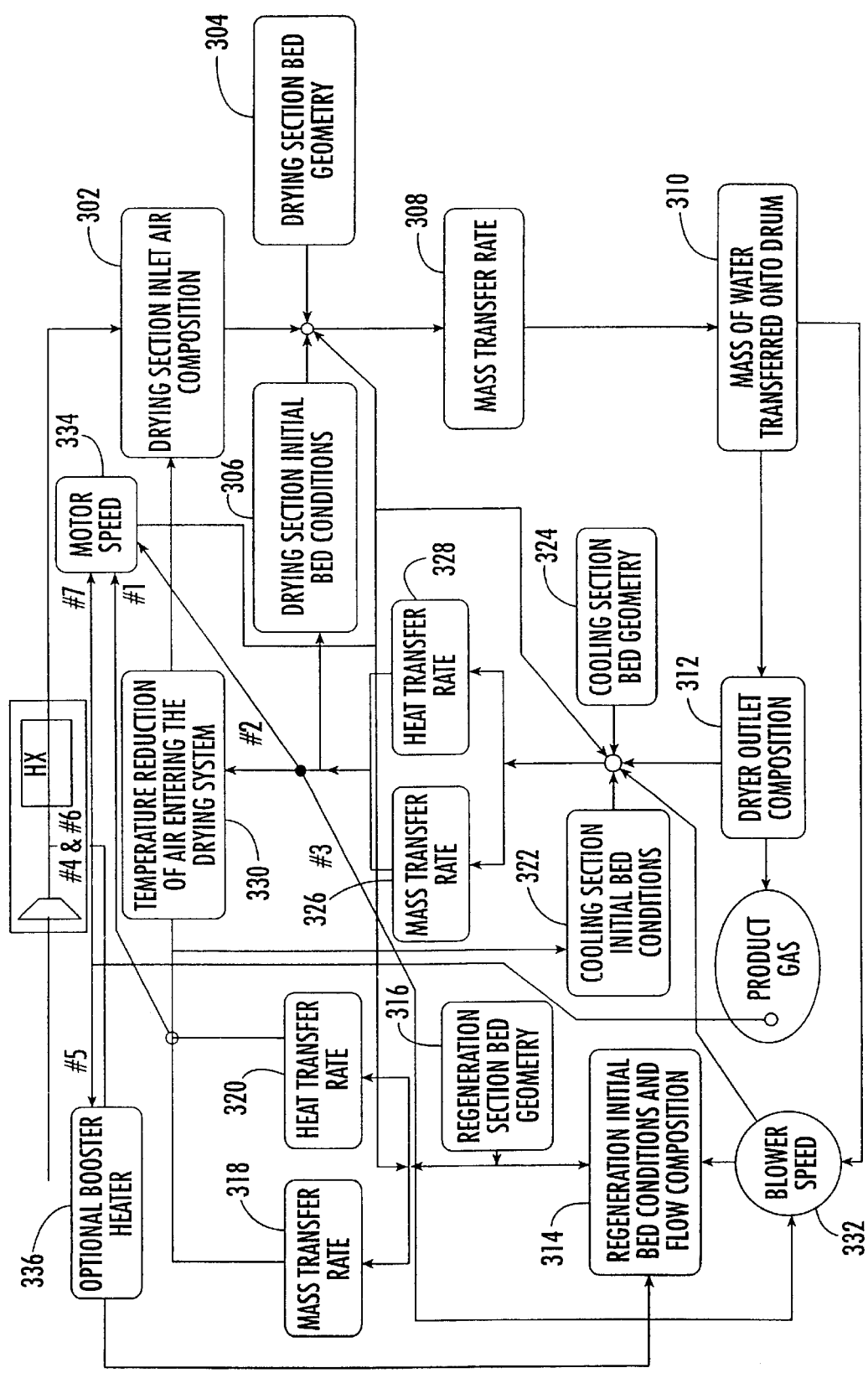
FIG. 27 is the flow chart of FIG. 18 revised to show how the data graphically illustrated in FIGS. 19–26 correlates to the control of various operating parameters of the system.

FIG. 27 illustrates the flow chart of FIG. 18 including system operating conditions which may be controlled utilizing the graphs illustrated in FIGS. 19–26 and evaluation of the same. The controlled system operating conditions, which may include the blower speed, the motor speed and the temperature of the regeneration stream 44 may each be adjusted at steps 332, 334 and 336, respectively, on the basis of conditions, data, rates and the like which were developed in steps 302–330. In addition, the effect of each of the additional controlled system operating conditions may, in turn, be applied to other steps of the computerized method 300 as shown in FIG. 27.

The equations and calculations for carrying out the process steps of the present invention and determining the information to generate graphical displays, such as, by way of example, the graphical displays of FIGS. 19–26 for optimizing the performance of and providing a control method for the rotating drum adsorber system and process of the present invention are set forth in Example 1 below. Referring to Example 1 the process of the present invention begins by providing unit definitions, system inputs and standard conditions. Using the system inputs, various additional information relating to the drum physical properties and system operation conditions are determined. By determining the total mass of water in the adsorption sector 38 in time t, the useful capacity (UC) of the adsorption sector 38 is determined. The process also includes determining the bed geometry utilizing various information, such as, the cross-sectional area of each flute 64 in the drum 36, the perimeter of each flute 64 in the drum 36, the equivalent radius of each flute 64 and the calculated number of flutes 64 in each sector 38, 40, 42.

An important step in the process is determining the adsorption sector mean temperature by finding the adsorption sector outlet temperature, adsorption sector average temperature and adsorption sector specific heat. The mean temperature of the adsorption sector 38 is calculated because many other properties are affected by this, including viscosity, density, heat capacity and velocity through the flutes 64. The time to the first breakthrough is between the regeneration inlet temperature and the equilibrium temperature. As shown in FIG. 19, the regeneration temperature versus time graph includes two curves. The calculations for determining the regeneration temperature include equations for shifting the second curve to the right. The curve shift is necessary because as the curves are calculated, the time starts at zero; however, the midpoints occur at very different times. The curve shift properly positions the second midpoint and from there, the proper cooling section initial conditions are obtained. Referring to FIG. 18, this is represented by the line that is directed to determining cooling section initial bed conditions at step 322. Utilizing this information, the instantaneous regeneration temperature and the instantaneous regeneration temperature vs. time are calculated (see FIG. 19). This temperature is used to identify the residual moisture in the bed. In addition, the average temperature out of the regeneration sector 40 vs. time is calculated.

While the regeneration sector 40 and cooling sector 42 have similar temperature profiles, novel processes and unique calculations were used to accurately determine the cooling sector 42 conditions and data. In the preferred embodiment, the process includes calculating the temperature and dryness based on a multitude of segments of flutes 64 each of which is expressed in its own equations, in terms of outlet conditions of temperature and moisture, as well as axial distribution along its length. The process of determining the cooling sector equation parameters include setting the flow rates by maintaining a pressure differential across the top seal 77 of zero or slightly greater on the adsorption sector side. These equations take various factors affecting the pressure drop into account, including the flute size, depth of the drum 36 and partitions. The determination by computation of the temperature and moisture profile in the final flute 64 of the cooling sector 42 establishes its ability to affect drying as the flute 64 enters the adsorption sector 38. The average temperature out of the cooling sector 42 is calculated and combined with the average temperature out of the regeneration sector 40. This combination provides the temperature and mass of air that enters the after-cooler, or heat exchanger 47 which is used in the sizing of the heat exchanger equipment. In addition, the instantaneous temperature out of the last cooling sector flute 64 and the average temperature out of the cooling sector 42 are determined. Using this information, the isosteric best dew point, for example, the residual moisture and adsorption capacity, as the flute 64 enters the adsorption sector 38 may be calculated. Further, the temperature along the flute length, breaking up the flute 64 into section (time section) where the flute 64 is effectively changing length. The flute temperature throughout the cooling sector 42 of the bed 62 can be graphically displayed. In the cooling sector calculations, time is averaged to determine the mixed flow leaving each sector 38, 40, 42 which is precisely the way it is working in the actual system because each flute 64 does have temperature change and moisture change along its length and each individual flute 64 has different temperature and moisture. Therefore, the cooling sector 42 must be analyzed by breaking up the bed 62 into many sections, analyzing each section independently and combining the results. In other words, accurate cooling sector data is obtained by breaking up the time algorithm, dividing the sector into segments mathematically and then mathematically combining the results.

As the drum 36 moves into the absorption section 38 there is a set percent of the flute 64 cooled and a gradient through the rest of it. By modeling the outlet dew point, it can be determined that Anzelius approximation works well with moisture concentration, However, at time=0 moisture concentration=0. This poses a problem because the best dew point that can be achieved is based upon how complete regeneration is. The best dew point can be calculated based upon isostere data for the adsorption media used. Next, the time required for Anzelius solution to reach this BestDP is calculated and for all time<this calculated time, the outlet dewpt=BestDP or for all time>this calculated time, the outlet dp is calculated w/Anzelius solution. The time variables may be defined as follows:

$d\tau_0$=time required for Anzelius solution to reach BestDP1 with a flute length of AdL1.
   NOTE: BESTDP1 is calculated at $T_1$ on FIG. 1. ($T_{max}$)

$d\tau_{10}$=time required for Anzelius solution to reach BestDP2 with a flute length of AdL2.
   NOTE: BESTDP2 is calculated at $T_0$ on FIG. 1. (Temperature out of flute leaving the cooling section [inst $T_0$])

$d\tau_{20}$=time required for Anzelius solution to reach BestDP1 with a full flute length (Length).

$d\tau_1$=time required for AdL1 to move out of the flute based on the front velocity which is calculated in Example 1.

$d\tau_2$=time required to push the heat bump out of the flute after the heat bump hits the flute end.

$d\tau_2'$=time required to push the heat bump out of the flute from the time the flute leaves the cooling section.

Given the notation segment time=if (condition, true, false), the following time segments were established:

$\tau_{seg1}$=if ($d\tau_0 > d\tau_1$, $d\tau$, $d\tau_0$)
$\tau_{seg2}$=if ($d\tau_0 > d\tau_1$, 0, $d\tau_1 - d\tau_0$)
   NOTE: $\tau$=drying time $\tau_{seg3}$=if ($d\tau_{10} > d\tau_2'$, $d\tau_2$, $d\tau_{10} - d\tau_1$)
$\tau_{seg4}$=if ($d\tau_{10} > d\tau_2'$, 0, $d\tau_2' - d\tau_{10}$)
$\tau_{seg5}$=if ($d\tau_{20} > \tau$, $\tau - d\tau_2'$, $d\tau_{20} - d\tau_2'$)
$\tau_{seg6}$=if ($d\tau_{20} > \tau$, 0, $\tau - d\tau_{20}$)

Note: $\tau_{seg2,4}$ and $_6$ are 0 seconds above in certain instances. In the computerized method of the present invention, the values may be set extremely high ($1 \times 10^{50}$) because the equations where they are used are in the following form:

$$\overline{X} = \frac{0.5}{\tau_{seg}} \cdot \int_{\tau_1}^{\tau_2} f(\tau) d\tau \to \begin{array}{l} \text{If } \tau_{seg\#} \text{ were left at 0 then the} \\ \text{equation would go to infinity} \\ \text{and generate an error} \end{array}$$

In determining the amount of moisture the desiccant will hold at a given relative humidity in the air stream, the computerized method 300 includes using the Polanyi equation in reverse to relate everything back to a certain temperature to determine which line segment should be used. Thus, since the parameter data, a and b, are already established for 100° F. isotherm, the equation may be worked in reverse to bring it back to 100°. For example, the isotherm at 100° F. is broken up into four linear segments defined by the equation Y=bX+a, where X is the relative humidity and Y is the adsorption capacity. Thus, for the 100° F. isotherm there are 4 a's and 4 b's which describe each of these linear segments. Heretofore, adsorption models moved the isotere to its new position and calculated each of the parameters over again. The method of the present invention advantageously provides a unique method of calculating the amount of moisture the desiccant will hold at a given relative humidity in the air stream.

Further novel process steps and equations and calculations of the computerized method 300 of the present invention relating to each of the adsorption, regeneration and cooling sectors 38, 40, 42 can be seen in the following Example 1:

EXAMPLE 1

UNIT DEFINITIONS:

$$SCFM := \frac{ft^3}{min} \quad lbmol := 1 \quad psia := \frac{lb}{in^2} \quad RPM := 1$$

Type in the model number to the right of the following expression $\to$ $RDDmodel := 450$ $$D := \begin{vmatrix} 14.5 \cdot in & \text{if } RDDmodel = 275 \\ 14.5 \cdot in & \text{if } RDDmodel = 450 \\ 18.5 \cdot in & \text{if } RDDmodel = 950 \\ 24.5 \cdot in & \text{if } RDDmodel = 1600 \end{vmatrix} \quad Length := \begin{vmatrix} 200 \cdot mm & \text{if } RDDmodel = 275 \\ 400 \cdot mm & \text{othewise} \end{vmatrix}$$

$D = 1.208 \cdot ft$  $\quad Length = 1.312 \cdot ft$

SYSTEM INPUTS below ...

-continued

| | |
|---|---|
| $SF := 450 \cdot SCFM$ | Dry side inlet flow rate. |
| $Tm := 560$ | Dry side inlet temperature. |
| $rTm := 760.2$ | Regen inlet temperature. |
| $P := 115 \text{ psia}$ | Dry side inlet pressure. |
| $rP := 115 \text{ psia}$ | Pressure in the regeneration section. |
| $Motorspeed := 1.2 \text{ RPM}$ | Set speed of the drum motor. |
| $rh := .85$ | ASSUMED RH AT THE INLET TO THE DRYING SECTION |
| $BSF := 225 \text{ SCFM}$ | Blower Flow Rate |
| $rTdp := 589.67$ | Assumed dew point of regen gas |
| $Tr := 530$ | Standard temperature. |
| $Pr := 14.7 \cdot \text{psia}$ | Standard pressure. |
| $ha := 1350 \cdot \frac{BTU}{lb}$ | Heat of adsorption (dependent upon desiccant material used.) |
| $Cpds := .24 \cdot \frac{BTU}{lb}$ | Heat capacity of desiccant. |
| $Cp\_w := .445 \cdot \frac{BTU}{lb}$ | Heat capacity of water. |
| $Cpr := .239 \cdot \frac{BTU}{lb}$ | Specific heat of air in the regen section |
| $Dffo := .968 \cdot \frac{ft^2}{hr}$ | Diffusion coefficient at standard conditions. |
| $C := 118$ | Sutherland constant. |
| $\rho o := .075 \cdot \frac{lb}{ft^3}$ | Air density at standard conditions. |
| $\rho b := 9 \cdot \frac{lb}{ft^3}$ | Bulk density of the drum. |
| $Rg := 10.732 \cdot \left(\frac{psia \cdot ft^3}{lbmol}\right)$ | Gas constant. |
| $th := 1 \cdot in$ | Approximate seal width. |
| $base := .110 \cdot in$ | Base of flute triangle. |
| $h := 0.64 \cdot in$ | Height of flute triangle. |
| $perx := .009 \cdot in$ | thickness of media holding the silica |
| $\theta := 232 \cdot deg$ | angle of the drying section. |
| $\phi := 118 \cdot deg$ | angle of the regen section. |

EQUATIONS:

| | |
|---|---|
| $\gamma := 360 \cdot deg - \theta - \phi$ | angle of the cooling section. |
| $rev := 2 \cdot \pi \cdot rad$ | defining the unit rev, or one revolution, based on the rad unit |
| $shSIZE := \begin{vmatrix} 2.029 \text{ in} & \text{if } RDDmodel = 275 \\ 2.029 \text{ in} & \text{if } RDDmodel = 450 \\ 2.029 \text{ in} & \text{if } RDDmodel = 950 \\ 2.029 \text{ in} & \text{otherwise} \end{vmatrix}$ | $Drumspeed := \frac{Motorspeed \cdot shSIZE}{D}$  $Drumspeed = 0.168 \quad \frac{1}{Drumspeed} = 5.955$ |
| $\tau br := 60 \cdot \frac{sec}{Drumspeed \cdot 1.551724183}$ | Drying section time without the seal information included. |
| $\tau := \tau br - .079 \cdot \tau br$ | time in the drying section $\quad \tau = 212.081 \cdot sec$ |
| $MWair := 28.967 \cdot \frac{lb}{lbmol}$ | molecular weight of air |
| $diam := D - 2 \cdot th$ | D minus the outer seal. $diam = 1.042 \cdot ft$ |
| $Rd := \frac{diam}{2} \quad Rd = 0.521 \text{:ft}$ | radius of the drum with available flutes | drying area/volume     regen area/volume     cooling area/volume $Ad := \frac{Rd^2}{2} \cdot \theta - 2 \cdot Rd \cdot th \quad Ar := \frac{Rd^2}{2} \cdot \phi \quad Ac := \frac{Rd^2}{2} \cdot \gamma$ $Ad = 0.462 \text{:ft}^2 \quad\quad\quad Ar = 0.279 \cdot ft^2 \quad Ac = 3.409 \text{:in}^2$ $Vd := Ad \cdot Length \quad\quad Vr := Ar \cdot Length \quad Vc := Ac \cdot Length$ $Vd = 0.607 \cdot ft^3 \quad\quad\quad Vr = 0.367 \cdot ft^3 \quad Vc = 0.031 \cdot ft^3$ -continued $Pvo := 10^{[15.1-(\frac{5079.6}{Tin})-1.6908\cdot\log(Tin)-3.193\cdot10^{-3}\cdot Tin+1.234\cdot10^{-6}\cdot Tin^2]} \cdot \frac{lb}{in^2}$   Vapor pressure at inlet template $Pvo = 0.958:psia$ $rdPvo := 10^{[15.1-(\frac{5079.6}{rTdp})-1.6908\cdot\log(rTdp)-3.193\cdot10^{-3}\cdot rTdp+1.234\cdot10^{-6}\cdot rTdp^2]} \cdot \frac{lb}{in^2}$   Vapor pressure at assumed regen dew point temperature $rPvo := 10^{[15.1-(\frac{5079.6}{rTin})-1.6908\cdot\log(rTin)-3.193\cdot10^{-3}\cdot rTin+1.234\cdot10^{-6}\cdot rTin^2]} \cdot \frac{lb}{in^2}$   Vapor pressure at regen inlet temperature $rrh := \frac{rdPvo}{rPvo}$   calculated relative humidity of regen air flow at the inlet Pressure $rh$ since measured at pressure   $rrh = 0.033$ $Acsf := base \cdot h \cdot .5$   cross sectional area of each flute in the drum   $Acsf = 2.444 \cdot 10^{-5}:ft^2$ $Per := \left[base + 2 \cdot \sqrt{\left(\frac{base^2}{4}\right) + h^2}\right]$   perimeter of each flute   $Per = 0.023:ft$ $de := \frac{Acsf}{Per}$   equivalent radius of each flute   $de = 1.052 \cdot 10^{-3}:ft$ NUMBER OF FLUTES IN REGEN SECTION   initial guesses →   $rNf := 2000$   $Afp := 1 \cdot ft^2$ Given $\frac{Ar - Afp}{Acsf} = rNf$   $Afp = \frac{rNf}{2} \cdot Per \cdot perx$   $\begin{bmatrix} rNf \\ Afp \end{bmatrix} := Find(rNf, Afp)$ Number of flutes in regen section →   $rNf = 8.425 \cdot 10^3$ $\tau r := \tau br \cdot \frac{\phi}{\theta + \gamma}$   Time in the regen section.   $\tau r = 112.281 \cdot sec$ $rAs := rNf \cdot Per \cdot Length$   $rAs = 256.848 \cdot ft^2$ $ra := \frac{rAs}{Vr}$   $ra = 700.656:\frac{ft^2}{ft^3}$ $rco := .622 \cdot \frac{rPvo \cdot rrh}{(P - rPvo \cdot rrh)}$   Solute concentration at inlet to regen section.   $rco = 0.012$ $co := .622 \cdot \frac{Pvo \cdot rh}{(P - Pvo \cdot rh)}$   Solute concentration at inlet to bed.   $co = 4.438 \cdot 10^{-3}$

DRYING SECTION MEAN TEMPERATURE

Initial guesses →   $Tmax := 630$   $Cpd := 20$   $Tm := 605$   $hb := 1350$

Given $$co \cdot \frac{hb}{Cpd} = Tmax - Tin \quad \frac{Tmax + Tin}{2} = Tm$$

$$.2316 + .09003 \cdot 10^{-4} \cdot Tm + 1.221 \cdot 10^{-8} \cdot Tm^2 - 0.2778 \cdot 10^{-10} \cdot Tm^3 = Cpd$$

$\begin{bmatrix} Tmax \\ Tm \\ Cpd \end{bmatrix} := Find(Tmax, Tm, Cpd)$ $Tmax = 584.937$   Drying section outlet temp $Tm = 572.469$   Drying section average temp $Cpd = 0.24$   Drying section specific heat w/o units attached. The following equation will add units.

$dpGUESS := -10$   Initial Guess For Outlet Dew Point.

$Pv1 := 10^{[15.1-(\frac{5079.6}{Tmax})-1.6908\cdot\log(Tmax)-3.193\cdot10^{-3}\cdot Tmax+1.234\cdot10^{-6}\cdot Tmax^2]} \cdot \frac{lb}{in^2}$ $Ppvd := 10^{[8.224+0.17026\cdot\log(dpGUESS+459.67)-\frac{4785}{(dpGUESS+459.67)}]} \cdot psia$ $rhguess := \frac{Ppvd}{Pv1}$   $MassWguess := .622 \cdot \frac{rhguess \cdot Ppvd}{P - rhguess \cdot Ppvd} \cdot SF \cdot \tau \cdot \rho o$ $MassW := \left(.622 \cdot \frac{rh \cdot Pvo}{P - rh \cdot Pvo} \cdot SF \cdot \tau \cdot \rho o\right) - MassWguess$ total mass of water in the drying section in time $t$.

$MassW = 0.529:lb$

-continued $Cp\rho b := Cpds \cdot \rho b + \dfrac{MassW \cdot Cp\_w}{Vr}$   heat capacity of dry desiccant plus that of water vapor present $Cpd := Cpd \cdot \dfrac{BTU}{lb}$   Adds units to the specific heat found in the previous calculation

EQUILIBRIUM TEMP CALCULATION

Assumed cooling mean temp → $sT := \dfrac{(rTin + Tin)}{2}$

Given  Initial guesses  $rT2 := 600$  $rPv2 := .5 \cdot psia$  $RSF := 185 \cdot SCFM$ $$10^{\left[15.1 - \left(\frac{5079.6}{rT2}\right) - 1.6908 \cdot \log(rT2) - 3.193 \cdot 10^{-3} \cdot rT2 + 1.234 \cdot 10^{-6} \cdot rT2^2\right]} \cdot \dfrac{lb}{in^2} = rPv2$$

$$\left(\dfrac{SF}{RSF} \cdot \dfrac{rh \cdot Pvo}{P - rh \cdot Pvo} + \dfrac{rrh \cdot rPvo}{rP - rrh \cdot rPvo}\right) \cdot \dfrac{(rP - .9 \cdot rPv2)}{.9} = rPv2$$

$$\dfrac{BSF}{\left(\dfrac{P \cdot rT2 \cdot \gamma}{sT \cdot rP \cdot \theta} + 1\right)} = RSF$$

$\begin{bmatrix} rT2 \\ rPv2 \\ RSF \end{bmatrix} := Find(rT2, rPv2, RSF)$

Equilibrium temperature → $rT2 = 615.244$ $RSF = 216.31 : \dfrac{ft^3}{min}$   Vapor pressure at equilibrium temp → $rPv2 = 4.27 : psia$ $W := RSF \cdot \rho o$   Mass flow rate in regen section.  $W = 0.27 \cdot lb \cdot sec^{-1}$ $\tau m1 := \dfrac{Cp\rho b \cdot Vr}{Cpr \cdot W}$   Time to to the first breakthrough. Between regen inlet temp and equilibrium temp.  $\tau m1 = 15.898 \cdot sec$ $r\mu := \dfrac{.0395 + (.00006292(rT2 - 460))}{3600} \cdot \dfrac{lb}{ft \cdot sec}$   Viscocity calculated at equilibrium temperature  $r\mu = 1.369 \cdot 10^{-5} \cdot \dfrac{lb}{ft \cdot sec}$ $r\rho := \dfrac{MWair \cdot rP}{Rg \cdot rT2}$   Density calculated at equilibrium temperature  $r\rho = 0.505 : \dfrac{lb}{ft^3}$ $\tau m2 := \dfrac{VrCpds \cdot \rho b + \dfrac{MassW \cdot ha}{rTin - rT2}}{W \cdot Cpr}$   $\tau m2 = 88.53 \cdot sec$ $rUo := \dfrac{RSF \cdot rT2 \cdot Pr}{Tr \cdot rP \cdot Ar}$   Superficial velocity in regen section calculated at equilibrium temperature  $rUo = 1.915 : \dfrac{ft}{sec}$ $k1 := r\mu \cdot \left(Cpr + \dfrac{2.48 \cdot \dfrac{BTU}{lbmol}}{MWair}\right)$   Heat transfer factor used in Cussler's equation  $k1 = 4.442 \cdot 10^{-6} \cdot \dfrac{BTU}{ft \cdot sec}$ $kh := \dfrac{k1}{de} \cdot \left[.027 \cdot \left(\dfrac{de \cdot rUo \cdot r\rho}{r\mu}\right)^{.8} \cdot \left(\dfrac{r\mu \cdot Cpr}{k1}\right)^{.333}\right]$   Heat transfer coefficient  $kh = 3.231 \cdot 10^{-3} \cdot \dfrac{BTU}{ft^2 \cdot sec}$

REGEN TEMP CALCS

The second curve must be shifted to the right by the distance between the two midpoints. However, the time it takes to get to each of the midpoints is different because the time components are different. The magnitude of $\Delta T$ doesn't matter IF the time function (Z) is the same for both. (tm2−tm1=curveshift) For the two equations used above the value of Z is NT, which is not the same for both since no water removed in the first part of the curve.

$NT\_1 := \dfrac{kh \cdot ra}{Cp\rho b}$   $NT\_1 = 0.808 \cdot sec^{-1}$ $NT\_2 := \dfrac{kh \cdot ra}{Cpds \cdot \rho b}$   $NT\_2 = 1.048 \cdot sec^{-1}$ The time shift is tm2−tm1*NT_1/NT_2:

$\tau cs := \tau m2 - \tau m1 \cdot \dfrac{NT\_1}{NT\_2}$

NOTE: It can also be seen that the first curve must be terminated at the same point.

Also, because the function of the second curve must be shifted, the temperature out of the last flute is the function calculated from $\tau cs$ to $(\tau r - \tau cs)$. If the value of $\tau r < \tau cs$ then only the first function will be calculated at the actual time.

$\tau tp := \tau r - \tau cs$   $\tau cs = 76.277 \cdot sec$

-continued $$\tau tp := \begin{vmatrix} \tau tp & \text{if } \tau tp > 0 \\ 0 \cdot \sec & \text{otherwise} \end{vmatrix} \quad \tau r = 112.281 \cdot \sec \quad \tau tp = 36.004 \cdot \sec$$

INSTANTANEOUS REGENERATION TEMPERATURE ($rT$)

$$Tr\_lfr\_z1 := .5 \cdot \left[\left[1 - \text{erf}\left[\left(\frac{kh \cdot ra \cdot Vr}{W \cdot Cpr}\right)^{.5} - \left(\frac{kh \cdot ra \cdot \tau r}{Cp\rho b}\right)^{.5}\right]\right]\right]$$

$$rT := Tr\_lfr\_z1 \cdot (rT2 - Tin) + Tin$$

$$rT - 459.67 = 155.554$$

$$rTflute := \begin{vmatrix} .5 \cdot \left[\left[1 - \text{erf}\left[\left(\frac{kh \cdot ra \cdot Vr}{W \cdot Cpr}\right)^{.5} - \left(\frac{kh \cdot ra \cdot \tau r}{Cp\rho b}\right)^{.5}\right]\right]\right] \cdot & \text{if } \tau tp \le 0 \\ (rT2 - Tin) + Tin - 459.67 & \\ \left[.5 \cdot \left[\left[1 - \text{erf}\left[\left(\frac{kh \cdot ra \cdot Vr}{W \cdot Cpr}\right)^{.5} - \left(\frac{kh \cdot ra \cdot \tau tp}{Cpd \cdot \rho b}\right)^{.5}\right]\right]\right] \cdot & \text{otherwise} \\ (rTin - rT) + rT - 459.67\right] & \end{vmatrix}$$

$$rTflute = 300.508$$

INSTANTANEOUS TEMPERATURE VERSUS TIME FROM 0 TO $\tau r$ SECONDS $$\tau r2 := \tau r \quad \tau r3 := \tau r \quad i := 0..\frac{\tau r \cdot 10}{\sec} \quad j := 0..\frac{\tau r}{\sec} \quad \tau r2_i := (0 + .1 \cdot i) \cdot \sec$$

$$curve1_i := .5 \cdot \left[1 - \text{erf}\left[\left(\frac{kh \cdot ra \cdot Vr}{W \cdot Cpr}\right)^{.5} - \left(\frac{kh \cdot ra \cdot \tau r2_i}{Cp\rho b}\right)^{.5}\right]\right] \cdot (rT2 - Tin) + Tin - 459.67$$

$$curve2_i := .5 \cdot \left[\left[1 - \text{erf}\left[\left(\frac{kh \cdot ra \cdot Vr}{W \cdot Cpr}\right)^{.5} - \left(\frac{kh \cdot ra \cdot \tau r2_i}{Cpd \cdot \rho b}\right)^{.5}\right]\right]\right] \cdot (rTin - rT) + rT - 459.67$$

Figure 28:
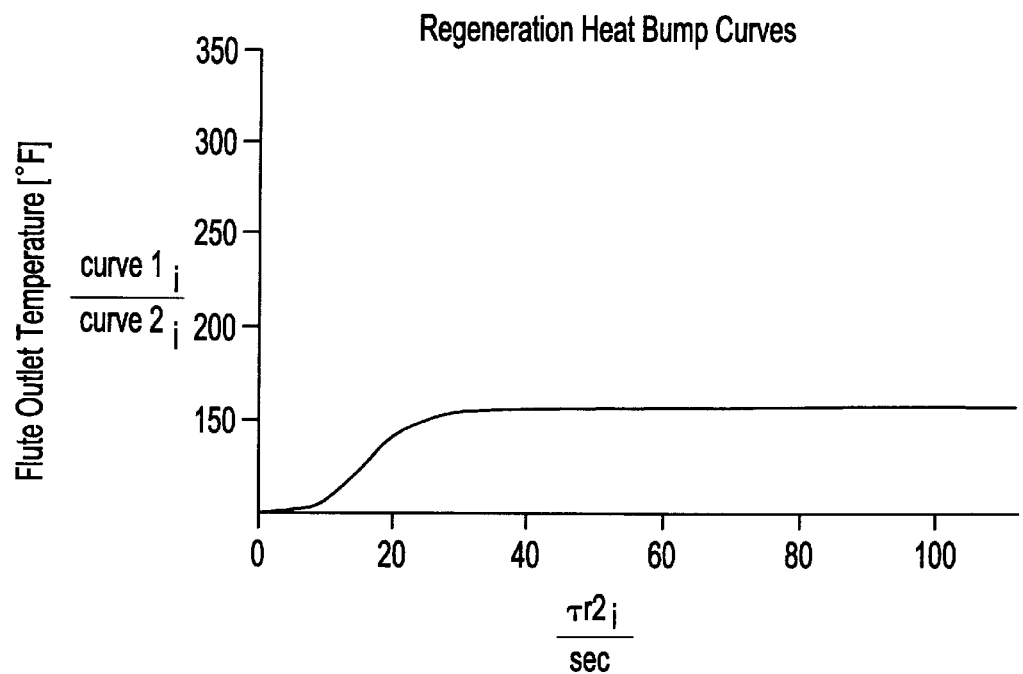
FIG. 28 is a graph showing the relationship between flute outlet temperature and time.

A graph showing the relationship between flute outlet temperature and time is illustrated in FIG. 28.

This is the same set of curves with the second heat bump shifted by τcs.

$$j := 0..\frac{\tau cs \cdot 10}{\sec} \quad jj := 0..\frac{\tau tp \cdot 10}{\sec}$$

$$\tau r2_j := (0 + .1 \cdot j) \cdot \sec \quad \tau r3_{jj} := (0 + 1 \cdot jj) \cdot \sec$$

$$curve1_j := .5 \cdot \left[1 - erf\left[\left(\frac{kh \cdot ra \cdot Vr}{W \cdot Cpr}\right)^{.5} - \left(\frac{kh \cdot ra \cdot \tau r2_j}{Cp\rho b}\right)^{.5}\right]\right] \cdot$$
$$(rT2 - Tin) + Tin - 459.67$$

-continued $$curve2_{jj} := .5 \cdot \left[\left[1 - erf\left[\left(\frac{kh \cdot ra \cdot Vr}{W \cdot Cpr}\right)^{.5} - \left(\frac{kh \cdot ra \cdot \tau r3_{jj}}{Cpd \cdot \rho b}\right)^{.5}\right]\right]\right] \cdot$$
$$(rTin - rT) + rT - 459.67$$

Figure 29:
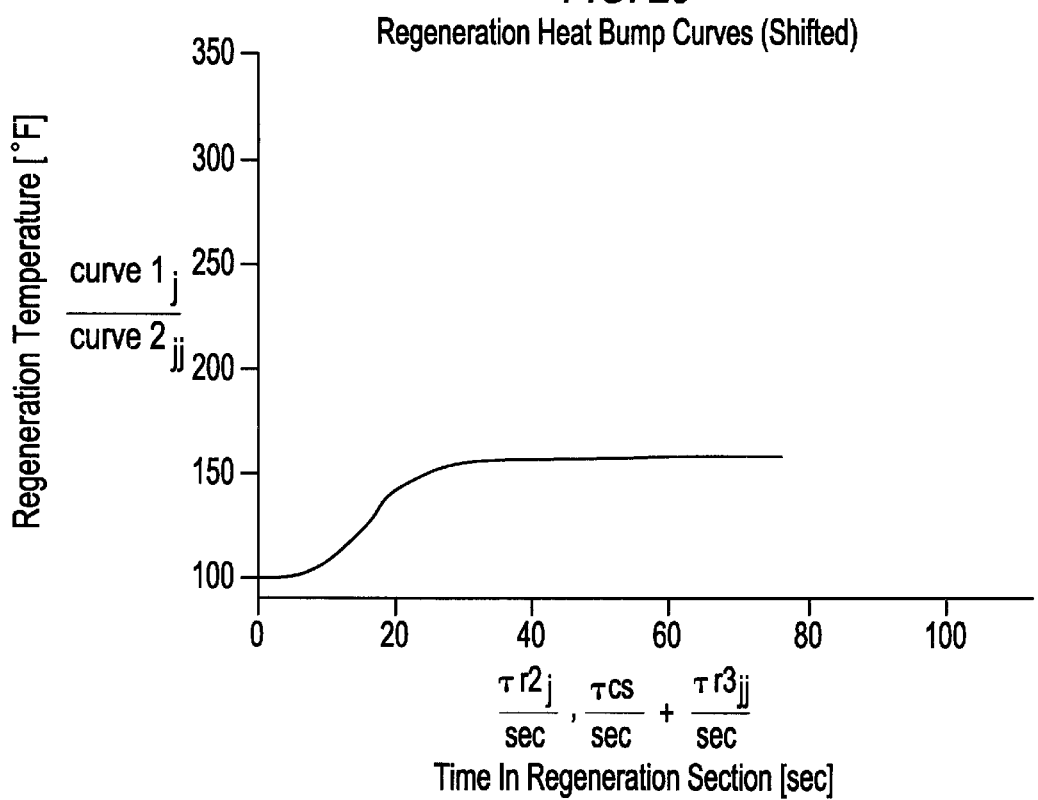
FIG. 29 is a graph showing the relationship between the regeneration temperature and the time in regeneration section.

A graph showing the relationship between the generation temperature and the time in regeneration section is illustrated in FIG. 29.

AVERAGE TEMPERATURE OUT OF REGEN SECTOR $$Atemp0 := \left[\frac{0.5}{\tau r} \cdot \int_{0 \cdot \sec}^{\tau r} \left[\left[1 - erf\left[\left(\frac{kh \cdot ra \cdot Vr}{W \cdot Cpr}\right)^{.5} - \left(\frac{kh \cdot ra \cdot \tau crv1}{Cp\rho b}\right)^{.5}\right]\right]\right] d\tau crv1\right] \cdot$$
$$(rT2 - Tin) + Tin$$

$$Atemp0 - 459.67 = 147.43$$

$$Atemp1 := \left[\frac{0.5}{\tau cs} \cdot \int_{0 \cdot \sec}^{\tau cs} \left[\left[1 - erf\left[\left(\frac{kh \cdot ra \cdot Vr}{W \cdot Cpr}\right)^{.5} - \left(\frac{kh \cdot ra \cdot \tau crv1}{Cp\rho b}\right)^{.5}\right]\right]\right] d\tau crv1\right] \cdot$$
$$(rT2 - Tin) + Tin$$

$$\tau tp2 := \begin{vmatrix} \tau tp & \text{if } \tau tp > 0 \\ 999999999 \cdot \sec & \text{otherwise} \end{vmatrix} \quad Atemp1 - 459.67 = 143.596$$

$$Atemp2 := \left[\frac{0.5}{\tau tp2} \cdot \int_{0 \cdot \sec}^{\tau tp} \left[\left[1 - erf\left[\left(\frac{kh \cdot ra \cdot Vr}{W \cdot Cpr}\right)^{.5} - \left(\frac{kh \cdot ra \cdot \tau crv2}{Cpd \cdot \rho b}\right)^{.5}\right]\right]\right] d\tau crv2\right] \cdot$$
$$(rTin - rT) + rT$$

-continued $$Atemp2 - 459.67 = 249.222$$

These must be time averaged to get the proper value for the temperature of the air leaving the regeneration section at any given time.

$$rTout := \begin{vmatrix} Atemp0 & \text{if } \tau tp \leq 0 \\ \left(\dfrac{Atemp1 \cdot \tau cs + Atemp2 \cdot \tau tp}{\tau r}\right) & \text{otherwise} \end{vmatrix} \quad rTout - 459.67 = 177.466$$

AVERAGE TEMPERATURE OUT OF REGEN SECTOR VERSUS TIME $$\tau r5 := 90 \cdot \sec \quad \tau r4 := 100 \cdot \sec \quad crv1 := 20 \quad crv2 := 2 \quad \tau \tau := 30$$

Given $$\dfrac{0.5}{\sec} \cdot \int_{0 \cdot \sec}^{\tau r4} \left[\left[1 - \text{erf}\left[\left(\dfrac{kh \cdot ra \cdot Vr}{W \cdot Cpr}\right)^{.5} - \left(\dfrac{kh \cdot ra \cdot \tau r4}{Cp\rho b}\right)^{.5}\right]\right]\right] d\tau r4 = crv1 \quad func(\tau r4) := Find(crv1)$$

$$n := 1..\dfrac{\tau cs}{\sec} \quad \tau r4 := (0 + n) \cdot \sec \quad Acurve1_n := \left(\dfrac{func(\tau r4_n)}{\tau r4_n}\right) \cdot \sec \cdot (rT2 - Tin) + Tin - 459.67$$

Given $$\dfrac{0.5}{\sec} \cdot \int_{0 \cdot \sec}^{\tau r5} \left[\left[1 - \text{erf}\left[\left(\dfrac{kh \cdot ra \cdot Vr}{W \cdot Cpr}\right)^{.5} - \left(\dfrac{kh \cdot ra \cdot \tau r5}{Cpd \cdot \rho b}\right)^{.5}\right]\right]\right] d\tau r5 = crv2 \quad func(\tau r5) := Find(crv2)$$

$$mm := 1..\dfrac{\tau tp \cdot 10}{\sec} \quad \tau r5_{mm} := (0 + .1 \cdot mm) \cdot \sec$$

$$Acurve2_{mm} := \left(\dfrac{func(\tau r5_{mm})}{\tau r5}\right) \cdot \sec \cdot (rTin - rT) + rT - 459.67$$

A graph showing the relationship between the average regeneration section outlet temperature and regeneration time is illustrated in FIG. 30.

The following graph shows both the Instantaneous temperature out of the regeneration flutes and the average temperature.

A graph showing both the instantaneous temperature out of the regeneration flutes and the average temperature is illustrated in FIG. 31.

It can be seen here why the two curves were time averaged earlier in this program to get the average temperature out. The average temp calculated before is again shown below for comparison.

$$rTout = 637.136$$

Cooling Section Equations

This is only valid with the assumption that the pressure across the top seal is slightly negative, $$CSF := BSF - RSF \qquad\qquad CSF = 8.69 \cdot \dfrac{ft^3}{min}$$

$$cW := CSF \cdot \rho o \qquad \text{mass flow rate in cooling section}$$

$$Cpc := .24 \cdot \dfrac{BTU}{lb} \qquad ca := ra \qquad \tau c := \tau br \cdot \left(\dfrac{\gamma}{\theta + \phi}\right) \qquad \tau cm := \dfrac{Cpd \cdot \rho b \cdot Vc}{Cpc \cdot cW}$$

$$cTm := (rTin - Tmax) + 459.67 \qquad cActF := CSF \cdot \dfrac{cTm \cdot Pr}{Tr \cdot P} \qquad cVel := \dfrac{cActF}{Ac}$$

$$c\_res\_time := \dfrac{Length}{cVel} \qquad cActF = 1.331 \cdot \dfrac{ft^3}{min} \qquad c\_res\_time = 1.401 \cdot \sec$$

$$cUo := \dfrac{CSF \cdot cTm \cdot Pr}{Tr \cdot rP \cdot Ac} \qquad c\mu := \dfrac{.0395 + (.00006292(cTm - 460))}{3600} \cdot \dfrac{lb}{ft \cdot \sec} \qquad c\rho := \dfrac{MWair \cdot P}{Rg \cdot cTm}$$

$$c\mu = 1.403 \cdot 10^{-5} \cdot \dfrac{lb}{ft \cdot \sec}$$

$$ck1 := c\mu \cdot \left(Cpc + \dfrac{2.48 \cdot \dfrac{BTU}{lbmol}}{MWair}\right) \quad ckh := \dfrac{ck1}{de} \cdot \left[.327 \cdot \left(\dfrac{de \cdot cUo \cdot c\rho}{c\mu}\right)^{.8} \cdot \left(\dfrac{c\mu \cdot Cpc}{ck1}\right)^{.333}\right]$$

To develop the curve in the cooling it is necessary to make adjustments to the regen curve leading into this section. When the flute enters the cooling section, not only does the temperature of the driving gas change, but also the velocity. Therefore, it is necessary to calculate a new time shift, which is a slightly different calculation than before. This time we want to shift the curve enough so that the temperature is equal on both curves at $\tau r$.

$$\tau bs := \left(\frac{Cpd \cdot \rho b}{ckh \cdot ca}\right) \cdot \left[\left(\frac{kh \cdot ra \cdot \tau tp}{Cpd \cdot \rho b}\right)^{.5} + \left(\frac{ckh \cdot ca \cdot Vc}{cW \cdot Cpc}\right)^{.5} - \left(\frac{kh \cdot ra \cdot Vr}{W \cdot Cpr}\right)^{.5}\right]^2 \quad \tau bs = 36.476 \cdot \sec$$

The shift time is equal to:

$$\tau csc := (\tau bs + \tau c) \quad \tau cs2 := \tau r - \tau bs$$

$$jk := 0 \ldots \frac{\text{floor}(\tau csc)}{\sec} \quad \tau cs2_{jk} := (0 + jk) \cdot \sec \quad \tau cs2 = 75.806 \cdot \sec \quad \tau csc = 43.055 \cdot \sec$$

$$cooluplimit := .5 \cdot \left[\left[1 - \text{erf}\left[\left(\frac{ckh \cdot ca \cdot Vc}{cW \cdot Cpc}\right)^{.5} - \left[\frac{ckh \cdot ca \cdot (\tau bs + c\_res\_time \cdot 2)}{Cpd \cdot \rho b}\right]^{.5}\right]\right] \cdot (rTin - rT) + rT$$

$$cooluplimit - 459.67 = 300.529$$

$$slowcurve2_{jk} := .5 \cdot \left[\left[1 - \text{erf}\left[\left(\frac{ckh \cdot ca \cdot Vc}{cW \cdot Cpc}\right)^{.5} - \left(\frac{ckh \cdot ca \cdot \tau cs2_{jk}}{Cpd \cdot \rho b}\right)^{.5}\right]\right] \cdot (rTin - rT) + rT - 459.67$$

Figure 32:
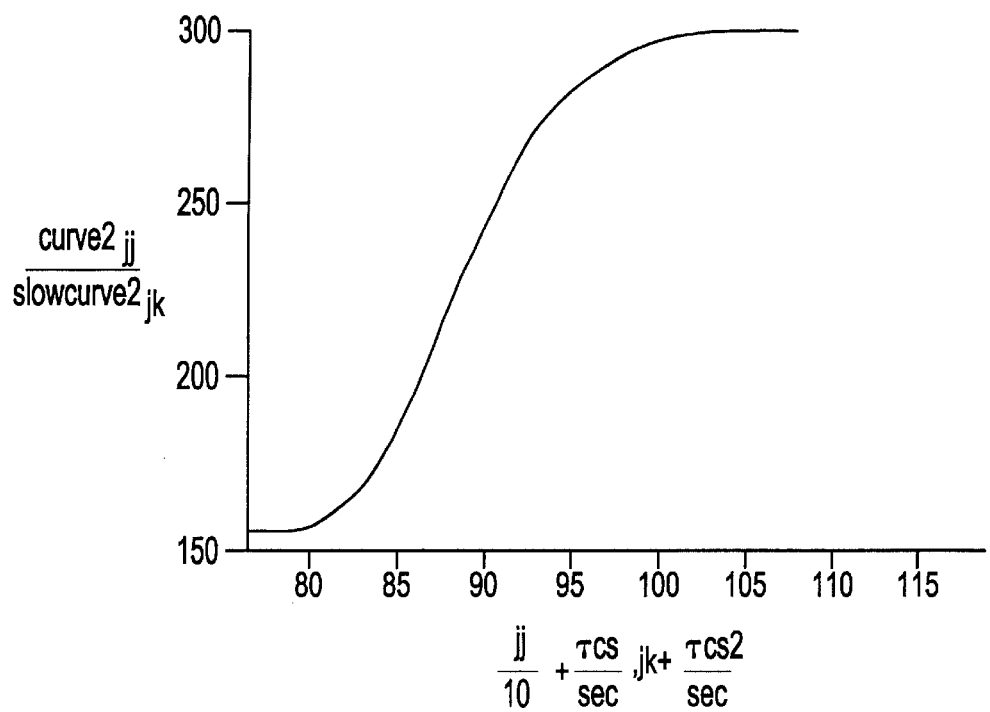
FIG. 32 is a graph showing the relationship between $$\frac{curve2_{jj}}{slowcurve2_{jk}} \text{ and } \frac{jj}{10} + \frac{\tau cs}{\sec}, jk + \frac{\tau cs2}{\sec}.$$

The relationship between $$\frac{curve2_{jj}}{slowcurve2_{jk}} \quad \text{and} \quad \frac{jj}{10} + \frac{\tau cs}{\sec}, jk + \frac{\tau cs2}{\sec}$$

is illustrated in FIG. 32.

Define the point at which the heat bump moves out of the bed ($\tau cmid$). The following graph represents the two curves in the cooling section.

$$a := \frac{\text{floor}(\tau bs)}{\sec} \quad b := \frac{\text{floor}(\tau csc)}{\sec} \quad kk := 0 \ldots (b - a) \quad ii := 0 \ldots \frac{\text{ceil}(\tau c)}{\sec} \quad \tau rc_{kk} := \left(\frac{\tau bs}{\sec} + kk\right) \cdot \sec$$

$$\tau c\_arr_{ii} := (0 + ii) \cdot \sec$$

$$Fr := \left|\begin{array}{l} \frac{\tau r - \tau ml}{(\tau cs - \tau ml) \cdot 1.025} \quad \text{if } \tau r < \tau cs \cdot 1.025 \\ 1 \quad \text{otherwise} \end{array}\right. \quad Cp\rho b\_c := Cpds \cdot \rho b + \frac{(MassW \cdot (1 - Fr) \cdot Cp\_w)}{Vc}$$

$$Ccurve_{ii} := \left[.5 \cdot \left[\left[1 + \text{erf}\left[\left(\frac{ckh \cdot ca \cdot Vc}{cW \cdot Cpc}\right)^{.5} - \left(\frac{ckh \cdot ca \cdot \tau c\_arr_{ii}}{Cpd \cdot \rho b}\right)^{.5}\right]\right]\right] \cdot (cooluplimit - Tmax) + Tmax\right] - 459.67$$

$$slowcurve2_{kk} := .5 \cdot \left[\left[1 - \text{erf}\left[\left(\frac{ckh \cdot ca \cdot Vc}{cW \cdot Cpc}\right)^{.5} - \left(\frac{ckh \cdot ca \cdot \tau rc_{kk}}{Cp\rho b\_c}\right)^{.5}\right]\right]\right] \cdot (rTin - rT) + rT - 459.67$$

Figure 33:
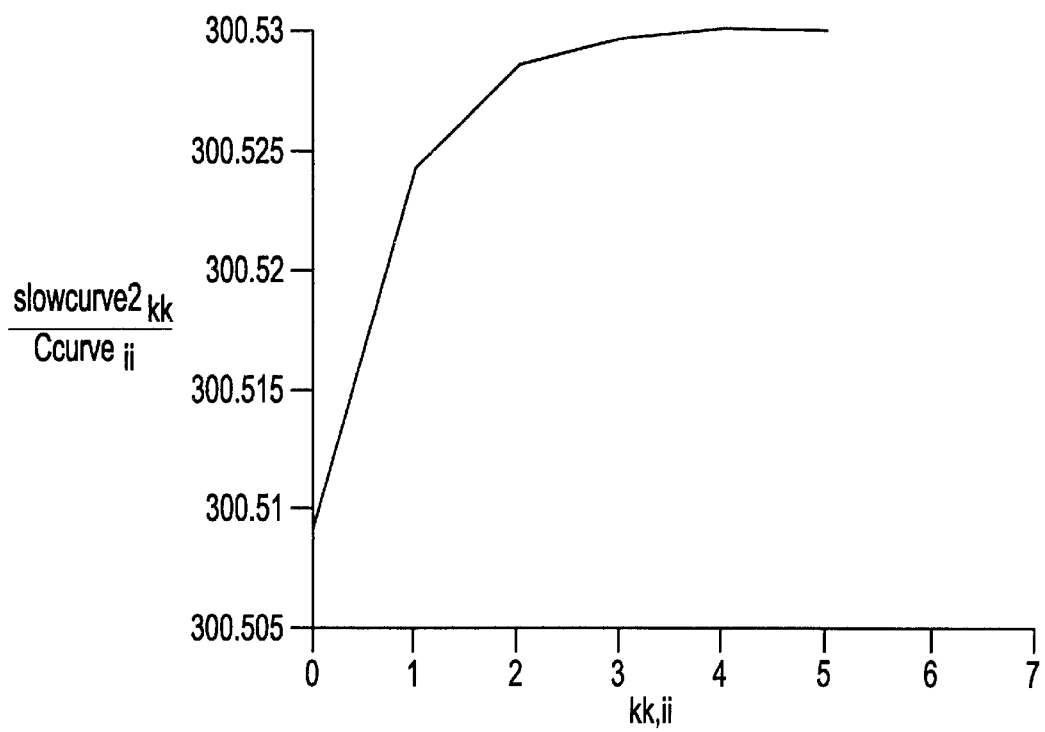
FIG. 33 is a graph showing the two curves in the cooling section.

A gragh showing the two curves in the cooling section is illustrated in FIG. 33.

$$l := 0 \ldots \frac{(\tau cmid) \cdot 10}{\sec} \quad mn := \frac{\text{ceil}(\tau cmid) \cdot 10}{\sec} \ldots \frac{\tau c \cdot 10}{\sec} \quad \tau cg_{mn} := (0 + .1mn) \cdot \sec \quad \tau cf_l := \left(\frac{\tau bs}{\sec} + .1 \cdot l\right) \cdot \sec$$

$$slowcurve2_l := .5 \cdot \left[\left[1 - \text{erf}\left[\left(\frac{ckh \cdot ca \cdot Vc}{cW \cdot Cpc}\right)^{.5} - \left(\frac{ckh \cdot ca \cdot \tau cf_l}{Cpd \cdot \rho b}\right)^{.5}\right]\right]\right] \cdot (rTin - rT) + rT - 459.67$$

$$Ccurve_{mn} := \left[.5 \cdot \left[\left[1 + \text{erf}\left[\left(\frac{ckh \cdot ca \cdot Vc}{cW \cdot Cpc}\right)^{.5} - \left(\frac{ckh \cdot ca \cdot \tau cg_{mn}}{Cp\rho b\_c}\right)^{.5}\right]\right]\right] \cdot (cooluplimit - Tmax) + Tmax\right] - 459.67$$

Figure 34:
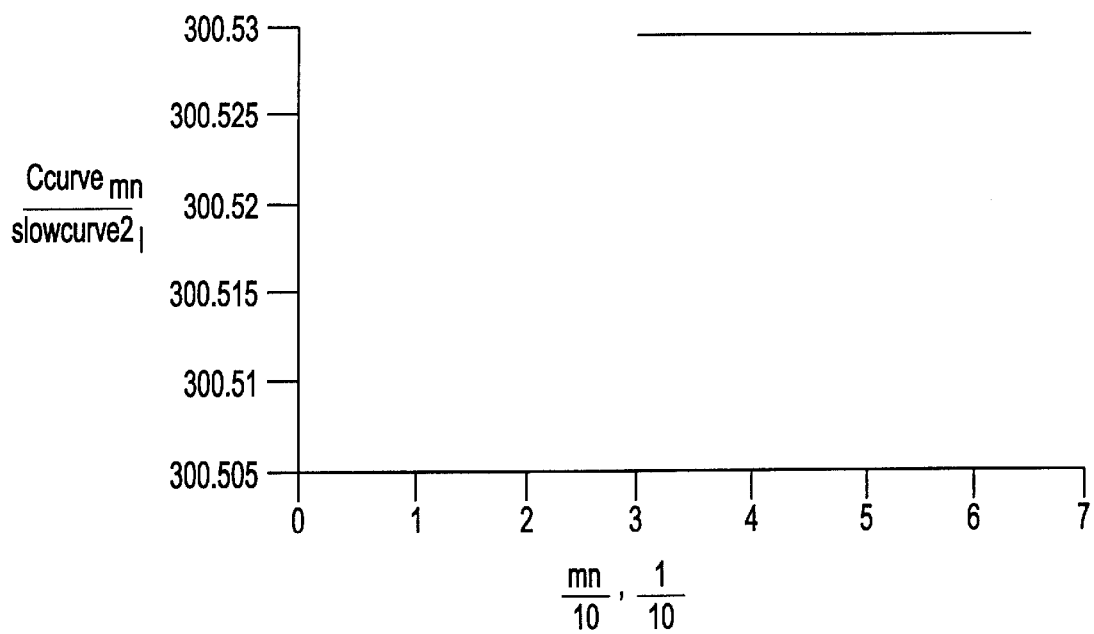
FIG. 34 is a graph showing the relationship between $$\frac{Ccurve_{mn}}{slowcurve2_1} \text{ and } \frac{mn}{10}, \frac{1}{10}.$$

A gragh illustrating the relationship between $$\frac{Ccurve_{mn}}{slowcurve2_l} \quad \text{and} \quad \frac{mn}{10}, \frac{l}{10}$$

is shown in FIG. 34.

Instantaneous Temp $\Delta T\tau c$

IF $\tau c > \tau cmid$, THEN THIS TEMP WILL BE CALCULATED USING THE COOLING EQUATION ONLY: ELSE IT WILL BE USING THE REGEN EQUATION ONLY.

$$SC := .5 \cdot \left[\left[1 - \text{erf}\left[\left(\frac{ckh \cdot ca \cdot Vc}{cW \cdot Cpc}\right)^{.5} - \left[\frac{ckh \cdot ca \cdot (\tau bs + \tau c)}{Cpd \cdot \rho b}\right]^{.5}\right]\right]\right] \cdot (rTin - rT) + rT$$

$$CC := .5 \cdot \left[\left[1 + \text{erf}\left[\left(\frac{ckh \cdot ca \cdot Vc}{cW \cdot Cpc}\right)^{.5} - \left(\frac{ckh \cdot ca \cdot \tau c}{Cp\rho b\_c}\right)^{.5}\right]\right]\right] \cdot (cooluplimit - Tmax) + Tmax$$

$$instTc := \begin{vmatrix} SC & \text{if } \tau c < \tau cmid \\ CC & \text{otherwise} \end{vmatrix}$$

Instantaneous temperature out of the last cooling section flute → $instTc - 459.67 = 300.529$ AVERAGE TEMP OUT OF THE COOLING SECTION AT $\tau c$ $$\tau_{cc} := \begin{vmatrix} \tau c & \text{if } \tau c < \tau cmid \\ \tau cmid & \text{otherwise} \end{vmatrix} \quad \tau\tau bs := \tau bs + \tau cc \quad \tau 2 := (\tau c - \tau cmid)$$

$$aSC := \left[\frac{.5 \cdot (rTin - rT)}{\tau cc} \cdot \int_{\tau bs}^{\tau\tau bs}\left[\left[1 - \text{erf}\left[\left(\frac{ckh \cdot ca \cdot Vc}{cW \cdot Cpc}\right)^{.5} - \left(\frac{ckh \cdot ca \cdot \tau cc}{Cpd \cdot \rho b}\right)^{.5}\right]\right]\right] d\tau cc\right] + rT$$

$$aCC := \left[\frac{.5 \cdot (cooluplimit - Tmax)}{\tau 2} \cdot \int_{\tau cmid}^{\tau c}\left[\left[1 + \text{erf}\left[\left(\frac{ckh \cdot ca \cdot Vc}{cW \cdot Cpc}\right)^{.5} - \left(\frac{ckh \cdot ca \cdot \tau ccc}{Cp\rho b\_c}\right)^{.5}\right]\right]\right] d\tau ccc\right] + Tmax$$

$$avgTc := \begin{vmatrix} \dfrac{aSC}{\tau cc} & \text{if } \tau c < \tau cmid \\ \dfrac{aSC \cdot \tau cc + aCC \cdot \tau 2}{\tau c} & \text{otherwise} \end{vmatrix} \quad avgTc - 459.67 = 300.527$$

CALCULATE THE AVERAGE TEMPERATURE INTO THE CONDENSER $$\text{con\_inT} := \frac{rTout \cdot RSF + avgTc \cdot CSF}{(RSF + CSF)} \quad \text{con\_inT} - 459.67 = 182.219$$

$$PrfL := 0 \ldots \frac{Length}{ft} \cdot 100 \quad Lprf_{PrfL} := (0 + 0.1 \cdot PrfL) \cdot ft$$

$$FluteTProfile_{PrfL} := .5 \cdot \left[\left[1 + \text{erf}\left[\left(\frac{ckh \cdot ca \cdot Lprf_{PrfL} \cdot Ac}{cW \cdot Cpc}\right)^{.5} - \left(\frac{ckh \cdot ca \cdot \tau c}{Cp\rho b\_c}\right)^{.5}\right]\right]\right] \cdot (cooluplimit - Tmax) + Tmax$$

Figure 35:
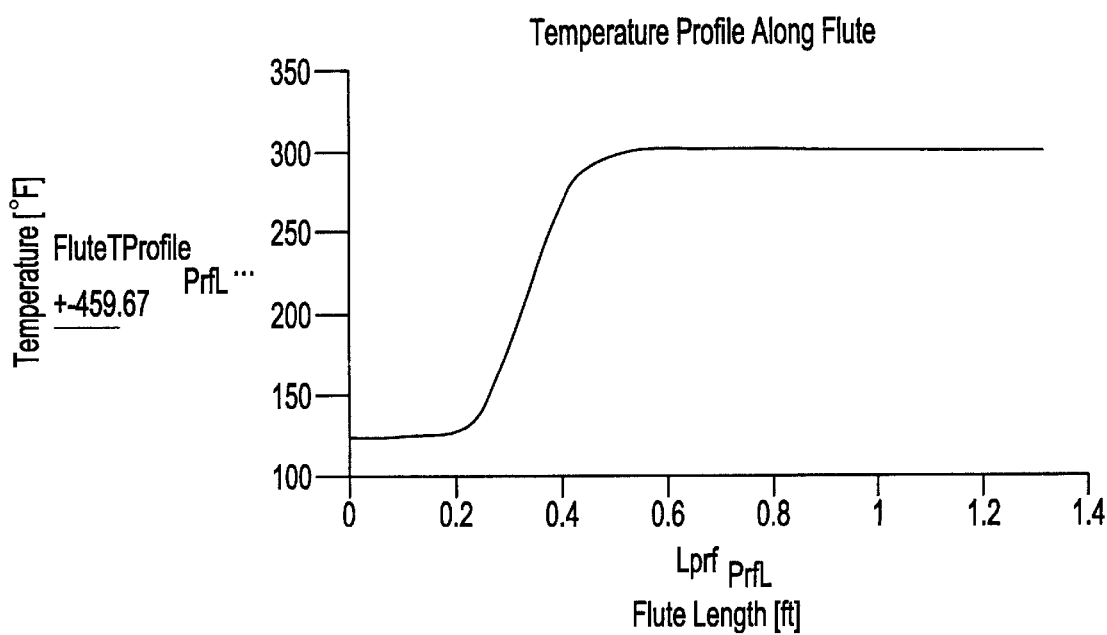
FIG. 35 is a graph showing the relationship between temperature and flute length.

A graph showing the relationship between temperature and flute length is shown in FIG. 35.

$$iL := 0 \ldots \frac{Length \cdot 10}{ft} \quad Lmat_{iL} := (0 + .1 \cdot iL) \cdot ft \quad j\tau := 0 \ldots \frac{\tau c}{\sec} \quad \tau mat_{j\tau} := (0 + j\tau) \cdot \sec$$

$$iL2 := 0 \ldots \frac{Length}{ft}$$

$$Tmatrix_{j\tau, iL} :=$$

$$\left[.5 \cdot \left[\left[1 + \text{erf}\left[\left(\frac{ckh \cdot ca \cdot Lmat_{iL} \cdot Ac}{cW \cdot Cpc}\right)^{.5} - \left(\frac{ckh \cdot ca \cdot \tau mat_{j\tau}}{Cp\rho b\_c}\right)^{.5}\right]\right]\right] \cdot (cooluplimit - Tmax) + Tmax\right] + -459.67$$

The following graph is the flute temperature throughout the cooling section of the bed. The z axis is temperature, the x-axis is time in the cooling section, and the y-axis is flute position along the flute from the inlet to the outlet.

Figure 36:
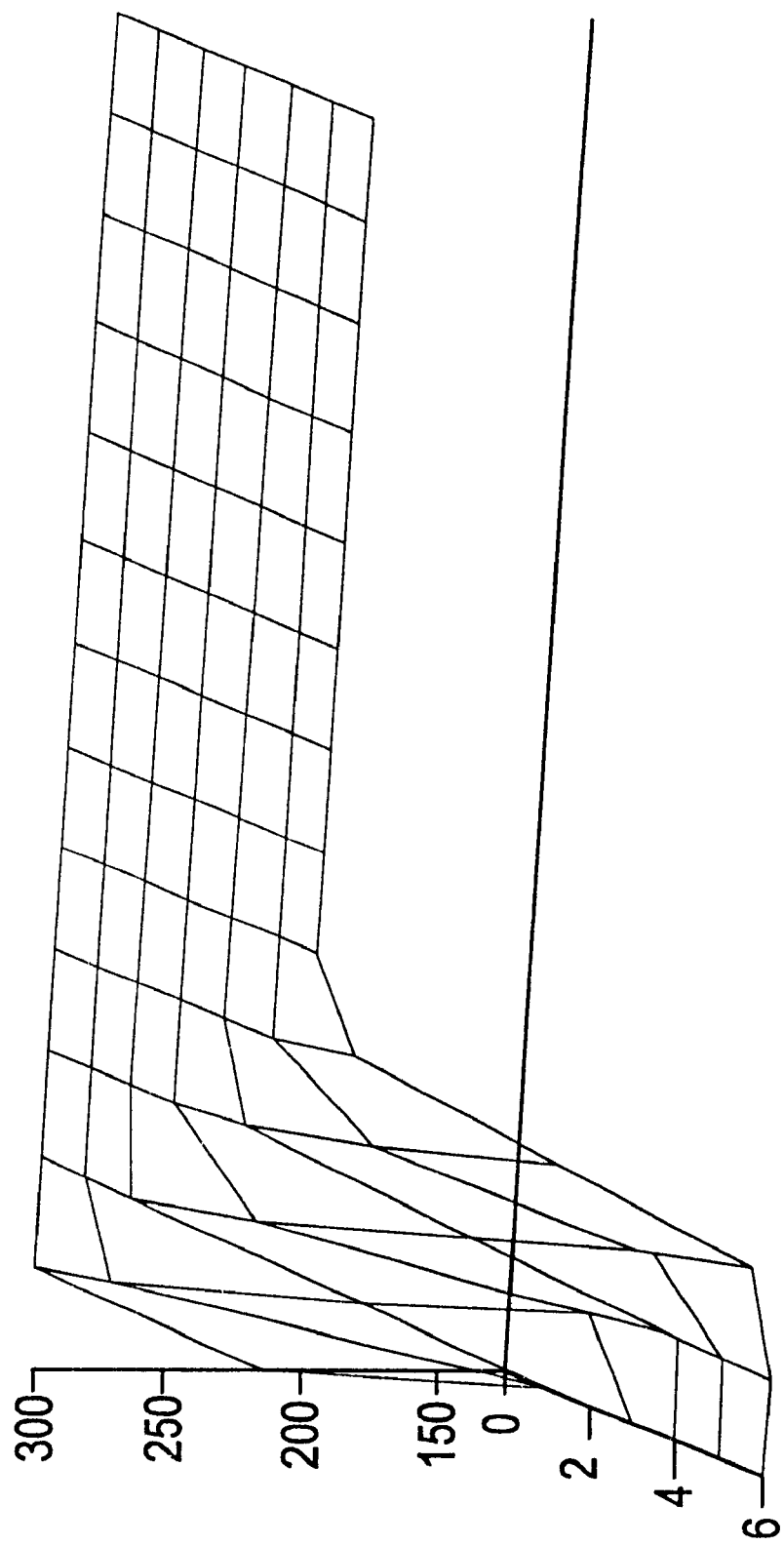
FIG. 36 is a graph showing the flute temperature throughout the cooling section of the bed.

A graph illustrating the flute temperature throughout the cooling section of the bed is shown in FIG. 36.

Information from the regeneration and cooling sections will give the initial bed conditions for the drying section.

$$dW := SF \cdot \rho o \quad dVel := \frac{Cpd \cdot dW}{Cpds \cdot \rho b \cdot Ad}$$

$$AdL1 := .29 \cdot ft$$

Given $$.5 \cdot \left[\left[1 + \text{erf}\left[\left(\frac{ckh \cdot ca \cdot AdL1 \cdot Ac}{cW \cdot Cpc}\right)^{.5} - \left(\frac{ckh \cdot ca \cdot \tau c}{Cp\rho b\_c}\right)^{.5}\right]\right]\right] = .05$$

$$AdL1 := Find(AdL1) \qquad\qquad AdL1 = 0.231 \cdot ft$$

$AdL1$ should always be between 0ft and the drum ($length * 1.05$)(i.e. allows for approaching complete cooling).

If the above solution has an error (is RED) then change the guess value until a solution is found.

-continued $eps := .00002 \qquad ZL := 0 \qquad ZR := Length \cdot 4$ $d\tau 1 := \dfrac{AdL1}{dVel} \qquad\qquad d\tau 1 = 1.705 \cdot sec$ $AdL2 := \dfrac{AdL1 + Length}{2}$ $d\tau 2 := \dfrac{Length}{dVel} - d\tau 1 \qquad\qquad d\tau 2 = 7.995 \cdot sec$ $dPr := 125 \qquad dPstar := -264 \quad tr := rTin - 459.67 \quad tstar := -250$ $BestDP1 := \dfrac{(dPr - dPstar)}{tr - tstar} \cdot ((Tmax - 459.67) - tstar) + dPstar \quad BestDP1 = 1.161$ $AdL2 := \dfrac{Length + AdL1}{2} \qquad\qquad AdL2 = 0.771 \cdot ft$ $AdT2 := \dfrac{instTc + Tmax \cdot 1.05}{2} - 459.67 \qquad\qquad AdT2 = 227.522$ $BestDP2 := \dfrac{(dPr - dPstar)}{tr - tstar} \cdot ((instTc - 459.67) - tstar) + dPstar \quad BestDP2 = 125$ $ZeroDP := \dfrac{(dPr - dPstar)}{tr - tstar} \cdot (0 - tstar) + dPstar \qquad ZeroDP = -87.352$ $Mr := \left[10^{\left(\frac{ZeroDP}{49.5} - .17\right)}\right] \quad \phi 2 := rh$ Polanyi equation $\rightarrow \quad den := \exp\left(\ln\left(\dfrac{1}{\phi 2}\right) \cdot \dfrac{Tin}{560}\right) \quad \phi 1 := \dfrac{1}{den} \quad \phi 1 = 0.85$ $dhw\_a := \begin{bmatrix} 0 \\ .145 \\ .2 \\ .25 \end{bmatrix} \quad dhw\_b := \begin{bmatrix} .6 \\ .31 \\ .21 \\ .14 \end{bmatrix} \quad ML := \begin{bmatrix} 0 \\ .3 \\ .32 \\ .35 \end{bmatrix} \quad MH := \begin{bmatrix} .3 \\ .32 \\ .35 \\ .39 \end{bmatrix}$ $Ne_0 := dhw\_b_0 \cdot \phi 1 + dhw\_a_0 \qquad Ne_1 := dhw\_b_1 \cdot \phi 1 + dhw\_a_1$
$Ne_2 := dhw\_b_2 \cdot \phi 1 + dhw\_a_2 \qquad Ne_3 := dhw\_b_3 \cdot \phi 1 + dhw\_a_3$ $Me := \begin{Vmatrix} Ne_0 & if & [(Ne_0 \le MH_0) \cdot (Ne_0 > ML_0)] \\ Ne_1 & if & (Ne_1 \le MH_1)(Ne_1 > ML_1) \\ Ne_2 & if & (Ne_2 \le MH_2)(Ne_2 > ML_2) \\ Ne_2 & if & (Ne_3 \le MH_3)(Ne_3 > ML_3) \end{Vmatrix} \quad \begin{array}{l} ML_3 = 0.35 \\ MH_3 = 0.39 \end{array} \quad Ne = \begin{bmatrix} 0.51 \\ 0.408 \\ 0.379 \\ 0.369 \end{bmatrix}$ $Me = 0.369$ $M := (Me - Mr) \cdot Fr \qquad\qquad M = 0.357$ $Pvmax := 10^{\left[15.1 - \left(\frac{5079.6}{Tmax}\right) - 1.6908 \cdot \log(Tmax) - 3.193 \cdot 10^{-3} \cdot Tmax + 1.234 \cdot 10^{-6} \cdot Tmax^2\right]} \cdot \dfrac{lb}{in^2}$ $Ppin := Pvo \cdot rh \qquad \phi 4 := \dfrac{Ppin}{Pvmax} \qquad \phi 4 = 0.416$ Polanyi equation $\rightarrow \quad den := \exp\left(\ln\left(\dfrac{1}{\phi 4}\right) \cdot \dfrac{Tin}{560}\right) \quad \phi 3 := \dfrac{1}{den} \quad \phi 3 = 0.416$ $Ne_4 := dhw\_b_0 \cdot \phi 3 + dhw\_a_0 \qquad Ne_5 := dhw\_b_1 \cdot \phi 3 + dhw\_a_1$
$Ne_6 := dhw\_b_2 \cdot \phi 3 + dhw\_a_2 \qquad Ne_7 := dhw\_b_3 \cdot \phi 3 + dhw\_a_3$ $aprime := \begin{Vmatrix} dhw\_a_0 & if & [(Ne_4 \le MH_0) \cdot (Ne_4 > ML_0)] \\ dhw\_a_1 & if & (Ne_5 \le MH_1)(Ne_5 > ML_1) \\ dhw\_a_2 & if & (Ne_6 \le MH_2)(Ne_6 > ML_2) \\ dhw\_a_3 & if & (Ne_7 \le MH_3)(Ne_7 > ML_3) \end{Vmatrix}$ $bprime := \begin{Vmatrix} dhw\_b_0 & if & [(Ne_4 \le MH_0) \cdot (Ne_4 > ML_0)] \\ dhw\_b_1 & if & (Ne_5 \le MH_1)(Ne_5 > ML_1) \\ dhw\_b_2 & if & (Ne_6 \le MH_2)(Ne_6 > ML_2) \\ dhw\_b_3 & if & (Ne_7 \le MH_3)(Ne_7 > ML_3) \end{Vmatrix}$ $Ma := (bprime \cdot \phi 3 + aprime \cdot \ln(\phi 3)) \cdot Fr \qquad Ma = 0.25$ $Tf := \dfrac{M}{Ma} \qquad\qquad$ Correction factor $\quad Tf = 1.432$ Drying Equations -continued $\rho := \dfrac{MWair \cdot P}{Rg \cdot Tm}$    air density at dryer side conditions    $\rho = 0.542 \cdot \text{lb} \cdot \text{ft}^{-3}$ $ActF := SF \cdot \dfrac{Tm}{Tr} \cdot \dfrac{Pr}{P}$    actual volumetric flow rate through the drying section of the drum    $ActF = 1.036 \cdot \dfrac{\text{ft}^3}{\text{sec}}$ $Velocity := \dfrac{ActF}{Ad}$    $Velocity = 2.239 \cdot \text{ft} \cdot \text{sec}^{-1}$ $residencetime := \dfrac{Length}{Velocity}$    $residencetime = 0.586 \cdot \text{sec}$ $\mu := (.0395 + (0.00006292(Tm - 460))) \cdot \dfrac{\text{lb}}{\text{ft} \cdot \text{hr}}$    viscosity of air $T[\,] = \,°\text{F}$.    $\mu = 1.294 \cdot 10^{-5} \cdot \dfrac{\text{lb}}{\text{ft} \cdot \text{sec}}$ $Nf := 3000$    $Afp := 1 \cdot \text{in}^2$ Given $Afp = \dfrac{Nf}{2} \cdot Per \cdot (perx)$    $\dfrac{Ad - Afp}{Acsf} = Nf$    total # of flutes in drying section $\begin{bmatrix} Nf \\ Afp \end{bmatrix} := Find(Nf, Afp)$    $Nf = 1.395 \cdot 10^4$    $Afp = 0.121 \text{:ft}^2$ $FlowAd := Acsf \cdot Nf$ $Uo := \dfrac{ActF}{FlowAd}$    superficial velocity through the drum    $Uo = 3.038 \cdot \dfrac{\text{ft}}{\text{sec}}$ $As := Nf \cdot Per \cdot Length$    surface area available for adsorption    $As = 425.173 \text{:ft}^2$ $a := \dfrac{As}{Vd}$    external surface area available for mass transfer over the true volume    $a = 700.656 \cdot \dfrac{\text{ft}^2}{\text{ft}^3}$ $Dff := Dffo \cdot \left(\dfrac{Pr}{P}\right) \cdot \left(\dfrac{294 + C}{.556 \cdot Tm + C}\right) \cdot \left(\dfrac{Tm}{529.67}\right)^{2.5}$    $Dff = 3.942 \cdot 10^{-5} \cdot \dfrac{\text{ft}^2}{\text{sec}}$ $Kconst := .026$ $Kf := \left(\dfrac{Dff}{de}\right) \cdot Kconst \cdot \left(\dfrac{de \cdot Uo \cdot \rho}{\mu}\right)^{0.8} \cdot \left(\dfrac{\mu}{\rho \cdot Dff}\right)^{\frac{1}{3}}$    Local mass transfer coefficient    $Kf = 0.041 \cdot \dfrac{\text{ft}}{\text{sec}}$ $Hd := \dfrac{\vec{Uo}}{Kf \cdot a}$    Height of a mass transfer unit    $Hd = 0.105 \cdot \text{ft}$ $Pvd1 := 10^{\left[(8.224) + .17026 \cdot \log(BestDP1 + 459.67) - \frac{4785}{BestDP1 + 459.67}\right]} \cdot \text{psia}$    $rh11 := \dfrac{Pvd1}{Pvmax}$ $Pvd2 := 10^{\left[(8.224) + .17026 \cdot \log(BestDP2 + 459.67) - \frac{4785}{BestDP2 + 459.67}\right]} \cdot \text{psia}$    $rh12 := \dfrac{Pvd2}{Pvmax}$ $c11 := .622 \cdot \dfrac{Pvmax \cdot rh11}{P - Pvmax \cdot rh11}$    $c12 := .622 \cdot \dfrac{Pvmax \cdot rh12}{P - Pvmax \cdot rh12}$ $c11 := 1.065 \cdot 10^{-4}$    $c12 = 0.018$    $rh12 = 1.656$ $X1 := \begin{vmatrix} 0 & \text{if } \dfrac{c11}{co} < 0 \\ 1 & \text{if } \dfrac{c11}{co} > 1 \\ \dfrac{c11}{co} & \text{otherwise} \end{vmatrix}$    $X2 := \begin{vmatrix} 0 & \text{if } \dfrac{c12}{co} < 0 \\ 1 & \text{if } \dfrac{c12}{co} > 1 \\ \dfrac{c12}{co} & \text{otherwise} \end{vmatrix}$ $X1 = 0.024$      $X2 = 1$ $ZN1 := \left(\dfrac{Kf \cdot Ad \cdot AdL1 \cdot a}{ActF}\right)^{.5}$    $ZNT := \left(\dfrac{Kf \cdot a \cdot co \cdot \rho}{\rho b \cdot M}\right)^{.5}$    $ZNNT1 := \left(\dfrac{Kf^2 \cdot a^2 \cdot Ad \cdot AdL1 \cdot co \cdot \rho}{M \cdot \rho b \cdot ActF}\right)^{.25}$ $ZN2 := \left(\dfrac{Kf \cdot Ad \cdot AdL2 \cdot a}{ActF}\right)^{.5}$      $ZNNT2 := \left(\dfrac{Kf^2 \cdot a^2 \cdot Ad \cdot AdL2 \cdot co \cdot \rho}{M \cdot \rho b \cdot ActF}\right)^{.25}$ $ZN3 := \left(\dfrac{Kf \cdot Vd \cdot a}{ActF}\right)^{.5}$      $ZNNT3 := \left(\dfrac{Kf^2 \cdot a^2 \cdot Vd \cdot co \cdot \rho}{M \cdot \rho b \cdot ActF}\right)^{.25}$ $X1 := X1 \cdot 3$ $d\tau 0 := 50 \cdot \text{sec}$      $d\tau 10 := 8 \cdot \text{sec}$      $d\tau 20 := 70 \cdot \text{sec}$ $X1 = 0.072$ Given $1 - \dfrac{X1}{.5} + \dfrac{\left[\exp\left[-(ZN1 - ZNT \cdot d\tau 0^{.5})^2\right]\right]}{\pi \cdot [ZNT \cdot d\tau 0^{.5} + ZNNT1 \cdot (d\tau 0^{.25})]} = \text{erf}(ZN1 - ZNT \cdot d\tau 0^{.5})$ -continued $$d\tau 0 := Find(d\tau 0)$$

$$d\tau 0 := 13.419 \cdot \sec$$

Given $$\frac{[\exp[-(ZN2 - ZNT \cdot d\tau 10^{.5})^2]]}{\pi \cdot [ZNT \cdot d\tau 10^{.5} + ZNNT2 \cdot (d\tau 10^{.25})]} + 1 - \frac{X2}{.5} = \text{erf}(ZN2 - ZNT \cdot (d\tau 10^{.5}))$$

$$d\tau 10 := Find(d\tau 10)$$

$$d\tau 10 := 2.821 \cdot 10^3 \cdot \sec$$

Given $$\frac{[\exp[-(ZN3 - ZNT \cdot d\tau 20^{.5})^2]]}{\pi \cdot [ZNT \cdot d\tau 20^{.5} + ZNNT3 \cdot (d\tau 20^{.25})]} + 1 - \frac{X1}{.5} = \text{erf}(ZN3 - ZNT \cdot (d\tau 20^{.5}))$$

$$d\tau 20 := Find(d\tau 20)$$

| | | |
|---|---|---|
| $d\tau 2' := d\tau 2 + d\tau 1$ | | $d\tau 2' = 9.7 \cdot \sec$ |
| $\tau seg1 := if(d\tau 0 > d\tau 1, d\tau 1, d\tau 0)$ | $d\tau 0 = 13.419 \cdot \sec$ | $\tau seg1 = 1.705 \cdot \sec$ |
| $\tau seg2 := if(d\tau 0 > d\tau 1, 1 \cdot 10^{50} \cdot \sec, d\tau 1 - d\tau 0)$ | $d\tau 1 = 1.705 \cdot \sec$ | $\tau seg2 = 1 \cdot 10^{50} \cdot \sec$ |
| $\tau seg3 := if(d\tau 10 > d\tau 1 + d\tau 2, d\tau 2, d\tau 10 - d\tau 1)$ | $d\tau 2 = 7.995 \cdot \sec$ | $\tau seg3 = 7.995 \cdot \sec$ |
| $\tau seg4 := if(d\tau 10 > d\tau 1 + d\tau 2, 1 \cdot 10^{50} \cdot \sec, d\tau 2' - d\tau 10)$ | $d\tau 10 = 2.821 \cdot 10^3 \cdot \sec$ | $\tau seg4 = 1 \cdot 10^{50} \cdot \sec$ |
| $\tau seg5 := if(d\tau 20 > \tau, \tau - d\tau 2', d\tau 20 - d\tau 2')$ | | $\tau seg5 = 202.381 \cdot \sec$ |
| $\tau seg6 := if(d\tau 20 > \tau, 1 \cdot 10^{50} \cdot \sec, \tau - d\tau 20)$ | $d\tau 20 = 428.493 \cdot \sec$ | $\tau seg6 = 1 \cdot 10^{50} \cdot \sec$ |

$$ZN := \left(\frac{Kf \cdot Vd \cdot a}{ActF}\right)^{.5} \qquad ZNT := \left(\frac{Kf \cdot a \cdot co \cdot \rho}{\rho b \cdot M}\right)^{.5} \qquad ZNNT := \left(\frac{Kf^2 \cdot a^2 \cdot Vd \cdot co \cdot \rho}{M \cdot \rho b \cdot ActF}\right)^{.25}$$

$$Xbar1 := \frac{0.5}{\tau seg2} \cdot \int_{d\tau 0}^{d\tau 1} \left[1 - \text{erf}(ZN1 - ZNT \cdot tau^{.5}) + \frac{[\exp[-(ZN1 - ZNT \cdot tau^{.5})^2]]}{\pi \cdot (ZNT \cdot tau^{.5} + ZNNT1 \cdot tau^{.25})}\right] d\,tau$$

$$Xbar2 := \frac{0.5}{\tau seg4} \cdot \int_{d\tau 10}^{d\tau 2'} \left[1 - \text{erf}(ZN2 - ZNT \cdot tau^{.5}) + \frac{[\exp[-(ZN2 - ZNT \cdot tau^{.5})^2]]}{\pi \cdot (ZNT \cdot tau^{.5} + ZNNT2 \cdot tau^{.25})}\right] d\,tau$$

$$Xbar3 := \frac{0.5}{\tau seg6} \cdot \int_{d\tau 20}^{\tau} \left[1 - \text{erf}(ZN - ZNT \cdot tau^{.5}) + \frac{[\exp[-(ZN - ZNT \cdot tau^{.5})^2]]}{\pi \cdot (ZNT \cdot tau^{.5} + ZNNT \cdot tau^{.25})}\right] d\,tau$$

| | | |
|---|---|---|
| $Xbar1 = 0$ | $Xbar2 = 0$ | $Xbar3 = 0$ |
| $c11 := Xbar1 \cdot co$ | $c12 := Xbar2 \cdot co$ | $c13 := Xbar3 \cdot co$ |
| $rh11 := 0.00000001$ | $rh12 := 0.00000001$ | $rh13 := 0.000000$ |
| $rh11 := \frac{P \cdot c11}{Pv1 \cdot (.622 + c11)}$ | $rh12 := \frac{P \cdot c12}{Pv1 \cdot (.622 + c12)}$ | $rh13 := \frac{P \cdot c13}{Pv1 \cdot (.622 + c13)}$ |
| $Tdp1 := 0$ | $Tdp2 := 0$ | $Tdp3 := 0$ |
| $Pvdp1 := rh11 \cdot Pv1$ | $Tdp := 450$ | $Pvd := Pvdp1$ |

Given $$8.224 + 0.17026 \log(Tdp) - \frac{4785}{Tdp} = \log\left(\frac{Pvd}{psia}\right)$$

$$Tfunct(Pvd) := Find(Tdp)$$
$$Tdp1 := Tfunct(Pvd)$$

$Pvdp2 := rh12 \cdot Pv1$  $Tdp := 400$  $Pvd := Pvdp2$

Given $$8.224 + 0.17026 \log(Tdp) - \frac{4785}{Tdp} = \log\left(\frac{Pvd}{psia}\right)$$

$$Tfunct(Pvd) := Find(Tdp)$$
$$Tdp2 := Tfunct(Pvd)$$

$Pvdp3 := rh13 \cdot Pv1$  $Tdp := 500$  $Pvd := Pvdp3$

Given $$8.224 + 0.17026 \log(Tdp) - \frac{4785}{Tdp} = \log\left(\frac{Pvdp3}{psia}\right)$$

$$Tfunct(Pvdp3) := Find(Tdp)$$
$$Tdp3 := Tfunct(Pvd)$$

| | | |
|---|---|---|
| $Tdp1 = 0$ | $Tdp2 = 0$ | $Tdp3 = 0$ |
| $Tdp1 := Tdp1 - 459.67$ | $Tdp2 := Tdp2 - 459.67$ | $Tdp3 := Tdp3 - 459.67$ |

-continued $$Note1 := \begin{vmatrix} \text{"Not enough regeneration flow!"} & \text{if } \tau tp < 0 \\ \text{"Everything looks OK."} & \text{otherwise} \end{vmatrix}$$

$$\tau seg2 := \begin{vmatrix} 0 & \text{if } \tau seg2 > 1 \cdot 10^5 \cdot \sec \\ \tau seg2 & \text{otherwise} \end{vmatrix} \quad \tau seg4 := \begin{vmatrix} 0 & \text{if } \tau seg4 > 1 \cdot 10^5 \cdot \sec \\ \tau seg4 & \text{otherwise} \end{vmatrix}$$

$BestDP1 = 1.161$
$BestDP2 = 125$
$Tdp3 = -459.67$ $$\tau seg6 := \begin{vmatrix} 0 & \text{if } \tau seg6 > 1 \cdot 10^5 \cdot \sec \\ \tau seg6 & \text{otherwise} \end{vmatrix}$$

$$DewPoint := \frac{\tau seg1 \cdot BestDP1 + \tau seg3 \cdot BestDP2 + \tau seg5 \cdot BestDP1 + Tdp1 \cdot \tau seg2 + Tdp2 \cdot \tau seg4 + Tdp3 \cdot \tau seg6}{\tau}$$

$$Ppvd := 10^{[8.244 + 0.17026 \cdot \log(DewPoint + 459.67) - \frac{4785}{(DewPoint + 459.67)}]} \cdot psia$$

$$rhrh := \frac{Ppvd}{Pv1} \quad cc := .622 \cdot \frac{Ppvd \cdot rhrh}{P - Ppvd \cdot rhrh} \quad UC := \frac{(co - cc) \cdot SF \cdot \tau \cdot \rho o}{Vd \cdot \rho b}$$

$$Note2 := \begin{vmatrix} \text{"Flow seems low for a 250"} & \text{if } (RRDmodel = 250) \cdot (SF < 100 \cdot SCFM) \\ \text{"Flow OK"} & \text{otherwise} \end{vmatrix}$$

$Note2 = \text{"Flow OK"}$ $$m1 := Per \cdot \frac{perx}{2} \cdot (Length - AdL1) \cdot 45 \cdot \frac{lb}{ft^3}$$

$m1 = 4.241 \cdot 10^{-4} \cdot lb$ $$FSF := SF \cdot \frac{Acsf}{FlowAd}$$

$$m2 := FSF \cdot .075 \cdot \frac{lb}{ft^3} \cdot \tau$$

$m2 = 8.554 \cdot 10^{-3} \cdot lb$ $$Tprod := \frac{m1}{m2} \cdot (instTc - Tmax) + Tmax$$

$Tprod - Tmax = 8.688$ $ProductTemp := Tprod - 459.67$ $UC = 9.69:\%$
$ProductTemp = 133.956$
$DewPoint = 5.829$ It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the invention has been described herein in detail in relation to its preferred embodiment, it is to be understood that this disclosure is only illustrative and exemplary or the present invention and is made merely for purposes of provided a full and enabling disclosure of the invention. The foregoing discussion is not intended or to be construed to limit the present invention of otherwise to exclude any such other embodiments, adaptations, variations, modifications and equivalent arrangements.

What is claimed is:

1. A system for supporting a rotating adsorbent drum within a containment shell, the drum being generally cylindrical, comprising:
a bottom plate attached to the containment shell, the bottom plate being sealed to the bottom of the drum;
at least one retaining rod attached to the bottom plate and extending upward above the rotating drum;
an adjustable top plate attached to the retaining rod, the top plate being sealed to the top of the drum;
at least one drum positioning roller located on the retaining rod adjacent to the lateral surface of the drum, whereby the lateral position of the drum may be maintained by retaining the drum against the at least one drum positioning roller while the drum rotates.

2. The system of claim 1, wherein the top plate is downwardly-biased onto the drum and wherein said top plate is vertically adjustable to accommodate slightly variable drum heights.

3. The system of claim 2, wherein the top plate may be adjusted by sliding upward or downward on the rod.

4. The system of claim 2, wherein the top plate is downwardly biased by a spring mounted on the end of the rod.

5. A belt drive system for rotating a drum in a rotating drum adsorber system, the rotating drum adsorber system including a pressurized container apparatus, the interior of the pressurized container apparatus defining a pressurized region, the belt drive system comprising:
an inner belt interoperatively connected to the drum for imparting motive force to the drum, the inner belt being located entirely within the pressurized region;
a drive shaft interoperatively connected to the inner belt for imparting motive force to the inner belt; and
an external motor drive interoperatively connected to the drive shaft for imparting motive force to the drive shaft, the external motor drive being located outside the pressurized region.

6. The belt drive system of claim 5, wherein the external motor drive includes a motor and an external belt for transferring motive force from the motor to the drive shaft.

7. The belt drive system of claim 5, further comprising an adjustment apparatus disposed to engage the inner belt for varying the amount of tension in the inner belt.

8. The belt drive system of claim 7, wherein the adjustment apparatus includes a control member located at least partly outside the pressurized region to permit the tension in the inner belt to be controlled from outside the pressurized region.

9. The belt drive system of claim 8, wherein the adjustment apparatus includes a locking lever extending from within the pressurized region to the exterior of the pressurized region.

10. The belt drive system of claim 7, wherein the adjustment apparatus includes an eccentric adjuster operatively connected to the drive shaft for controlling the location of the drive shaft.

11. The belt drive system of claim 10, wherein the drive shaft is arranged to rotate within the eccentric adjuster about a first axis of rotation, and wherein the location of the drive shaft may be controlled by rotating the eccentric adjuster about a second axis of rotation.

12. The belt drive system of claim 11, wherein the adjustment apparatus further includes a locking lever, and wherein the angular position of the eccentric adjuster about the second axis of rotation may be varied by manipulating the locking lever.

13. The belt drive system of claim 7, further including a means for adjusting the inner belt from outside the pressurized region without depressurizing the rotating drum adsorber system.

14. The belt drive system of claim 7, further including a tensioning device interposed along the belt between the adjustment apparatus and the drum and arranged to maintain a constant contact area between the belt and the drum as the adjustment apparatus is adjusted.

15. A method of rotating a drum in a rotating drum adsorber system, the drum being mounted within a pressurized container, wherein the method comprises the steps of:

providing a drive shaft;

installing an inner belt within the pressurized container to interoperatively connect the drive shaft to the drum; and imparting motive force to the drive shaft.

16. The method of claim 15, further comprising the step of providing an external motor drive outside the pressurized container, and wherein the step of imparting motive force includes imparting motive force from the external motor drive to the drive shaft.

17. The method of claim 15, further comprising the step of pressurizing the pressurized container after the step of installing the inner belt.

18. The method of claim 17, further comprising the step of depressurizing the pressurized container before installing the inner belt.

19. The method of claim 15, further comprising the step of providing an access port on the pressurized container, and wherein the step of installing the inner belt includes the step of opening the access port for providing access to the inner belt.

20. The method of claim 19 further comprising the step of depressurizing the pressurized container before opening the access port.

21. The method of claim 19 further comprising the step of pressurizing the pressurized container for preventing the access port from being opened.

22. The method of claim 15 wherein the pressurized container includes a shell for containing the drum and a belt drive housing mounted on the side of the shell, and wherein the step of providing a drive shaft includes providing a drive shaft within the belt drive housing.

23. The method of claim 15 further comprising the step of adjusting the tension of the inner belt from outside the pressurized container without depressurizing the pressurized container.

24. The method of claim 23 wherein the step of adjusting the tension includes changing the position of the drive shaft.

25. The method of claim 24 wherein the step of changing the position of the drive shaft includes the steps of:

providing a locking lever operatively connected to the drive shaft; and adjusting the position of the locking lever.

* * * * *